US012611754B2

(12) United States Patent
Kaye, Jr.

(10) Patent No.: US 12,611,754 B2
(45) Date of Patent: Apr. 28, 2026

(54) CRIMPING AND/OR PINCHING ACCESSORY FOR POWER TOOL

(71) Applicant: Black & Decker Inc., New Britain, CT (US)

(72) Inventor: Thomas R. Kaye, Jr., Fallston, MD (US)

(73) Assignee: Black & Decker Inc., New Britain, CT (US)

( * ) Notice: Subject to any disclaimer, the term of this patent is extended or adjusted under 35 U.S.C. 154(b) by 259 days.

(21) Appl. No.: 18/332,213

(22) Filed: Jun. 9, 2023

(65) Prior Publication Data

US 2024/0033890 A1 Feb. 1, 2024

Related U.S. Application Data

(60) Provisional application No. 63/369,855, filed on Jul. 29, 2022.

(51) Int. Cl.
*B25B 27/10* (2006.01)
*B25F 3/00* (2006.01)

(52) U.S. Cl.
CPC .............. *B25B 27/10* (2013.01); *B25F 3/00* (2013.01); *B23B 2231/06* (2013.01)

(58) Field of Classification Search
CPC .... B21D 39/048; B21D 39/046; B21D 39/04; B25B 27/10; B25F 3/00; B23B 2231/06
See application file for complete search history.

(56) References Cited

U.S. PATENT DOCUMENTS

| | | | |
|---|---|---|---|
| 529,613 | A | 11/1894 | Francis |
| 2,614,254 | A | 10/1952 | Anthony et al. |
| 2,643,567 | A | 6/1953 | John |

(Continued)

FOREIGN PATENT DOCUMENTS

| | | |
|---|---|---|
| CN | 1148745 A | 4/1997 |
| CN | 200945584 Y | 9/2007 |

(Continued)

OTHER PUBLICATIONS

Extended European Search Report from EP Appln. No. 23186919.9 mailed on Jan. 25, 2024, 7 pages.

(Continued)

*Primary Examiner* — Mohammed S. Alawadi
(74) *Attorney, Agent, or Firm* — Brake Hughes Bellermann LLP

(57) ABSTRACT

A crimping accessory and/or a pinching accessory for a power-driven tool is provided. The crimping accessory and/or the pinching accessory can include first and second jaws that are rotatably coupled relative to a guide assembly and an actuating mechanism coupled in the guide assembly. The actuating mechanism includes a trunnion mounted on a rod. First and second cam followers exert a force on first cam surfaces of the first and second jaws as the trunnion moves in a first longitudinal direction, to bring the jaws together in a crimping and/or pinching area of the accessory and exert a crimping and/or pinching force on a workpiece. Movement of a pair of first pins and a pair of second pins along second cam surfaces of the first and second jaws guides an opening movement of the first and second jaws to release the force exerted on the workpiece.

22 Claims, 48 Drawing Sheets

(56) References Cited

U.S. PATENT DOCUMENTS

| | | | |
|---|---|---|---|
| 2,693,218 A | 11/1954 | Freedom | |
| 2,756,045 A | 7/1956 | Raymond | |
| 2,931,260 A | 4/1960 | Townshend | |
| 2,996,939 A | 8/1961 | Meier | |
| 3,324,702 A * | 6/1967 | Malkin | H01R 43/042 |
| | | | 72/409.1 |
| 3,481,373 A | 12/1969 | Blagojevich | |
| 3,618,927 A | 11/1971 | Nicholls | |
| 3,624,876 A | 12/1971 | Irvin | |
| 3,959,847 A | 6/1976 | Kaulig et al. | |
| 4,079,922 A | 3/1978 | Nicholls | |
| 4,221,019 A | 9/1980 | Haase et al. | |
| 4,294,147 A | 10/1981 | Borzym | |
| 4,392,644 A | 7/1983 | Borzym | |
| 5,002,135 A | 3/1991 | Pellenc | |
| 5,058,272 A | 10/1991 | Steube | |
| 5,110,109 A | 5/1992 | Stanco et al. | |
| 5,611,228 A | 3/1997 | Dummermuth | |
| 5,924,322 A | 7/1999 | Caveney | |
| 5,971,378 A | 10/1999 | Sweeney | |
| 6,116,118 A | 9/2000 | Wesch | |
| 6,434,998 B2 | 8/2002 | Amherd | |
| 6,457,338 B1 | 10/2002 | Frenken | |
| 6,662,621 B1 | 12/2003 | Amherd | |
| 6,739,172 B2 | 5/2004 | Wagner | |
| 7,000,448 B2 | 2/2006 | Hamm et al. | |
| 7,036,806 B2 | 5/2006 | Amherd et al. | |
| 7,260,975 B2 | 8/2007 | Hamm et al. | |
| 7,434,440 B2 | 10/2008 | Fay | |
| 7,487,654 B2 | 2/2009 | Lefavour et al. | |
| 7,633,246 B2 | 12/2009 | Bernier et al. | |
| 7,634,859 B2 | 12/2009 | Amherd | |
| 7,779,973 B2 | 8/2010 | Ko | |
| 7,937,838 B2 | 5/2011 | Patton et al. | |
| 8,122,607 B2 | 2/2012 | Maniwa et al. | |
| 8,336,362 B2 | 12/2012 | Frenken | |
| 8,342,001 B2 | 1/2013 | Zhang | |
| 8,490,261 B2 | 7/2013 | Frenken et al. | |
| 8,713,782 B1 | 5/2014 | Ralphs | |
| 8,839,653 B2 | 9/2014 | Roman et al. | |
| 9,015,916 B2 | 4/2015 | Frenken et al. | |
| 9,227,240 B2 * | 1/2016 | MacAdams | B25F 3/00 |
| 9,521,810 B2 | 12/2016 | Zurcher | |
| 9,808,851 B2 | 11/2017 | Thorson et al. | |
| 9,993,885 B2 | 6/2018 | Frenken | |
| 10,029,357 B2 | 7/2018 | Hofmann | |
| 10,213,821 B2 | 2/2019 | Thorson et al. | |
| 10,343,227 B2 | 7/2019 | Frenken | |
| 10,442,064 B2 | 10/2019 | Hofmann | |
| 10,512,964 B2 | 12/2019 | Lütolf et al. | |
| 10,615,557 B2 | 4/2020 | Weber et al. | |
| 10,675,805 B2 | 6/2020 | Lütolf et al. | |
| 10,697,527 B2 | 6/2020 | Pellenc et al. | |
| 10,847,943 B2 | 11/2020 | Weber et al. | |
| 10,933,478 B2 | 3/2021 | Brown | |
| 11,014,473 B2 | 5/2021 | Fillep et al. | |
| 11,236,849 B2 | 2/2022 | Besser et al. | |
| 11,278,949 B2 | 3/2022 | Thorson et al. | |
| 11,577,299 B2 | 2/2023 | Chen et al. | |
| 11,578,824 B2 | 2/2023 | Chen et al. | |
| 2012/0125074 A1 | 5/2012 | Zhang | |
| 2012/0246902 A1 | 10/2012 | Montena | |
| 2015/0321238 A1 | 11/2015 | Hofmann | |
| 2016/0271781 A1 | 9/2016 | Kobayashi et al. | |
| 2016/0288193 A1 | 10/2016 | Thorson et al. | |
| 2018/0161968 A1 | 6/2018 | Lütolf et al. | |
| 2018/0193994 A1 | 7/2018 | Pellenc | |
| 2020/0070329 A1 * | 3/2020 | Buck | B25B 27/146 |
| 2020/0230686 A1 | 7/2020 | Schneider et al. | |
| 2021/0129310 A1 | 5/2021 | Barezzani | |

FOREIGN PATENT DOCUMENTS

| | | | |
|---|---|---|---|
| CN | 201140542 Y | 10/2008 | |
| CN | 202292485 U | 7/2012 | |
| CN | 105171106 A | 12/2015 | |
| CN | 206076858 U | 4/2017 | |
| CN | 107685111 A | 2/2018 | |
| CN | 108202295 A | 6/2018 | |
| CN | 108271526 A | 7/2018 | |
| CN | 208234372 U | 12/2018 | |
| CN | 109420718 A | 3/2019 | |
| CN | 110682050 A | 1/2020 | |
| CN | 110893603 A | 3/2020 | |
| CN | 210997317 U | 7/2020 | |
| CN | 211026433 U | 7/2020 | |
| CN | 211193563 U | 8/2020 | |
| CN | 213026848 U | 4/2021 | |
| CN | 112873125 A | 6/2021 | |
| CN | 213470095 U | 6/2021 | |
| CN | 110087835 B | 8/2021 | |
| CN | 114572815 A | 6/2022 | |
| CN | 216940546 U | 7/2022 | |
| DE | 2623660 C2 | 12/1977 | |
| DE | 3734302 A1 | 4/1988 | |
| DE | 9405783 U1 | 7/1994 | |
| DE | 4446504 C1 | 3/1996 | |
| DE | 19854943 A1 | 12/1999 | |
| DE | 20303633 U1 | 5/2003 | |
| DE | 20318618 U1 | 4/2005 | |
| DE | 202006013693 U1 | 1/2008 | |
| DE | 10354307 B4 | 2/2013 | |
| DE | 102007041644 B4 | 6/2016 | |
| DE | 102017204387 A1 | 6/2018 | |
| EP | 0646998 A1 | 4/1995 | |
| EP | 0771615 A1 | 5/1997 | |
| EP | 1034896 A1 | 9/2000 | |
| EP | 0860245 B1 | 4/2006 | |
| EP | 1838498 A1 | 10/2007 | |
| EP | 2286936 B1 | 4/2014 | |
| EP | 2172308 B1 | 6/2014 | |
| EP | 2873122 B1 | 5/2017 | |
| EP | 3231528 A1 | 10/2017 | |
| EP | 3003647 B1 | 4/2018 | |
| EP | 2685573 B1 | 10/2019 | |
| EP | 2720831 B1 | 10/2019 | |
| EP | 3625006 A2 | 3/2020 | |
| EP | 3766147 A1 | 1/2021 | |
| EP | 3616845 B1 | 3/2021 | |
| EP | 3843924 A1 | 7/2021 | |
| EP | 3614507 B1 | 9/2021 | |
| EP | 3687737 B1 | 11/2021 | |
| EP | 3838489 B1 | 5/2022 | |
| EP | 3639940 B1 | 7/2022 | |
| EP | 4327982 A1 | 2/2024 | |
| JP | 2001315069 A | 11/2001 | |
| JP | 4254983 B2 | 2/2009 | |
| KR | 101641369 B1 | 7/2016 | |
| WO | 9115944 A1 | 10/1991 | |
| WO | 2005033524 A1 | 4/2005 | |
| WO | 2008147609 A1 | 12/2008 | |
| WO | 2010063146 A1 | 6/2010 | |

OTHER PUBLICATIONS

Extended European Search Report from EP Appln. No. 25181487.7 mailed on Oct. 22, 2025, 7 pages.

Extended European Search Report from EP Appln. No. 25218993.1 mailed on Feb. 19, 2026, 6 pages.

* cited by examiner

CRIMPING AND/OR PINCHING ACCESSORY FOR POWER TOOL

CROSS-REFERENCE TO RELATED APPLICATION

This application claims the benefit of and priority to U.S. Provisional Application No. 63/369,855, filed Jul. 29, 2022, which is incorporated by reference herein in its entirety.

FIELD

This relates to a crimping and/or pinching accessory for a power-driven tool, e.g., a rotary power tool such as a drill, a drill/driver, an impact driver and the like.

BACKGROUND

Manual crimping and/or pinching of coupling or connection rings for the coupling of piping and/or tubing and/or fittings may be time consuming and fatiguing, even with the assistance of a manually operated hand tool. The crimping and/or pinching of these types of connections rings to provide a reliable, leak proof coupling relies on the application of a relatively large force that may be difficult for a user to effectively apply, particularly in an installation area that is difficult to access. The use of a power driven tool to accomplish this task may provide for the automated coupling of piping/tubing/fittings, while facilitating the application of a sufficient coupling force and producing a more consistent, leak proof coupling. However, this may require an expensive dedicated power tool, which may be heavy and fatiguing for a user, and which may have difficulty accessing piping, tubing, and fittings in tight spaces. An accessory tool that can be coupled to existing power-driven tools to facilitate the crimping and/or pinching of these types of coupling/connection rings may provide time savings, may reduce user fatigue, and may provide for a more secure coupling between the coupled elements.

SUMMARY

In one general aspect, an accessory for a rotary power tool includes a rod extending along a longitudinal axis, the rod having an end portion configured to be coupled to an output mechanism of the rotary power tool, wherein the rod is configured to rotate about the longitudinal axis in response to operation of the power tool; a first jaw having a first working portion and coupled to a first guide portion including a first cam surface; a second jaw having a second working portion facing the first working portion and coupled to a second guide portion, the first jaw being pivotable relative to the second jaw about a fulcrum oriented transverse to the longitudinal axis, between a fully open position and a fully closed position; a trunnion operatively coupled to the rod and configured to move in a first axial direction along the rod in response to rotation of the rod in a first direction, and to move in a second axial direction along the rod, opposite the first axial direction, in response to rotation of the rod in a second direction; and a first cam follower coupled to the trunnion and configured to engage the first cam surface to cause the first jaw to pivot relative to the second jaw. The first cam surface may include a first section, a second section, and a third section. In response to rotation of the rod in the first direction, the cam follower may be configured to sequentially engage the first, second, and third sections of the first cam surface such that the first cam follower engages the first section of the first cam surface to cause the first working portion of the first jaw to pivot toward the second working portion of the second jaw from the fully open position toward the fully closed position of the first and second jaws, the first cam follower engages the second section of the first cam surface to cause the first working portion of the first jaw to pivot toward the second working portion of the second jaw to the fully closed position of the first and second jaws to crimp a workpiece positioned between the first and second jaws, and the first cam follower engages the third section of the first cam surface to cause the first working portion of the first jaw to pivot away from the second working portion of the second jaw from the fully closed position to a partially open position of the first and second jaws.

In some implementations, the accessory also includes a second cam follower rotatably coupled in a second portion of the trunnion and configured to engage a second cam surface of the second guide portion to cause the second jaw to rotate relative to the first jaw. The second cam surface may include a first section, a second section, and a third section. In response to rotation of the rod in the first direction, the second cam follower may be configured to sequentially engage the first, second and third sections of the second cam surface such that the second cam follower engages the first section of the second cam surface to cause the second working portion of the second jaw to pivot toward the first working portion of the first jaw from the fully open position toward the fully closed position, the second cam follower engages the second section of the second cam surface to cause the second working portion of the second jaw to pivot toward the first working portion of the first jaw to the fully closed position to crimp a workpiece positioned between the first and second jaws, and the second cam follower engages the third section of the second cam surface to cause the second working portion of the second jaw to pivot away from the first working portion of the second jaw to a partially open position.

In some implementations, a contour of the first cam surface and a contour of the second cam surface are symmetric about a longitudinal centerline of the rod, such that rotational movement of the first jaw is coordinated with rotational movement of the second jaw in response to longitudinal movement of the trunnion along the rod. In some implementations, the second section of the first cam surface includes a first peak portion, and the second section of the second cam surface includes a second peak portion. A target force may be exerted on the workpiece received between the first and second jaws when the first cam follower is positioned at the first peak portion and the second cam follower is positioned at the second peak portion.

In some implementations, in the fully open position of the first and second jaws, the trunnion is positioned on a first unthreaded portion of the rod, in the fully closed position of the first and second jaws, the trunnion is engaged with a threaded portion of the rod, and in the partially open position of the first and second jaws, the trunnion is positioned on a second unthreaded portion of the rod.

In some implementations, the trunnion includes a first elongated guide protrusion formed on an outer side of a first side portion of the trunnion, wherein the first guide protrusion is slidably received in a first guide slot extending longitudinally along a first guide plate positioned at a first side of the rod; and a second elongated guide protrusion formed on an outer side of a second side portion of the trunnion, wherein the second guide protrusion is slidably received in a second guide slot extending longitudinally along a second guide plate positioned at a second side of the rod.

In some implementations, the accessory is a crimping accessory configured to exert a crimping force on a crimping ring surrounding two elements to be joined. In some implementations, the crimping accessory is a pinching accessory configured to exert a pinching force on a pinch ring surrounding two elements to be joined.

In another general aspect, an accessory for a rotary power tool includes a rod positioned between a first guide plate and a second guide plate, the rod having an end portion configured to be coupled to an output mechanism of the rotary power tool, wherein the rod is configured to rotate about a longitudinal axis in response to operation of the power tool; a first jaw and a second jaw coupled between the first guide plate and the second guide plate, wherein at least one of the first jaw or the second jaw is rotatable relative to the other of the first jaw or the second jaw between a fully open position and a fully closed position of the first jaw and the second jaw; a trunnion positioned between a first guide plate and a second guide plate, wherein the rod extends through a threaded portion of the trunnion to operatively couple the trunnion on the rod, wherein the trunnion is configured to move axially along the rod in response to rotation of the rod; at least one cam follower coupled to the trunnion and configured to engage a cam surface coupled to at least one of the first jaw or the second jaw. In response to rotation of the rod in a first direction, the threaded portion of the trunnion may be engaged with a threaded portion of the rod to move the trunnion in a first axial direction along the rod, the at least one cam follower moves from a first portion to a second portion of the cam surface in response to the movement of the trunnion in the first axial direction, and the at least one of the first jaw or the second jaw rotates relative to the other of the first jaw or the second jaw in response to the movement of the at least one cam follower along the cam surface, to move from the fully open position to the fully closed position of the first and second jaws. In response to continued rotation of the rod in the first direction and continued movement of the trunnion in the first axial direction, the threaded portion of the trunnion may be disengaged from the threaded portion of the rod and moved onto an unthreaded portion of the rod, the at least one cam follower moves from the second portion to a third portion of the cam surface in response to the continued movement of the trunnion in the first axial direction and the movement of the trunnion onto the unthreaded portion of the rod, and the at least one of the first jaw or the second jaw rotates relative to the other of the first jaw or the second jaw to move from the fully closed position to a partially open position of the first jaw and the second jaw.

In some implementations, in the fully closed position of the first and second jaws, a target force is exerted on a workpiece received between the first and second jaws, and in the partially open position of the first and second jaws, the workpiece is releasable from the first and second jaws. In some implementations, the threaded portion of the rod is positioned between a first unthreaded portion and a second unthreaded portion of the rod, wherein, in the partially open position of the first and second jaws, the trunnion is positioned on the first unthreaded portion of the rod, and in the fully open position of the first and second jaws, the trunnion is positioned on the second unthreaded portion of the rod. In some implementations, the trunnion is configured to move in a second axial direction along the rod in response to rotation of the rod in a second direction.

In some implementations, the at least one cam follower includes a first roller configured to engage a first cam surface coupled to the first jaw; and a second roller configured to engage a second cam surface coupled to the second jaw, and the trunnion includes a first side portion and a second side portion provided on opposite sides of an intermediate portion; a first recessed area on a first side of the intermediate portion, between the first and second side portions of the trunnion, wherein the first roller is rotatably mounted in the first recessed area; a second recessed area on a second side of the intermediate portion, between the first and second side portions of the trunnion, wherein the second roller is rotatably mounted in the second recessed area; and a threaded opening formed in the intermediate portion, wherein the rod extends through the threaded opening. In response to movement of the trunnion in the first axial direction, the first jaw may rotate in a first direction in response to a force exerted by the first roller on the first jaw as the first roller rolls along the first cam surface, the second jaw may rotate in a second direction in response to a force exerted by the second roller on the second jaw as the second roller rolls along the second cam surface, and a target force may be exerted on a workpiece received between the first and second jaws in response to a positioning of the trunnion on the threaded portion of the rod, with the first roller at a peak portion of the first cam surface of the first jaw and the second roller at a peak portion of the second cam surface. In some implementations, in response to continued rotation of the rod in the first direction and continued movement of the trunnion in the first axial direction onto the unthreaded portion of the rod, the first jaw rotates in the second direction in response to continued movement of the first roller along the first cam surface, and the second jaw rotates in the first direction in response to continued movement of the second roller along the second cam surface.

In another general aspect, an accessory for a rotary power tool includes a rod between a first guide plate and a second guide plate, the rod having an end portion configured to be coupled to an output mechanism of the rotary power tool, wherein the rod is configured to rotate about a longitudinal axis in response to operation of the power tool; a first jaw coupled between the first guide plate and the second guide plate; a second jaw rotatably coupled between the first guide plate and the second guide plate, wherein the first jaw is rotatable relative to the second jaw between a fully open position and a fully closed position of the first jaw and the second jaw; a trunnion positioned on the rod, the trunnion including a threaded opening formed in an intermediate portion of the trunnion, wherein the rod extends through the threaded opening such that the trunnion is configured to move axially along the rod in response to rotation of the rod; a mounting pin extending between a first side portion and a second side portion of the trunnion; and a cam follower mounted on the mounting pin, wherein the cam follower is configured to engage a first cam surface coupled the first jaw. A position of the mounting pin in the trunnion may be adjustable so as to adjust a position of the cam follower and a corresponding separation distance between a working portion of the first jaw and a working portion of the second jaw. In response to rotation of the rod in a first direction, the threaded portion of the trunnion may be engaged with a threaded portion of the rod to move the trunnion in a first axial direction along the rod, the cam follower may move along the cam surface of the second jaw in response to the movement of the trunnion in the first axial direction, and the second jaw may rotate relative to first jaw in response to the movement of the first cam follower along the first cam surface.

In some implementations, the mounting pin extends through an opening in the first side portion of the trunnion, and out through an opening in the second side portion of the trunnion, the pin including a head portion; an adjustment portion formed adjacent to the head portion, the adjustment portion including a plurality of engagement protrusions; an eccentric portion formed adjacent to the adjustment portion; and a coupling portion formed adjacent to the eccentric portion. The head portion, the adjustment portion and the coupling portion may be coaxially aligned along a longitudinal axis of the mounting pin, and the eccentric portion may be offset from the longitudinal axis of the mounting pin. The cam follower may be mounted on the eccentric portion of the mounting pin. In some implementations, the opening in the first side portion of the trunnion includes a plurality of engagement recesses configured to selectively engage the plurality of engagement protrusions formed on the adjustment portion of the mounting pin. In some implementations, the separation distance between of the working portion of the first jaw and the working portion of the second jaw is varied based on a rotational position of the mounting pin in the opening in the first side portion of the trunnion and a corresponding position of the cam follower mounted on the eccentric portion of the mounting pin. In some implementations, a magnitude of a force exerted on a workpiece received between the working portion of the first jaw and the working portion of the second jaw is varied based on the rotational position of the mounting pin in the opening in the first side portion of the trunnion, the corresponding position of the cam follower mounted on the eccentric portion of the mounting pin, and the corresponding separation distance between the working portions of the first and second jaws.

In another general aspect, an accessory for a rotary power tool includes a rod extending along a longitudinal axis, the rod having an end portion configured to be coupled to an output mechanism of the rotary power tool, wherein the rod is configured to rotate about the longitudinal axis in response to operation of the power tool; a first jaw having a first working portion and coupled to a first guide portion; a second jaw having a second working portion facing the first working portion and coupled to a second guide portion facing the first guide portion, the first jaw being pivotable relative to the second jaw about a fulcrum oriented transverse to the longitudinal axis, between a fully open position and a fully closed position, the fulcrum disposed between the first working portion and the first guide portion; a trunnion operatively coupled to the rod and configured to move in a first axial direction along the rod in response to rotation of the rod in a first direction, and to move in a second axial direction along the rod, opposite the first axial direction, in response to rotation of the rod in a second direction; a first cam follower coupled to the trunnion and configured to engage a first cam surface coupled to the first guide portion to cause the first jaw to pivot in a first direction relative to the first jaw in response to movement of the trunnion in the first axial direction along the rod; a second cam follower coupled to the trunnion and configured to engage a second cam surface coupled to the first guide portion to cause the second jaw to pivot in a second direction relative to the first jaw in response to movement of the trunnion in the second axial direction along the rod.

In some implementations, the second guide portion includes a lip with the first cam surface defined along a peripheral face of the lip that faces toward the rod and the second cam surface is formed on an inner face of the lip that faces away from the rod. In some implementations, rotation of the first jaw in the second direction, guided by the engagement of the second cam follower with the second cam surface, causes a working area defined between the first jaw and the second jaw to move from the fully closed position toward the open position. In some implementations, rotation of the first jaw in the first direction relative to the first jaw, guided by the engagement of the first cam follower with the first cam surface, causes the working area defined between the first jaw and the second jaw to move from the fully open position toward the fully closed position.

In another general aspect, an accessory for a rotary power tool includes a rod between a first set of jack arms and a second set of jack arms, the rod having an end portion configured to be coupled to an output mechanism of the rotary power tool, wherein the rod is configured to rotate about a longitudinal axis in response to operation of the power tool. A first end portion of the first set of jack arms and a first end portion of the second set of jack arms may be pivotably coupled to the rod via a first cross bar, and a second end portion of the second set of jack arms and a second end portion of the second set of jack arms may be pivotably coupled to the rod via a second cross bar. The accessory also includes a first jaw coupled to coupling portions at the second end portion of the first set of jack arms and the second end portion of the second set of jack arms; a second jaw coupled to coupling portions at the second end portion of the first set of jack arms and the second end portion of the second set of jack arms, the second jaw being rotatable relative to the first jaw between a fully open position and a fully closed position of the first jaw and the second jaw; a threaded opening formed in the first cross bar, wherein the rod extends through the threaded opening such that the first cross bar is configured to move axially along the rod in response to rotation of the rod and an angular position of adjacent jack arms of the first and second sets of jack arms are configured to change in response to axial movement of the first cross bar along the rod; and an adjustment mechanism configured to adjust an angular orientation between adjacent arms of the first and second sets of jack arms, so as to adjust a corresponding separation distance between a working portion of the first jaw and a working portion of the second jaw, including: a first cylinder portion and a second cylinder portion positioned on the rod, between the first cross bar and the second cross bar, wherein the second cylinder portion is axially movable and rotatable relative to the first cylinder portion so as to adjust an axial length of the adjustment mechanism on the rod. In response to rotation of the rod in a first direction, a threaded portion of the first cross bar may be engaged with a threaded portion of the rod to move the first cross bar and the respective first end portions of the first and second sets of jack arms in a first axial direction along the rod, and the second jaw may rotate in a first direction relative to first jaw.

In another general aspect, an accessory for a rotary power tool includes a rod positioned between a first set of jack arms and a second set of jack arms, the rod having an end portion configured to be coupled to an output mechanism of the rotary power tool, wherein the rod is configured to rotate about a longitudinal axis in response to operation of the power tool, wherein the first set of jack arms and the second set of jack arms each includes a first end portion pivotably coupled to the rod via a first cross bar; and second end portion pivotably coupled to the rod via a second cross bar; a second coupling portion extending from the second end portion and configured to be coupled to a second jaw of the accessory tool; a coupling mechanism configured to detachably couple an accessory tool to the first set of jack arms and the second set of jack arms, the coupling mechanism including: a first coupling portion extending from at the second end portion of the first set of jack arms and from the second end portion of the second set of jack arms and configured to be detachably coupled with a first jaw of the accessory tool; a second coupling portion extending from the second end portion of the first set of jack arms and from the second end portion of the second set of jack arms and configured to be detachably coupled with a second jaw of the accessory tool; a first pin removably insertable through an opening in the first coupling portion of the first set of jack arms, through a corresponding opening in the first jaw, and into a corresponding opening in the first coupling portion of the second set of jack arms to detachably couple the first and second sets of jack arms to the first jaw; and a second pin removably insertable through an opening in the second coupling portion of the first set of jack arms, through a corresponding opening in the second jaw, and into a corresponding opening in the second coupling portion of the second set of jack arms to detachably couple the first and second sets of jack arms to the second jaw.

In another general aspect, an accessory for a rotary power tool includes a rod extending along a longitudinal axis, the rod having an end portion configured to be coupled to an output mechanism of the rotary power tool and a threaded portion, wherein the rod is configured to rotate about the longitudinal axis in response to operation of the power tool; a first jaw having a first working portion and coupled to a first arm portion; a second jaw having a second working portion facing the first working portion and coupled to a second arm portion; a trunnion operatively coupled to the rod and to the first arm portion, the trunnion configured to move in a first axial direction along the rod in response to rotation of the rod in a first direction to cause the first jaw to pivot toward the second jaw, and to move in a second axial direction along the rod, opposite the first axial direction, in response to rotation of the rod in a second direction to cause the first jaw to pivot away from the first jaw; an adjustment mechanism configured to adjust a separation distance or a clamping force between the first working portion of the first jaw and the second working portion of the second jaw, the adjustment mechanism including a sleeve portion with an adjustable axial length that limits axial travel of the trunnion along the rod, wherein the axial length corresponds to the separation distance or the clamping force.

In another general aspect, an accessory for a rotary power tool includes a rod extending along a longitudinal axis, the rod having an end portion configured to be coupled to an output mechanism of the rotary power tool and a threaded portion, wherein the rod is configured to rotate about the longitudinal axis in response to operation of the power tool; a first arm portion and a second arm portion, the first arm portion being pivotable relative to the second arm portion; a trunnion operatively coupled to the rod and configured to move in a first axial direction along the rod in response to rotation of the rod in a first direction; and a first set of jaws and a second set of jaws interchangeably couplable to the first and second arm portions. The first set of jaws may include a first jaw removably couplable to the first arm and a second jaw removably couplable to the second arm, the first jaw configured to pivot toward the second jaw to perform a clamping operation on a first workpiece upon rotation of the rod in the first direction, and the first set of jaws may include a third jaw removably couplable to the first arm and a fourth jaw removably couplable to the second arm, the third jaw configured to pivot toward the first jaw to perform a crimping operation on a second workpiece upon rotation of the rod in the first direction.

The details of one or more implementations are set forth in the accompanying drawings and the description below. Other features will be apparent from the description and drawings, and from the claims.

DETAILED DESCRIPTION

A crimping accessory and/or a pinching accessory, in accordance with implementations described herein, can be coupled to a rotary-driven power tool, such a drill, a drill/ driver, an impact driver, and the like, to facilitate the coupling of piping and/or tubing and/or fittings through crimping and/or pinching of connection rings coupling the two elements. A crimping and/or pinching accessory, in accordance with implementations described herein, can apply a relatively great force on the connection ring to provide a secure, substantially leak proof coupling between the two elements to be coupled. A crimping and/or pinching accessory, in accordance with implementations described herein, can convert a rotational force from the power-driven tool to a clamping force exerted on the connection ring. A crimping and/or pinching accessory, in accordance with implementations described herein, may provide for application of a known clamping force on the connection ring, thus providing for an improved, higher integrity connection between the elements to be coupled. A crimping and/or pinching accessory, in accordance with implementations described herein, may reduce the time to complete a particular task involving the coupling of piping and/or tubing and/or fittings through crimping and/or pinching of connection rings. A crimping and/or pinching accessory, in accordance with implementations described herein, may allow such tasks to be accomplished in an automated, power-driven fashion, so as to reduce user fatigue.

Figure 1A:
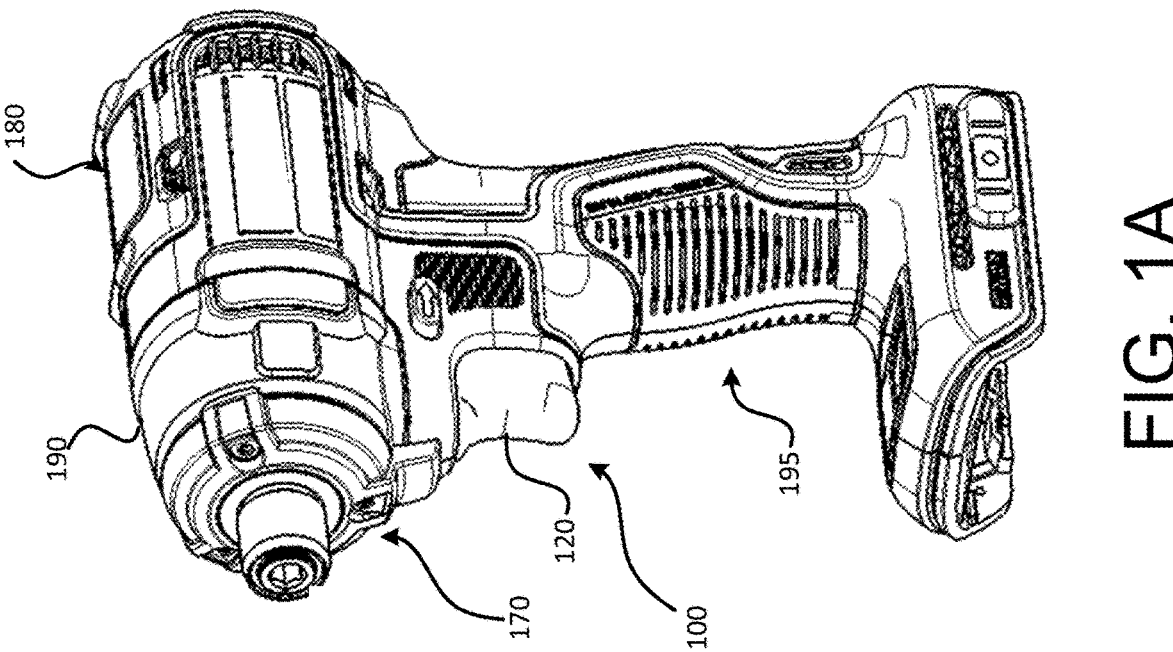
FIG. 1A is a side view of an example rotary power tool.

FIG. 1A is a side view of an example rotary power tool 100 in the form of an impact driver for use with crimping and/or pinching accessory. The example rotary power tool 100 includes a tool holder 170 (for example, a quick release tool bit holder) that provides for coupling of output tools and/or accessories, including a crimping and/or pinching accessory in accordance with implementations described herein, to an output mechanism of the example rotary power tool 100. The example rotary power tool 100 shown in FIG. 1A includes a housing 190, in which components such as, for example, a motor, a transmission, the output mechanism (not shown in FIG. 1A) and the like are housed. In this example, in which the rotary power tool 100 is an impact driver, a rotary impact mechanism, or Pott-style impact mechanism (not shown) may be included in the housing 190. When a torque on the output tool and/or accessory coupled to the output mechanism via the tool holder 170 is less than a threshold, the transmission and rotary impact mechanism may transmit continuous rotational torque to the output tool and/or accessory coupled to the tool holder 170. When a torque on the output mechanism exceeds the threshold, the transmission and impact mechanism may transmit an intermittent rotary impact force, generated by the impact mechanism, to the output tool and/or accessory coupled at the tool holder 170 to perform an operation on a workpiece. In some examples, the tool holder 170 may include a quick-release hex receptacle provided at an end portion of the housing 190, corresponding to a working end of the example rotary power tool 100.

In some examples, the transmission and rotary impact mechanism transmit torque generated by the motor to the output tool and/or accessory coupled at the tool holder 170 via the output mechanism, to drive the output tool and/or accessory coupled at the tool holder 170 to perform an operation on a workpiece. The tool holder 170 is provided at an end portion of the housing 190, corresponding to a working end of the example rotary power tool 100. A trigger 120 for triggering operation of the example rotary power tool 100 is provided at a handle portion 195 of the housing 190. One or more selection devices 180 accessible to a user at the outside of the housing 190 provide for user control of the example rotary power tool 100. For example, the one or more selection devices 180 can be manipulated by the user to turn the tool 100 on and off, to set an operation mode, to set an operational speed, an operational direction and the like.

Figure 1B:
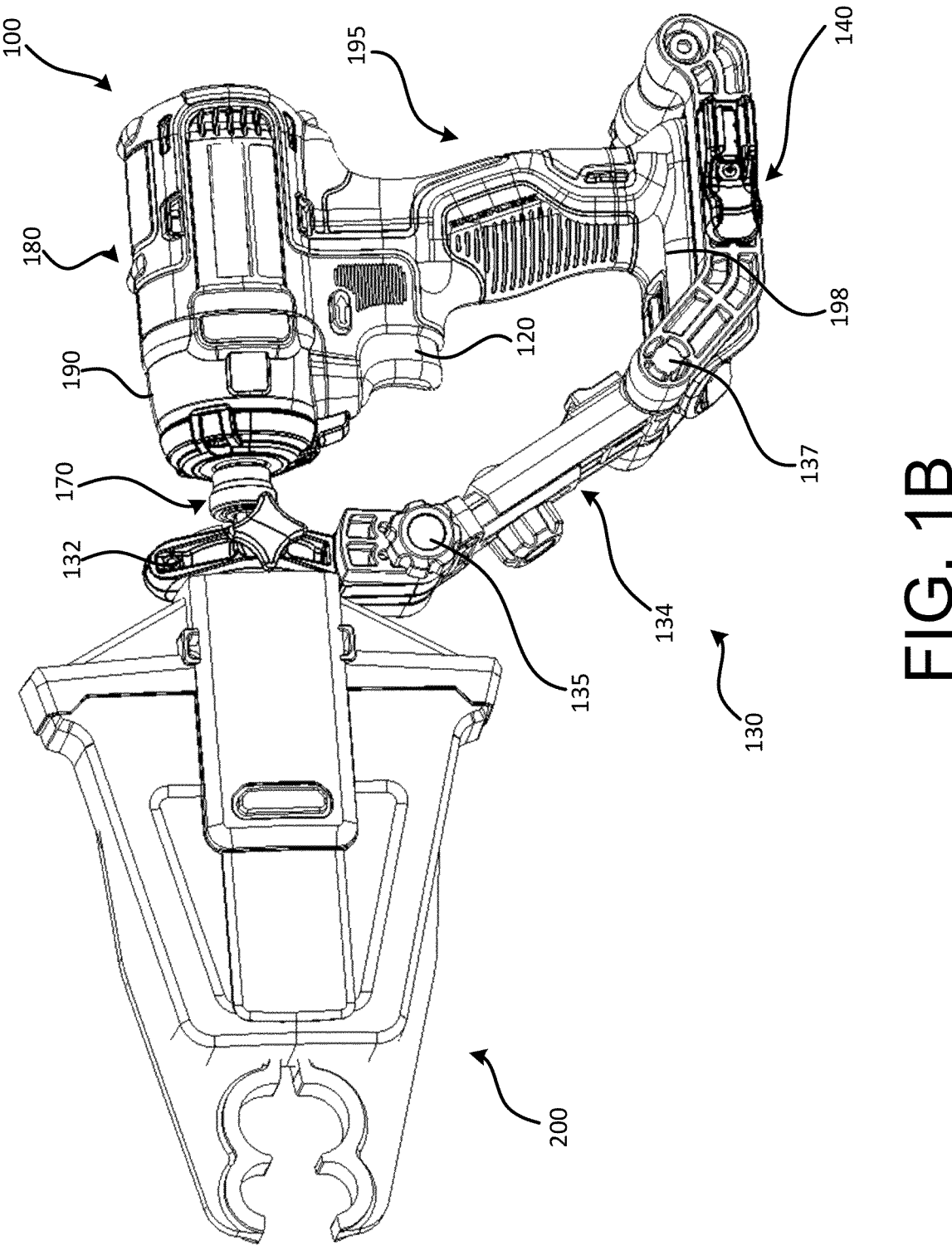
FIGS. 1B-1E illustrate the coupling of accessory tools to the example rotary power tool shown in FIG. 1A.
Figure 1C:
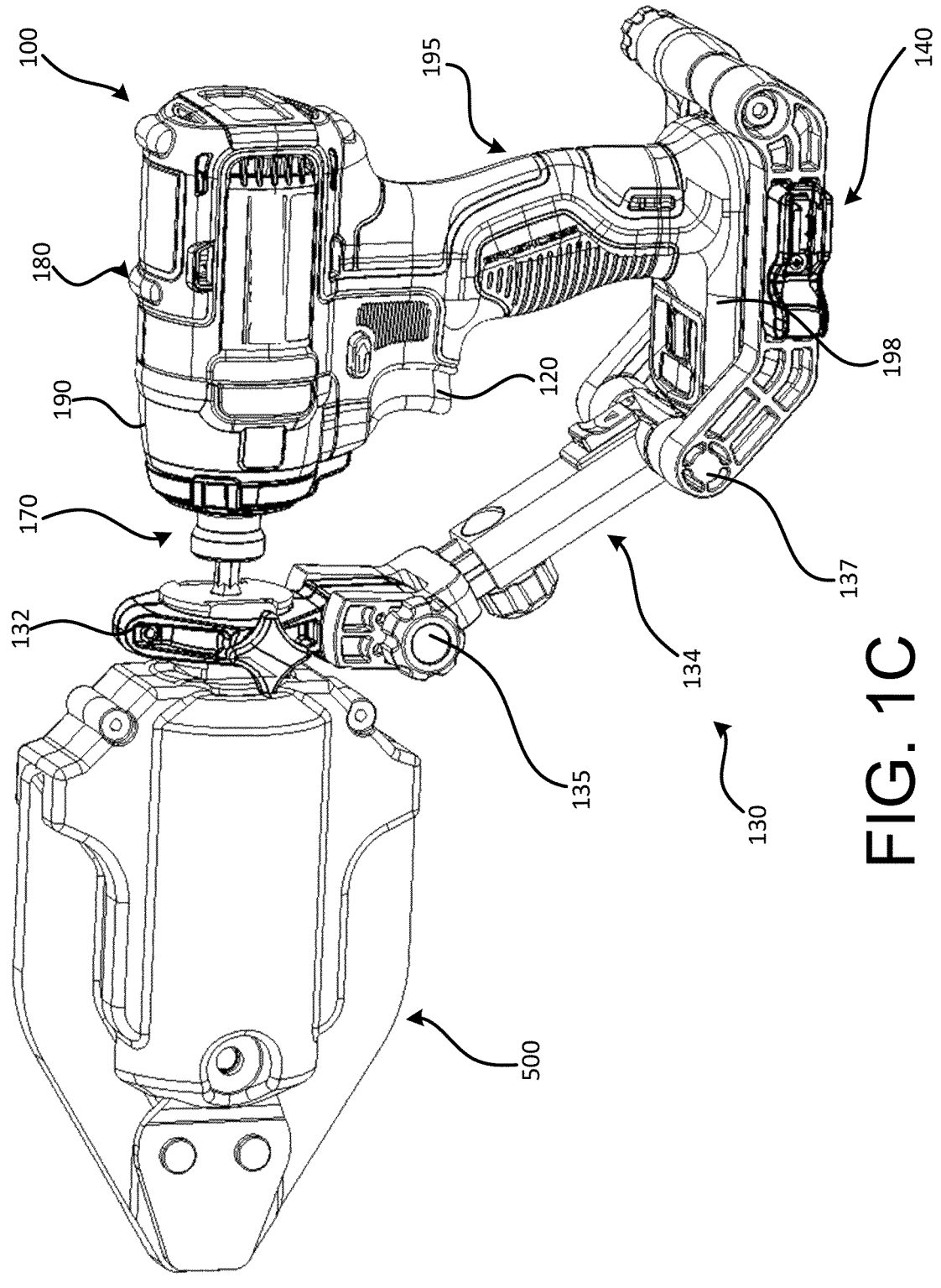
Figure 1D:
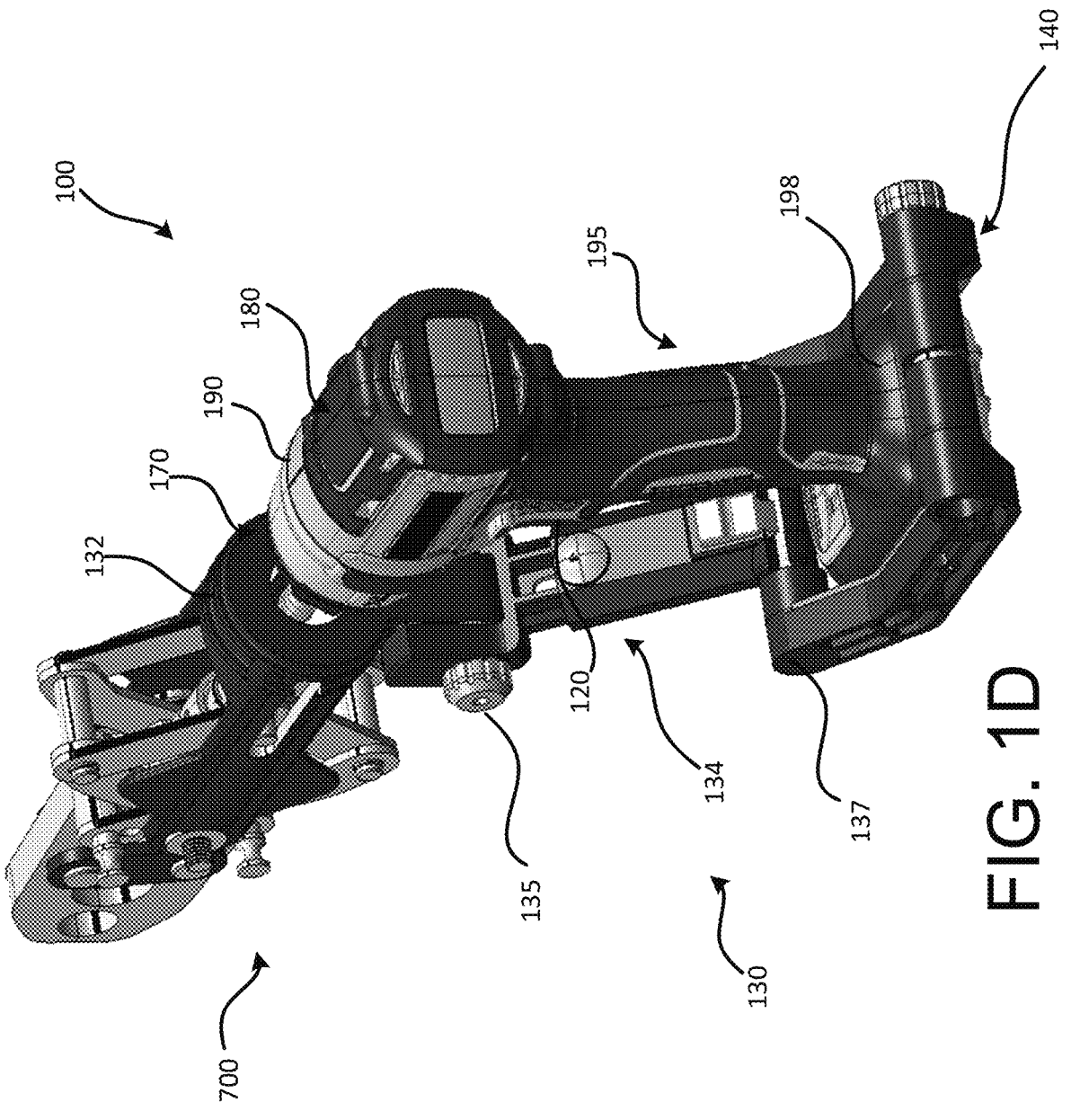
Figure 1E:
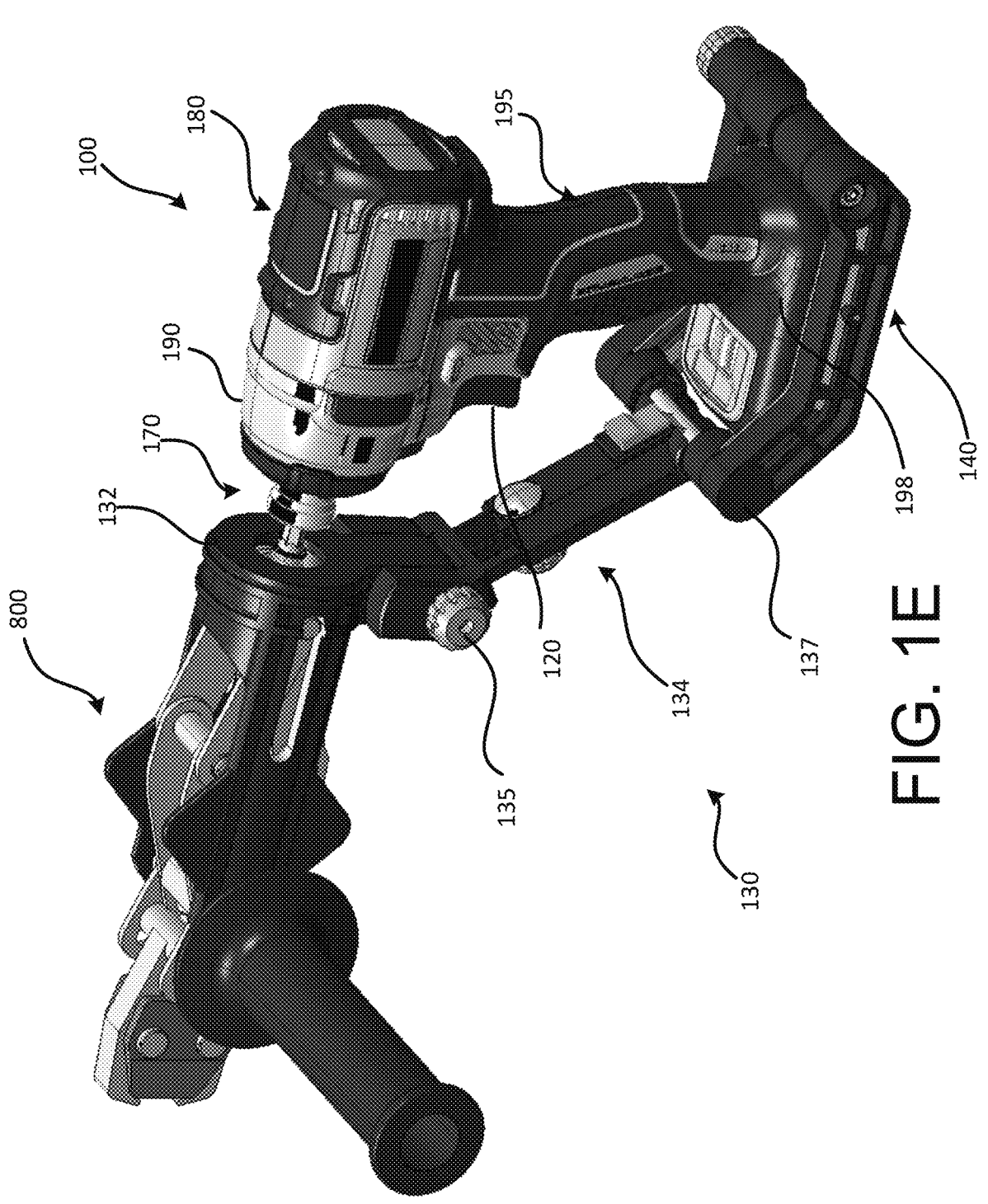

FIGS. 1B-1E are side perspective views illustrating the coupling of example accessory tools to the example rotary power tool 100. In particular, FIG. 1B illustrates the coupling of an example crimping accessory 200 to the example rotary power tool 100. FIG. 1C illustrates the coupling of an example pinching accessory 500 to the example rotary power tool 100. FIG. 1D illustrates the coupling of an example crimping accessory 700 to the example rotary power tool 100. FIG. 1E illustrates the coupling of an example pinching accessory 800 to the example rotary power tool 100.

The examples shown in FIGS. 1B-1E include an angled brace assembly 130, similar to one of the braces described and shown in commonly-owned U.S. application Ser. No. 17/658,276, filed Apr. 7, 2022, titled "Power Tool Accessory System with Brace," the disclosure of which is incorporated by reference herein in its entirety. The brace assembly 130 is illustrated in FIG. 1B, simply for purposes of discussion and illustration. Any of the brace assemblies described in the aforementioned patent application may be applicable.

The example brace assembly 130 may include a clamping assembly 140 configured to be removably and rigidly attached to a base portion 198 of the handle portion 195 of the housing 190. A collar 132 is configured to be coupled to a corresponding end portion of an accessory tool, such as, for example, a crimping accessory and/or a pinching accessory as described herein. An arm assembly 134 has a first end portion 135 pivotally coupled to the collar 132 and an opposite second end portion 137 coupled to the clamping assembly 140. FIGS. 1B-1E illustrate the brace assembly 130 coupled to the example rotary power tool 100 via the clamping assembly 140, and the collar 132 coupled between the first end portion 135 of the arm assembly 134 and the example accessory tool. Further details of the example brace assembly 130, and other brace assemblies, may be found in the aforementioned patent application.

FIGS. 2A-2F present various views of an example crimping accessory 200, that can be coupled to a rotary power tool such as the example rotary power tool 100 shown in FIG. 1A, in accordance with implementations described herein.

Figure 2A:
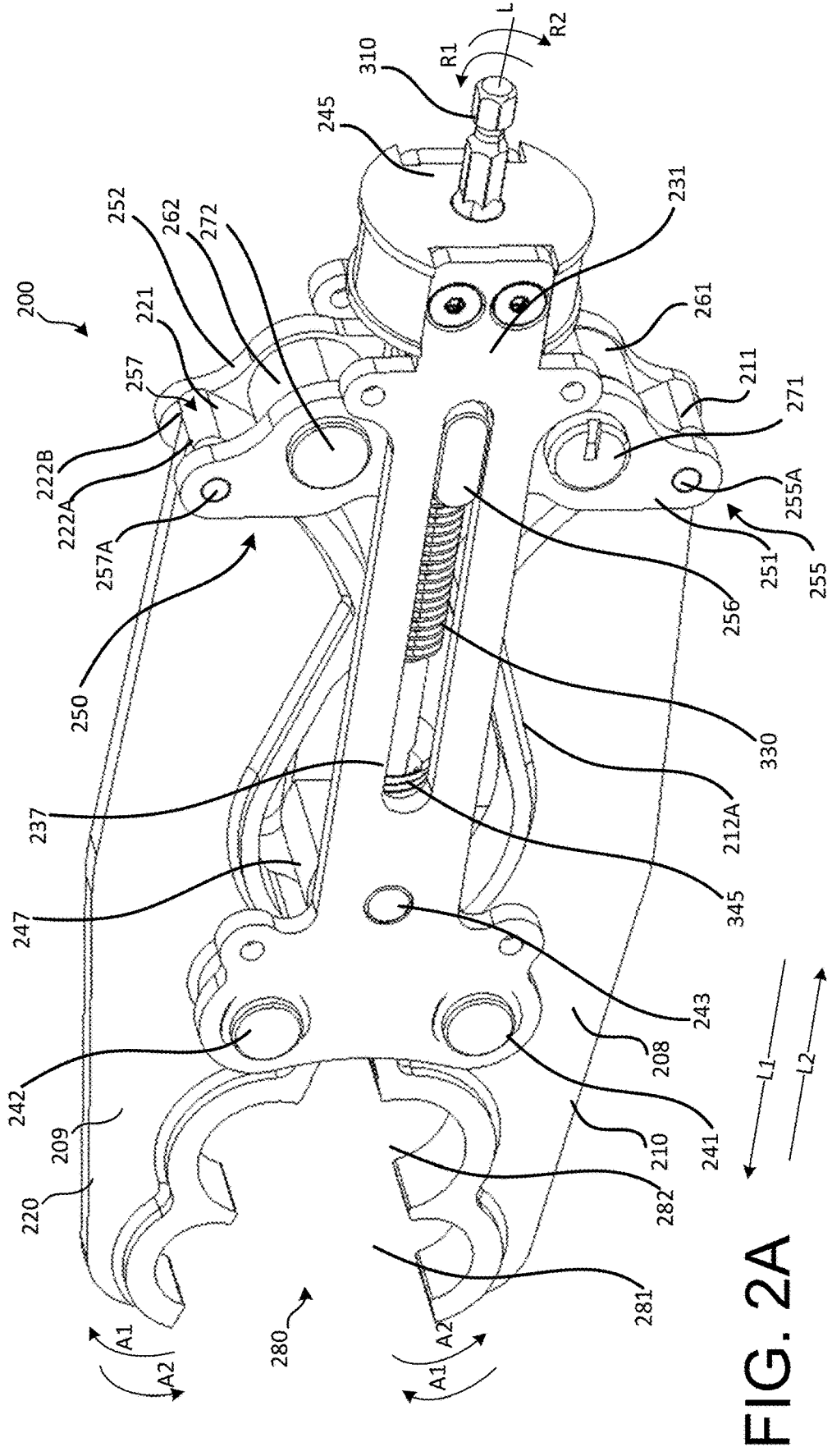
FIGS. 2A and 2B are perspective views of an example crimping accessory in an open state.
Figure 2B:
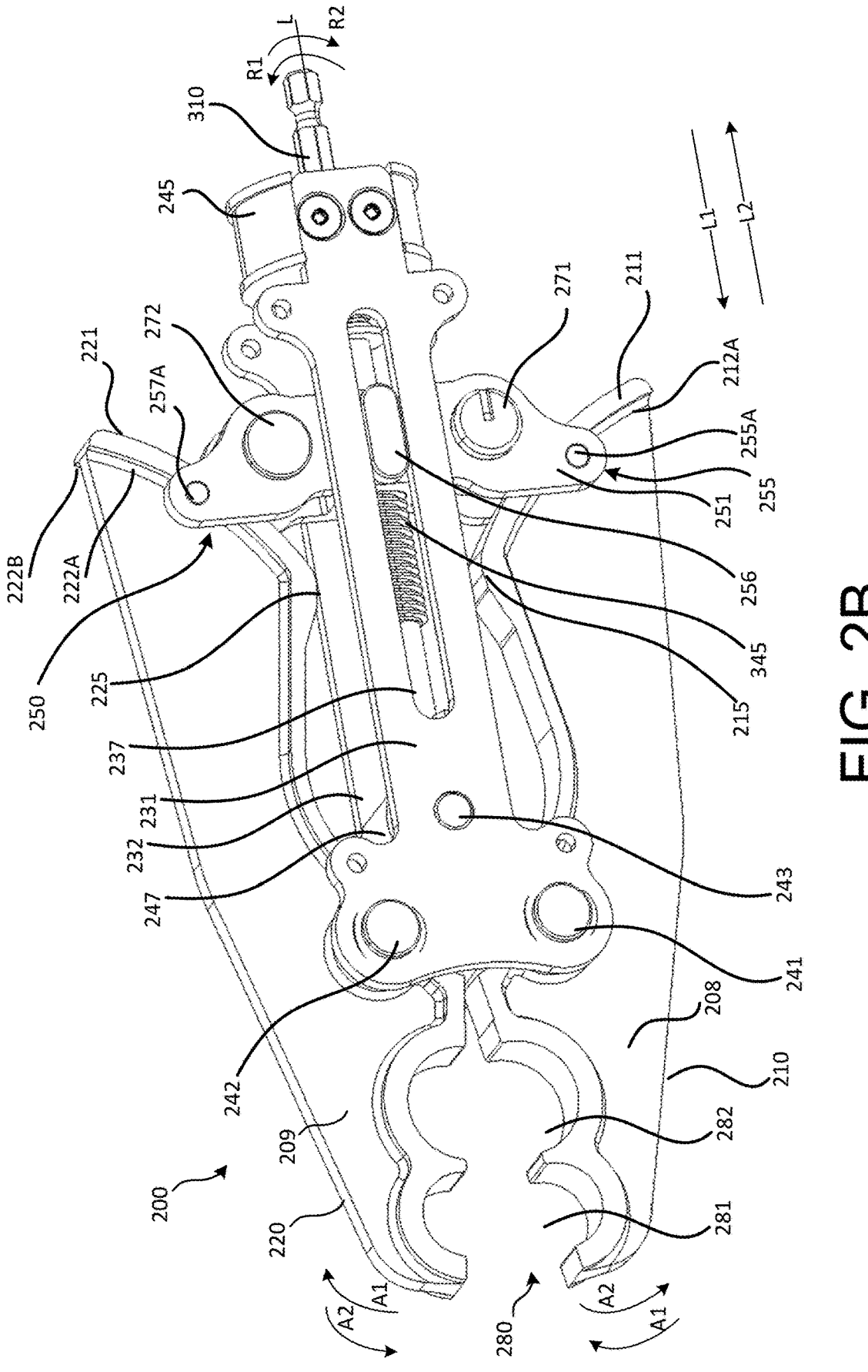
Figure 2C:
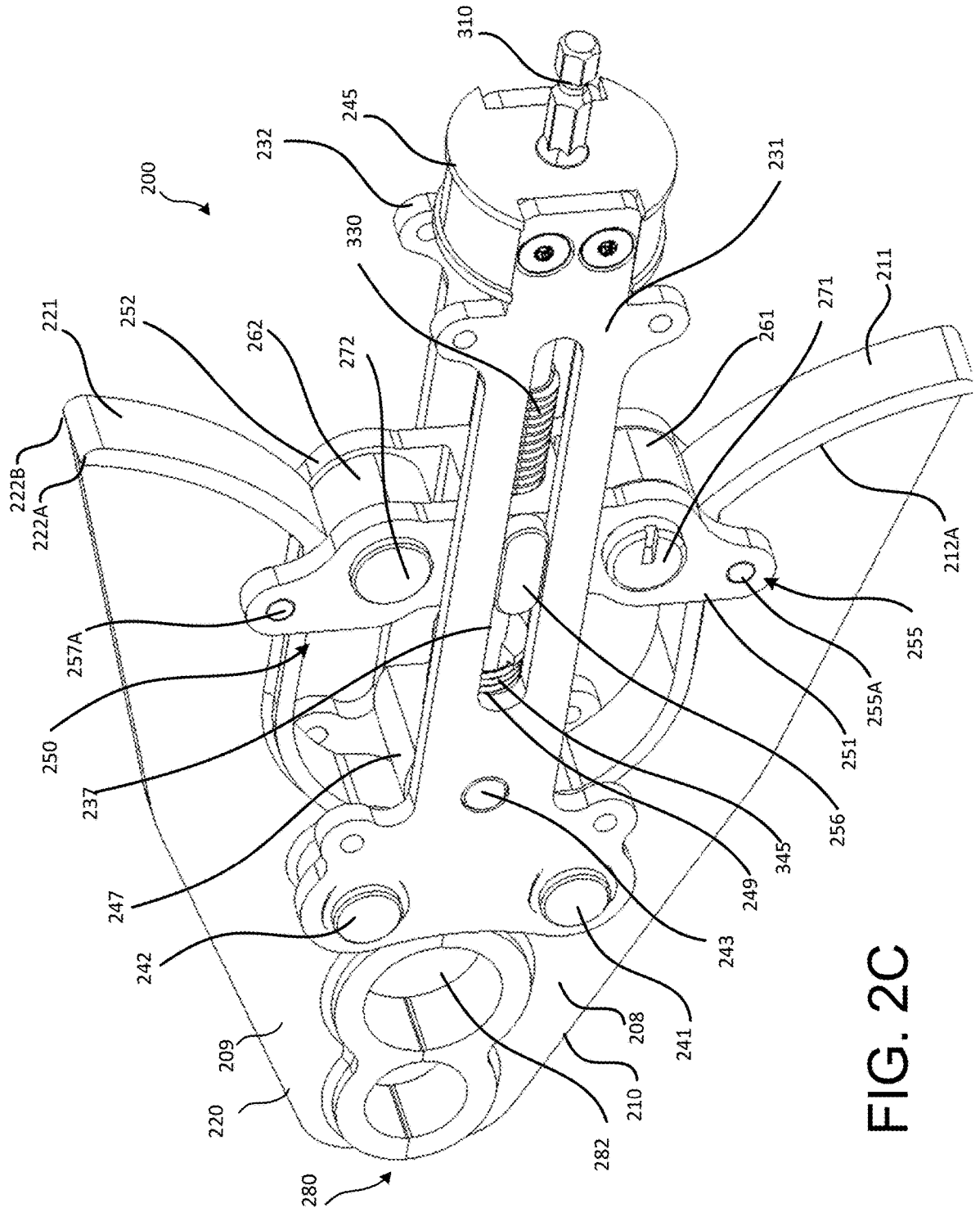
FIG. 2C is a perspective view of the example crimping accessory in a closed, or actuated state.
Figure 2D:
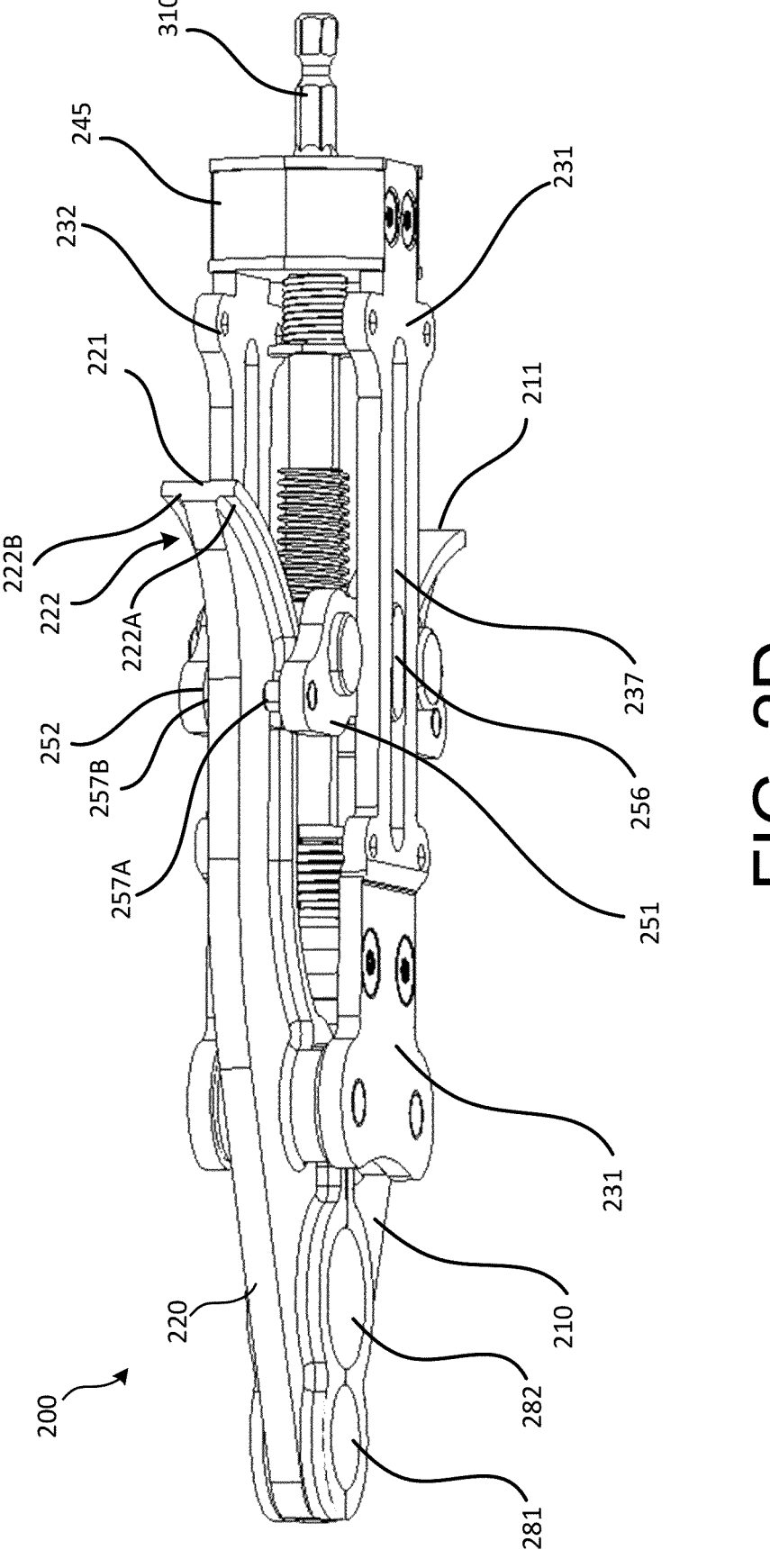
FIGS. 2D and 2E are isometric top views of the example crimping accessory in the actuated state.
Figure 2E:
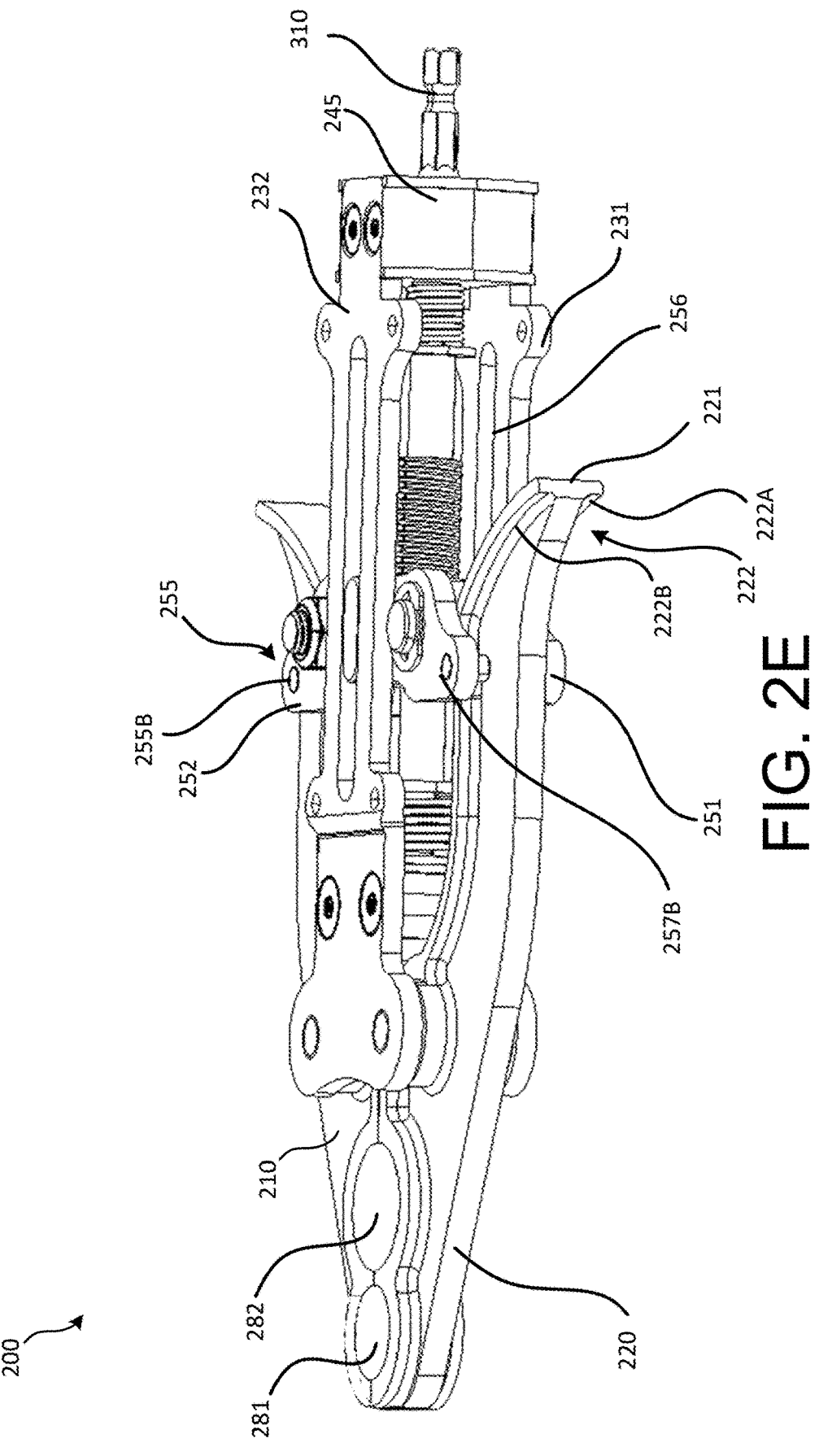
Figure 2F:
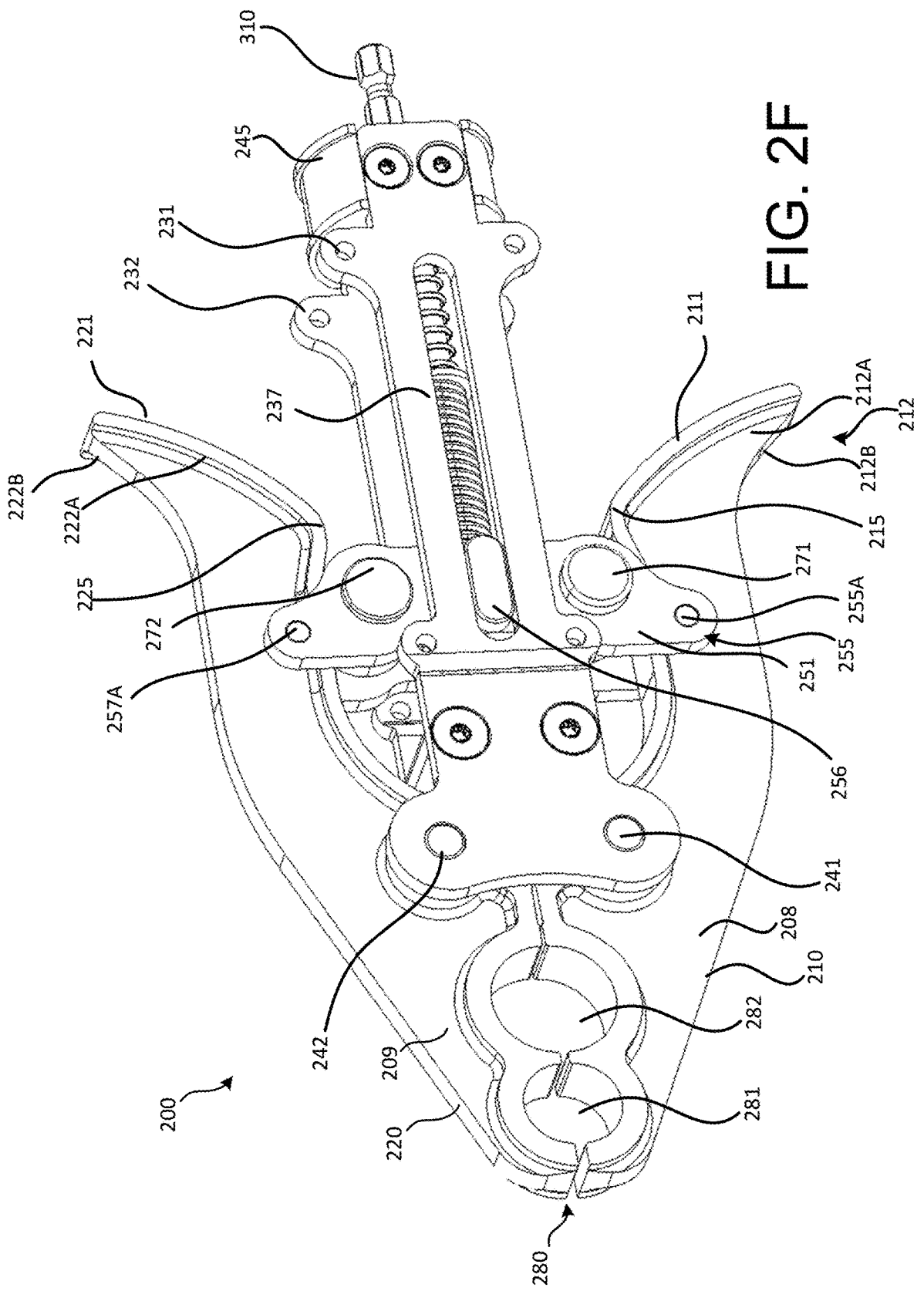
FIG. 2F is a perspective view of the example crimping accessory in a partially open state.
Figure 2G:
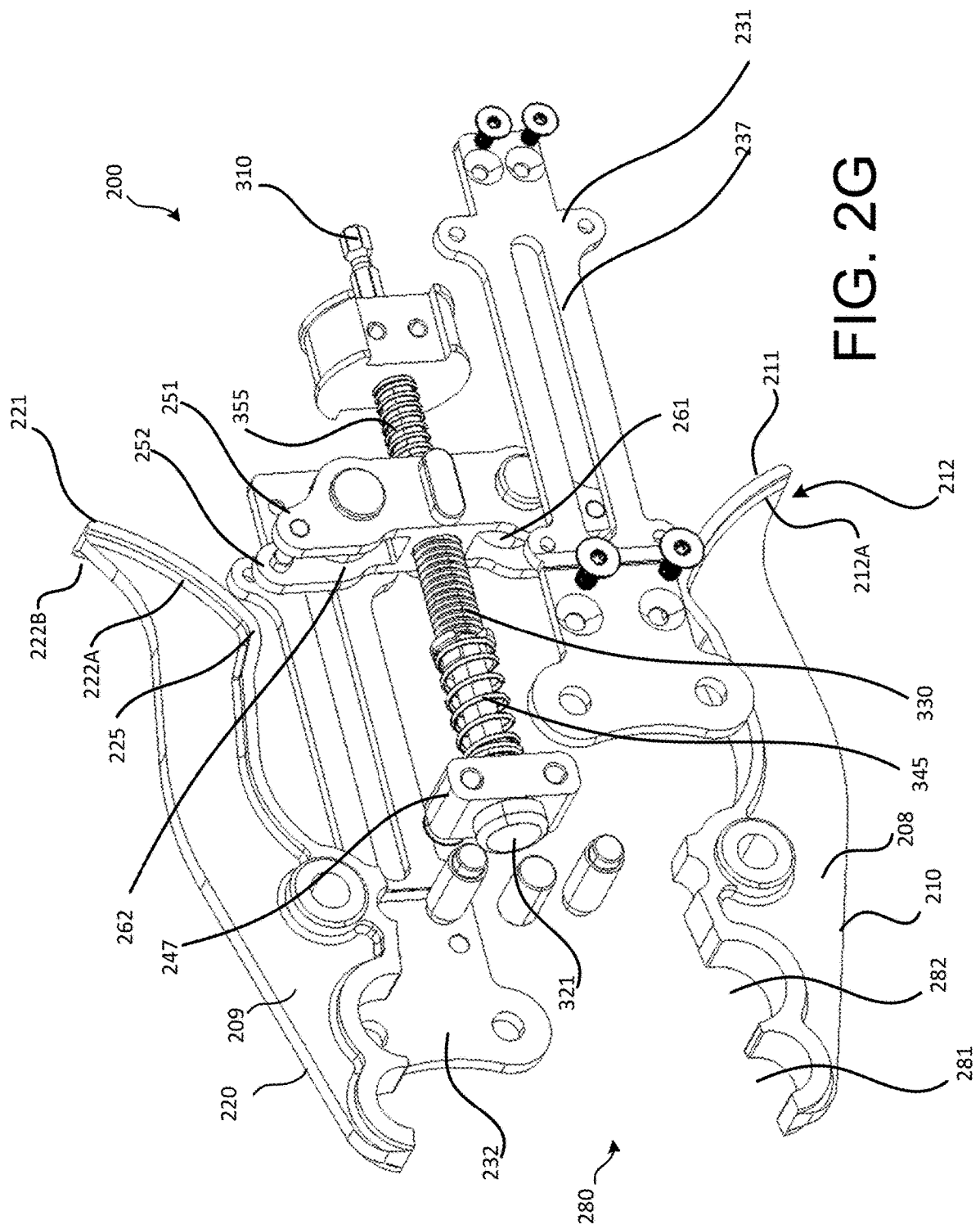
FIG. 2G is a partially exploded perspective view of the example crimping accessory.
Figure 3A:
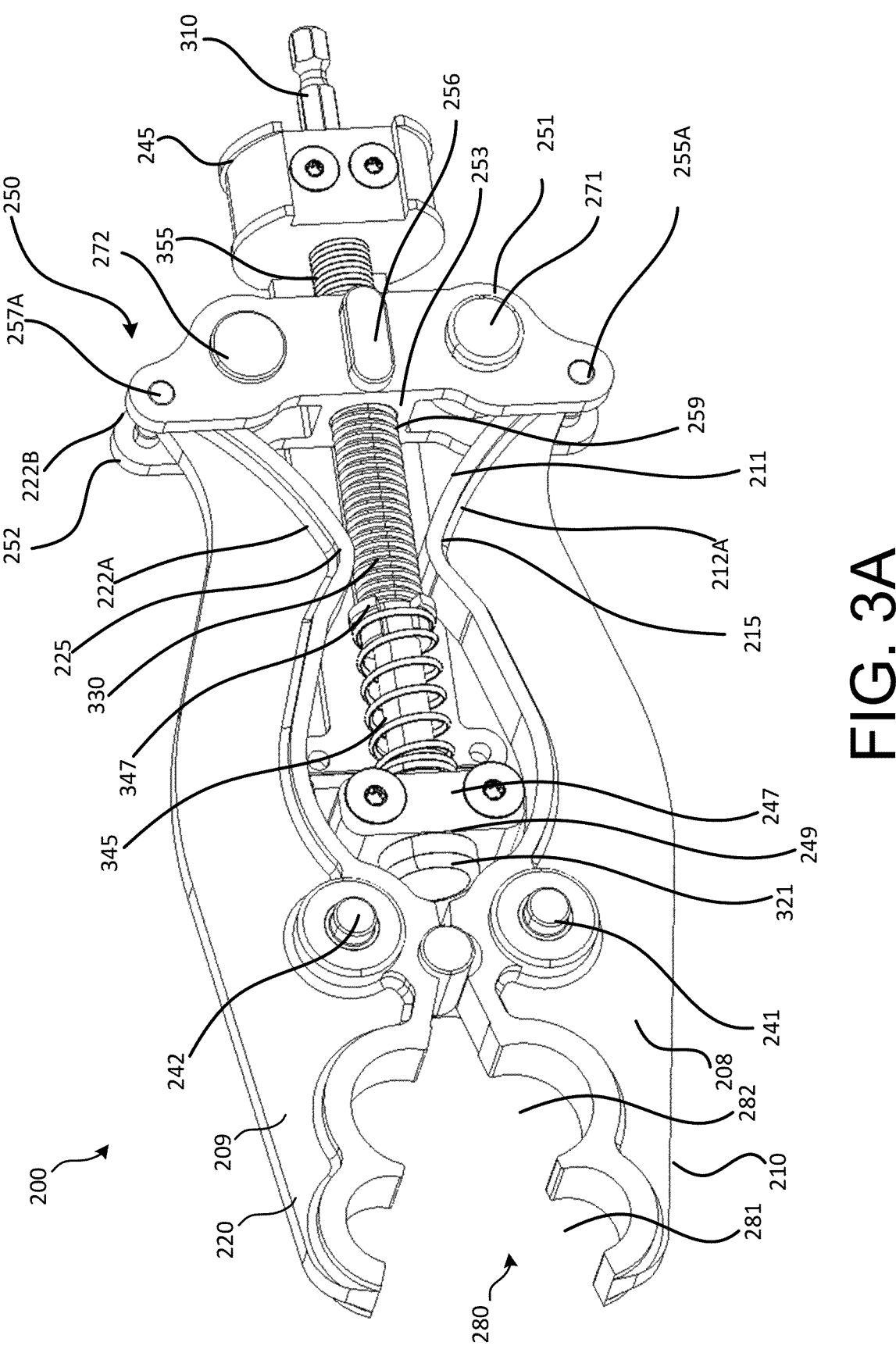
FIG. 3A is a perspective view of the example crimping accessory in the neutral state, with portions of an example actuation mechanism of the example crimping accessory shown in a transparent state
Figure 3B:
FIG. 3B is a perspective view of the example crimping accessory in the open state, with an example guide plate of the example crimping accessory removed.
Figure 3C:
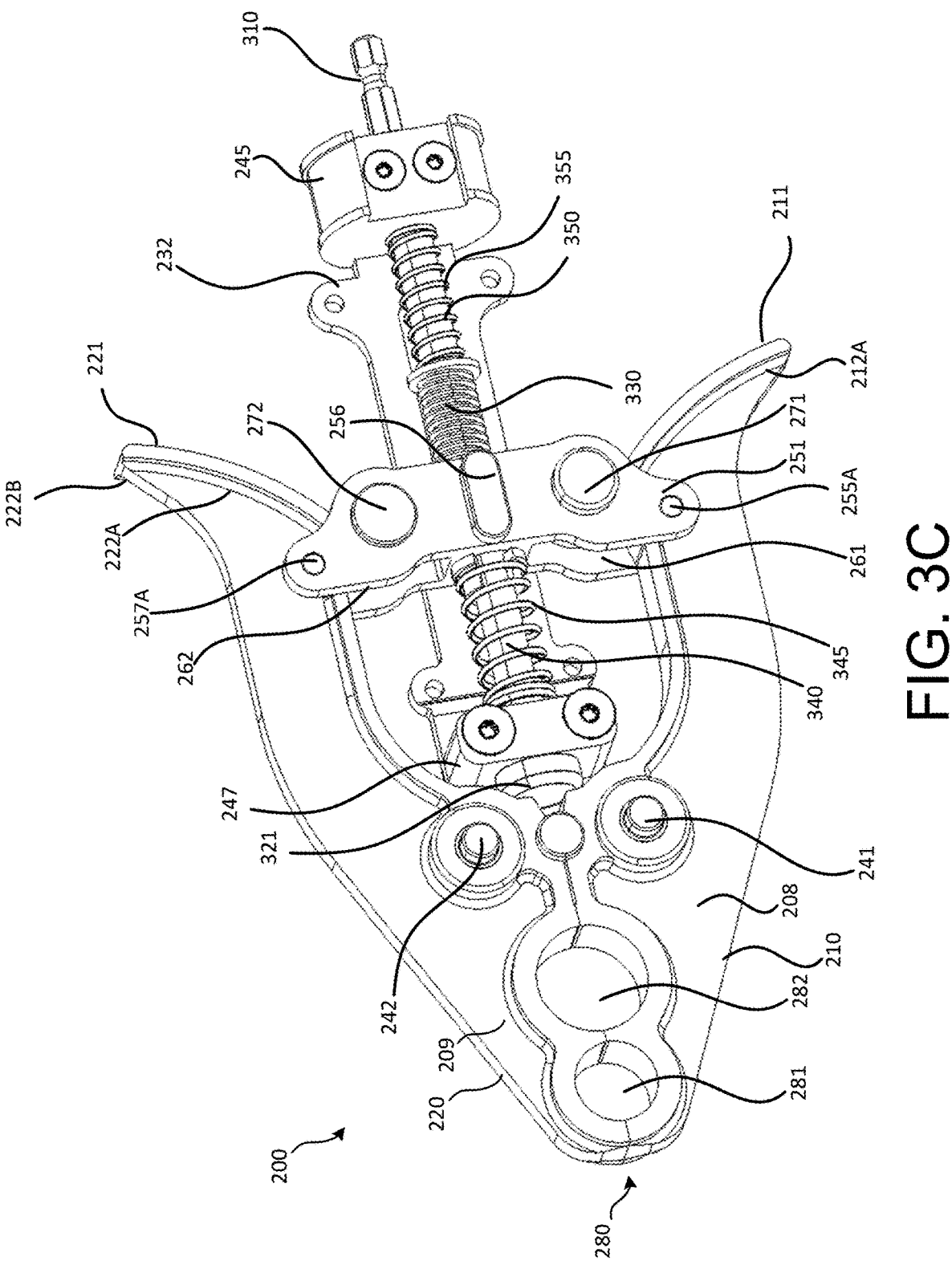
FIG. 3C is a perspective view of the example crimping accessory in the closed state, with the example guide plate removed.
Figure 3D:
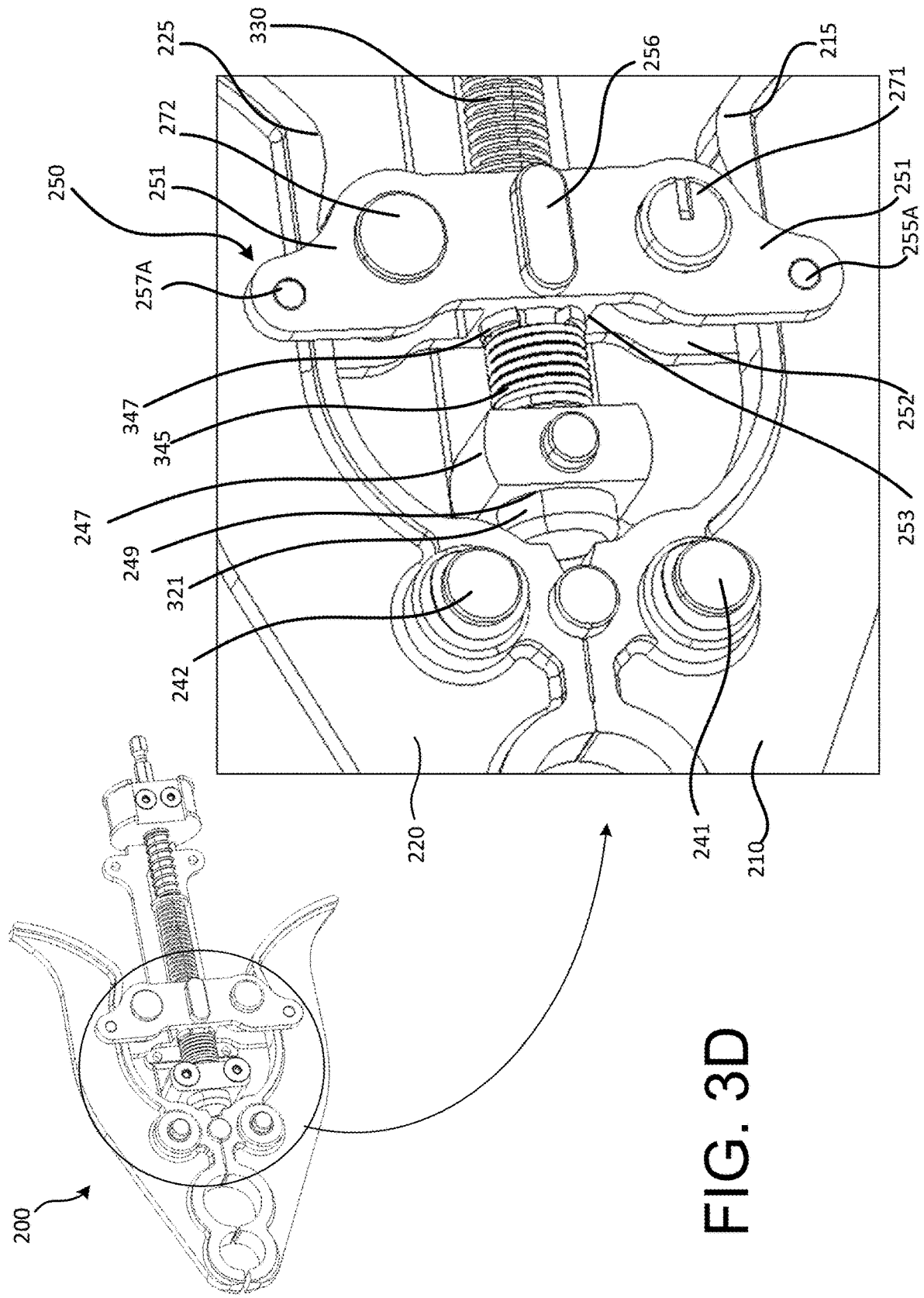
FIG. 3D is a perspective view of the example crimping accessory in the partially open state, with the example guide plate removed.
Figure 3E:
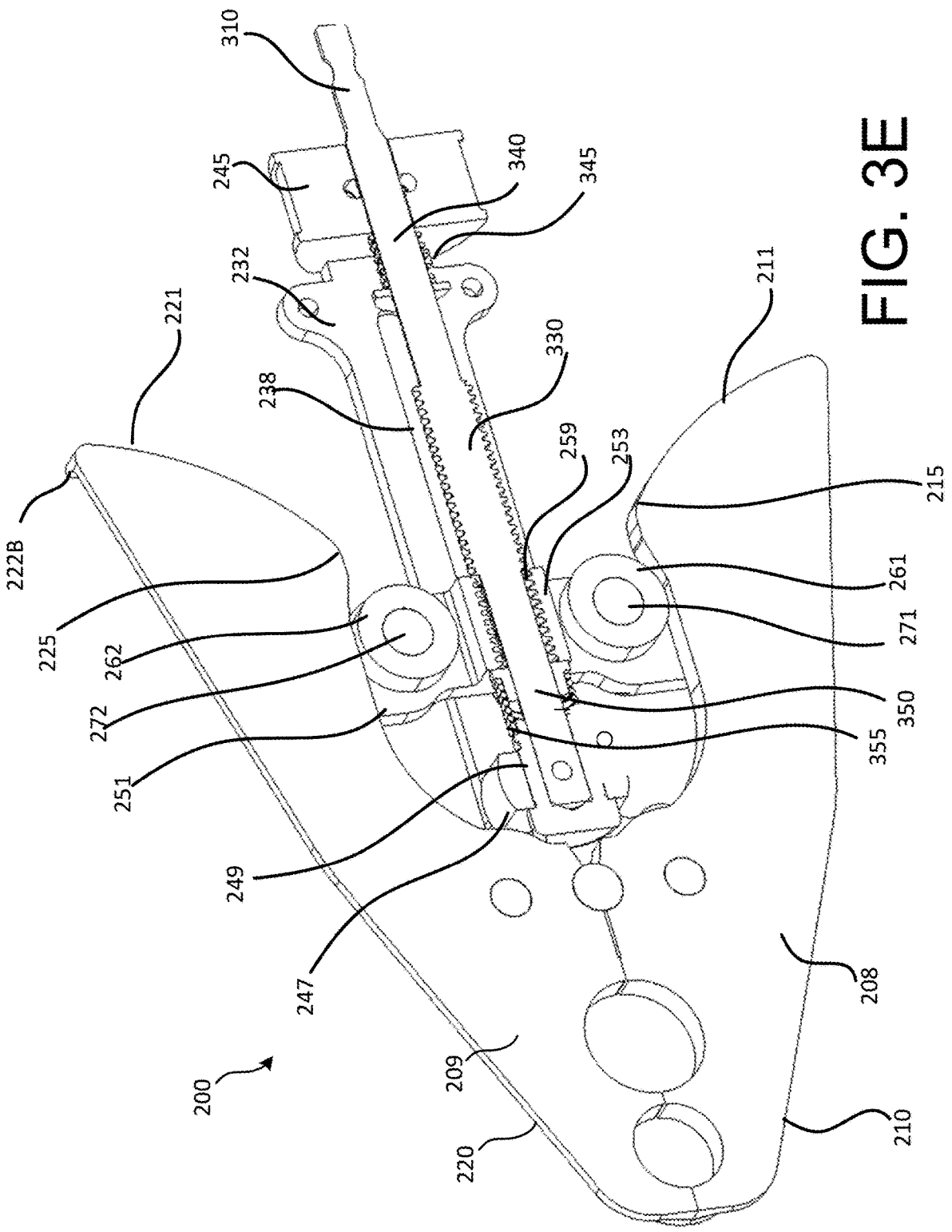
FIG. 3E is a cross-sectional view of the example crimping accessory in the actuated state.
Figure 3F:
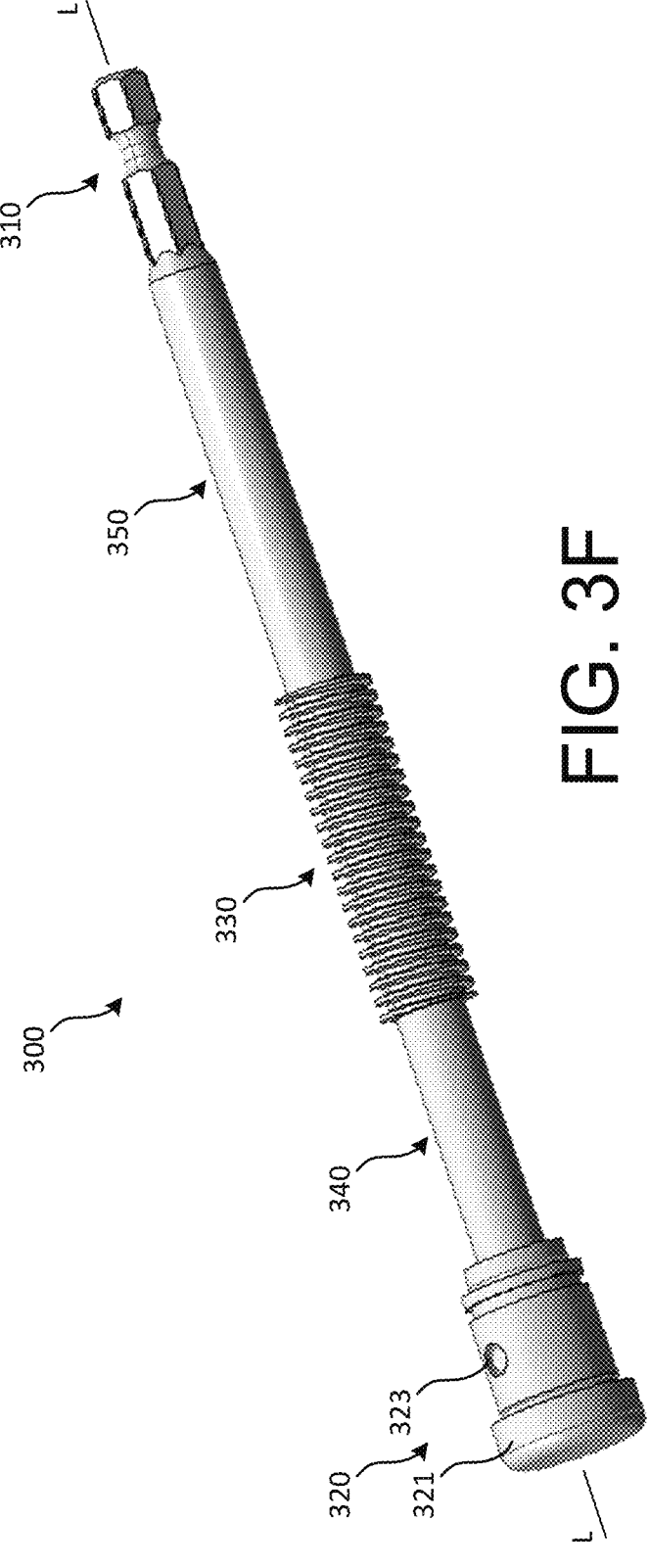
FIG. 3F is a perspective view of an example actuating rod of the example crimping accessory.

FIG. 2A is a perspective view of the example crimping accessory 200 in a neutral, or fully open state. FIG. 2B is a perspective view of the example crimping accessory 200 in the neutral, or fully open state, as movement is initiated toward an actuated, or fully closed state. FIG. 2C is a perspective view of the example crimping accessory 200 in the actuated or fully closed state. FIGS. 2D and 2E are isometric top views of the example crimping accessory 200 in the actuated state. FIG. 2F is a perspective view of the example crimping accessory in a partially open state, or a released state. FIG. 2G is a partially exploded perspective view of the example crimping accessory 200. FIG. 3A is a perspective view of the example crimping accessory 200 in the neutral, or fully open state, with a first guide plate 231 of a guide assembly removed so that internal components of the example crimping accessory 200 are more easily visible. FIG. 3B is a perspective view of the example crimping accessory 200 in the neutral state, as movement is initiated toward the actuated, fully closed state. In FIG. 3B, portions of an actuation mechanism of the example crimping accessory 200 are shown as transparent, so that interaction of components of the actuation mechanism are more easily visible. FIG. 3C is a perspective view of the example crimping accessory in the actuated, or fully closed state, with the first guide plate 231 removed so that internal components of the example crimping accessory 200 are more easily visible. FIG. 3D is a perspective view of the example crimping accessory 200 in the partially open, or released state, with the first guide plate removed. FIG. 3E is a cross-sectional view of the example crimping accessory 200 in the actuated state. FIG. 3F is a perspective view of an example actuating rod 300 of the example actuating mechanism of the example crimping accessory 200.

As shown in FIGS. 2A-3F, the example crimping accessory 200 may include a first jaw 210 and a second jaw 220 that are pivotably, or rotatably, coupled via a guide assembly including a first guide plate 231 and a second guide plate 232. The first jaw 210 includes a first arm portion 208 and the second jaw 220 includes a second arm portion 209. In the illustrated embodiment, the arm portions 208, 209 are integrally formed as part of the jaws 210, 220. In other embodiments, the arm portions may be separate elements from the jaws, and the jaws may be removably and/or movably coupled to the arm portions. A first end portion of the first guide plate 231 and a first end portion of the second guide plate 232 may be coupled, for example, fixedly coupled, to a fitting 245. The fitting 245 may provide for coupling of the example crimping accessory 200 to a power driven tool, such as, for example, to the example tool holder 170 and/or brace assembly 130 of the example rotary power tool 100 described above. A second end portion of the first guide plate 231 and a second end portion of the second guide plate 232 may be coupled, for example, rotatably coupled to the first jaw 210 and the second jaw 220. In particular, a first pivot pin 241 may couple, for example, pivotably couple, the first guide plate 231 and the first jaw 210. A second pivot pin 242 may couple, for example pivotably couple, the first guide plate 231 to the second jaw 220. In some examples, the first pivot pin 241 may extend through the first guide plate 231 and out through the first jaw 210 and into the second guide plate 232 to also couple, for example, pivotably couple, the first jaw 210 and the second guide plate 232. Thus, the first pivot pin 241 may define a fulcrum about which the first jaw 210 rotates relative to the first and second guide plates 231, 232 and/or relative to the second jaw 220. In some examples, the second pivot pin 242 may extend through the first guide plate 231 and out through the second jaw 220 and into the second guide plate 232 to couple, for example, pivotably couple the second guide plate 232 and the second jaw 220 by the second pivot pin 242. Thus, the second pivot pin 242 may define a fulcrum about which the second jaw 220 rotates relative to the first and second guide plates 231, 232 and/or relative to the first jaw 210.

Pivotal coupling of the first jaw 210 and the second jaw 220 in this manner allow the example crimping accessory 200 to move between the open state, or neutral state shown in FIGS. 2A and 2B, and the closed state, or actuated state, shown in FIG. 2C, and the partially open state, or released state, shown in FIG. 2F. A working area 280 of the example crimping accessory 200 is defined between a working portion of the first jaw 210 and a working portion of the second jaw 220. In the open state, or neutral state, the working area 280 defined between the first and second jaws 210, 220 is open, providing for insertion of a workpiece, including, for example, tubing and/or piping and/or fittings and the associated crimping ring(s) between the first and second jaws 210, 220. In the fully closed state, or the actuated state shown in FIG. 2C, the working area 280 defined between the first and second jaws 210, 220 is closed around the workpiece, so that a force can be applied to a crimping ring to couple the elements of the workpiece received in the working area 280. In the partially open state, or released state shown in FIG. 2F, the working area 280 defined between the first and second jaws 210, 220 is partially opened to allow for release of the workpiece. In the example shown in FIGS. 2A-2G, the working area 280 includes a first section 281 that can accommodate a first size and/or configuration workpiece, i.e., a first size and/or configuration of tubing and/or piping and/or fittings and associated crimping ring(s), and a second section 282 that can accommodate a second size and/or configuration of workpiece, i.e., a second size and/or configuration of tubing and/or piping and/or fittings and associated crimping rings. The working area 280 defined between the working portion of the first jaw 210 and the working portion of the second jaw 220 can include more, or fewer sections, including other sizes and/or configurations and/or combinations thereof.

A trunnion 250, or a carrier, may be positioned on a rod 300, between the first guide plate 231 and the second guide plate 232 of the guide assembly. The trunnion 250 may be selectively engaged with a threaded portion 330 of the rod 300, such that a driving force generated by the example rotary power tool 100 and transmitted to the rod 300 causes the trunnion 250 to move longitudinally along the rod 300. In this example arrangement, the rod 300 extends longitudinally along an axis L, through the intermediate portion 253 of the trunnion 250, with a first end portion of the rod 300 extending through the fitting 245, and a second end portion of the rod 300 received in a support member 247. A coupling pin 243 extends through the first guide plate 231, through the support member 247, and out into the second guide plate 232 to fix a position of the support member 247 relative to the first and second guide plates 231, 232.

As shown in more detail in FIG. 3F, the rod 300 may include a coupling portion 310 at the first end portion of the rod 300. The coupling portion 310 may be configured to be coupled to a power driven tool. For example, the coupling portion 310 may be configured to be engaged with the example tool holder 170 of the example rotary power tool 100 described above. A rotational force generated by the example rotary power tool 100 may be transmitted to the example crimping accessory 200 via the coupling portion 310 of the rod 300. The rod 300 may include a support portion 320 formed at the second end portion of the rod 300. The support portion 320 may be received in an opening 249 in the support member 247. In some examples, the support portion 320 may include a head portion 321 positioned against an outer surface of the support member 247, and a shank portion 323 positioned in the opening 249 in the support member 247. The rod 300 may include a threaded portion 330 formed at an intermediate portion of the rod 300. The threaded portion 330 may be positioned between unthreaded portions of the rod 300, for example, between a first unthreaded portion 340 and a second unthreaded portion 350 of the rod 300. A first biasing member 345, in the form of a first compression spring, may be fitted on the first unthreaded portion 340 of the rod 300. A second biasing member 355, in the form of a second compression spring, may be fitted on the second unthreaded portion 350 of the rod 300.

In some examples, the opening in the intermediate portion 253 of the trunnion 250 includes a threaded portion 259. In some examples, the threaded portion 259 is defined by threads formed along an interior surface of the opening in the intermediate portion 253 of the trunnion 250. In some examples, the threaded portion 259 is defined in a nut or other component that is fixed in the intermediate portion 253 of the trunnion 250. The threaded portion 330 of the rod 300 may be selectively engaged with the threaded portion 259 of the trunnion 250. In an engaged arrangement of the threaded portion 330 of the rod 300 and the threaded portion 259 of the trunnion 250, rotation of the rod 300 in a first rotational direction R1 about the longitudinal axis L (in response to application of rotational force from the example rotary power tool 100 connected thereto via the coupling portion 310) may cause movement of the trunnion 250 along the rod 300 in the first longitudinal direction L1. Similarly, in an engaged arrangement of the threaded portion 330 of the rod 300 and the threaded portion 259 of the carrier, rotation of the rod 300 in a second rotational direction R2 about the longitudinal axis L may cause movement of the trunnion 250 along the rod in the second longitudinal direction L2.

A first cam follower in the form of a first roller 261 may be positioned in a first recessed area defined between a first side portion 251, a second side portion 252 and an intermediate portion 253 of the trunnion 250. A second cam follower in the form of a second roller 262 may be positioned in a second recessed area defined between the first side portion 251, the second side portion 252 and the intermediate portion 253 of the trunnion 250. The rod 300 may extend through the intermediate portion 253 of the trunnion 250. A first pin 271 extends through the first side portion 251 of the trunnion 250, through the first roller 261, and out into the second side portion 252 of the trunnion 250. This may allow the first roller 261 to rotate about the first pin 271 within the first recessed area of the trunnion 250. Similarly, a second pin 272 extends through the first side portion 251 of the trunnion 250, through the second roller 262, and out into the second side portion 252 of the trunnion 250. This may allow the second roller 262 to rotate about the second pin 272 within the second recessed area of the trunnion 250. In some examples, the first roller 261 may contact, and roll along, a first cam surface 211 on the first arm portion 208 of the first jaw 210 as the trunnion 250 moves longitudinally along the rod 300. In some examples, the first cam surface 211 is formed along a periphery of a guide portion on the first arm portion 208 of the first jaw 210. Similarly, the second roller 262 may contact, and roll along a second cam surface 221 on the second arm portion 209 of the second jaw 220 as the trunnion 250 moves longitudinally along the rod 300. In some examples, the first cam surface 221 is formed along a periphery of a guide portion of second arm portion 209 of the second jaw 210.

A pair of third cam followers in the form of first pins 255 (255A, 255B) may be provided at a first end portion of the first side portion 251 of the trunnion 250, and at a first end portion of the second side portion 252 of the trunnion 250. A pair of fourth cam followers in the form of second pins 257 (257A, 257B) may be provided at a second end portion of the first side portion 251 of the trunnion 250, and at a second end portion of the second side portion 252 of the trunnion 250. In some examples, the first pins 255A, 255B may contact and/or engage, and move along, respective portions of a second cam surface 212 of the first jaw 210 as the trunnion 250 moves longitudinally along the rod 300. That is, the pin 255A may contact and/or engage, and move along a first portion 212A of the second cam surface 212 of the first jaw 210, and the pin 255B may contact and/or engage, and move along a second portion 212B of the second cam surface 212 of the first jaw 210, as the trunnion 250 moves longitudinally along the rod 300. Similarly, the pin 257A may contact and/or engage, and move along a first portion 222A of the second cam surface 222 of the second jaw 220, and the pin 257B may contact and/or engage, and move along a second portion 222B of the second cam surface 222 of the second jaw 220, as the trunnion 250 moves longitudinally along the rod 300.

Thus, in this example arrangement, movement of the trunnion 250 in a first longitudinal direction L1 (in response to rotation of the rod 300 in the first direction R1 about the longitudinal axis L) may cause the first roller 261 to move along the first cam surface 211 of the first jaw 210, and the second roller 262 to move along the first cam surface 221 of the second jaw 220, guiding a rotational movement of the first jaw 210 in a first rotational direction A1 about the first pivot pin 241, and a rotational movement of the second jaw 220 in a second rotational direction A2 about the second pivot pin 242. Movement of the first jaw 210 in the first rotational direction A1 and the second jaw 220 the second rotational direction A2 may cause the example crimping accessory 200 to go from the open state, or the neutral state, shown in FIGS. 2A and 2B, to the closed state, or the actuated state shown in FIG. 2C. Continued movement of the trunnion in the first longitudinal direction L1 (in response to continued rotation of the rod 300 in the first direction R1 about the longitudinal axis L1) may cause the first roller 261 to continue to move along the first cam surface 211 of the first jaw 210 and the second roller to continue to move along the first cam surface 221 of the second jaw 220. The contours of the first cam surfaces 211, 221 at these portions of the first and second jaws 210, 220 cause a change in rotational direction of the first and second jaws 210, 220, causing the example crimping accessory 200 to go from the closed, or actuated state shown in FIG. 2C to the partially open state shown in FIG. 2F.

In this example, the first cam surface 211 may include a first, or rear section, a second, or intermediate section corresponding to a peak portion 215, and a third, or front section. Similarly, the second cam surface 221 may include a first, or rear section, a second, or intermediate section corresponding to a peak portion 225, and a third, or front section. Movement of the trunnion 250 in the first longitudinal direction L1 in this manner may cause the first roller 261 to move sequentially along the first/rear section and onto the second/intermediate section of the first cam surface 211 of the first jaw 210, and the second roller 262 to move sequentially along the first/rear section and onto the second/intermediate section of the first cam surface 221 of the second jaw 220. Movement of the first roller 261 along the first and second sections of the first cam surface 211 of the first jaw 210, and movement of the second roller 262 along the first and second sections of the first cam surface 221 of the second jaw 220, may cause the working area 280 of the example crimping accessory 200 to go from the open, or neutral state, to a fully closed, or actuated state. In the fully closed, or actuated state, the first roller 261 is positioned at the peak portion 215 of the intermediate section of the first cam surface 211 of the first jaw 210, and the second roller 262 is positioned at the peak portion 225 of the intermediate section of the first cam surface 221 of the second jaw 220. This may represent a state in which a peak, or maximum, crimping or clamping force is applied to a workpiece positioned in the working area 280 defined between the first and second jaws 210, 220. Continued movement of the trunnion 250 in the first longitudinal direction L1 may cause the first roller 261 to move into the third/front section of the first cam surface 211 of the first jaw 210, and the second roller 262 to move into the third/front section of the first cam surface 221 of the second jaw 220, to move from the fully closed/actuated state to the partially open/released state in which the crimping/clamping force is released and the workpiece can be removed from the working area 280.

In this example arrangement, movement of the first pins 255A, 255B along the second cam surface 212 of the first jaw 210, and movement of the second pins 257A, 257B along the second cam surface 222 of the second jaw 220, as the trunnion 250 moves in a second longitudinal direction L2 along the rod 300, may guide a rotational movement of the first jaw 210 in the second rotational direction A2 about the first pivot pin 241, and a rotational movement of the second jaw 220 in the first rotational direction A1 about the second pivot pin 242.

A first protrusion 256, for example, an elongated protrusion, formed on the first side portion 251 of the trunnion 250 may be received, for example, slidably received, in a guide slot 237 formed in the first guide plate 231. Similarly, a second protrusion 258, for example, an elongated protrusion, formed on the second side portion 252 of the trunnion 250 may be received, for example, slidably received, in a guide slot 238 formed in the second guide plate 232. The positioning of the first protrusion 256 in the first guide slot 237 and/or the positioning of the second protrusion 258 in the second guide slot 238 may maintain an alignment of the trunnion 250 with respect to the first and second guide plates 231, 232 and the rod 300 as the trunnion 250 moves longitudinally along the rod 300.

With the first and second jaws 210, 220 in the open state, or the unactuated state shown in FIGS. 2A and 2B, the workpiece, i.e., elements to be coupled by a crimping ring (tubing and/or piping and/or fittings and the like) may be positioned in the appropriate section of the working area 280, based on size and/or configuration and the like of the elements to be coupled by the crimping ring. In order to accomplish the coupling, via the crimping ring, of the two elements, a rotational force may be applied to the rod 300, for example, via the coupling portion 310 of the rod 300, coupled to, for example, the tool holder 170 of the example rotary power tool 100. The resulting rotation of the rod 300 in the first rotational direction R1 may cause the threaded portion 330 of the rod 300 to engage with the threaded portion 259 of the trunnion 250. Engagement of the threaded portion 330 of the rod 300 and the threaded portion 259 of the trunnion 250, and continued rotation of the rod 300 in the first rotational direction R1, may cause the trunnion 250 to move in the longitudinal direction L1 along the rod 300. As the trunnion 250 moves in the direction L1 along the rod 300, the first roller 261 rolls along the first cam surface 211 of the first jaw 210 (i.e., along the first section and into the second section of the first cam surface 211), and the second roller 262 rolls along the first cam surface 221 of the second jaw 220 (i.e., along the first section and into the second section of the first cam surface 221). A contour, or shape, of these sections of the first cam surfaces 211, 221 and interaction with the first and second rollers 261, 262 causes rotation of the first jaw 210 about the first pivot pin 241 in the direction of the arrow A1, and rotation of the second jaw 220 about the second pivot pin 242 in the direction of the arrow A2. Continued rotation of the rod 300 in the first rotational direction R1, continued longitudinal movement of the trunnion 250 in the longitudinal direction L1, and continued rotation of the first and second jaws 210, 220 in this manner, moves the example crimping accessory 200 to the fully closed state, or the actuated state, shown in FIG. 2C. In the closed, or actuated state, the first and second jaws 210, 220 are closed around the workpiece, i.e., the crimping ring and the elements positioned in the working area 280, exerting a clamping or crimping force on the crimping ring that securely couples the elements to be joined. Continued rotation of the rod 300 in the first rotational direction R1, continued longitudinal movement of the trunnion 250 in the longitudinal direction L1, and continued rotation of the first and second jaws 210, 220, beyond the peak portions 215, 225 of the first cam surfaces 211, 221 moves the example crimping accessory 200 from the fully closed state, or the actuated state, shown in FIG. 2C to the partially open state, or the released state. In the partially open, or released state, the first and second jaws 210, 220 are partially opened and released from the workpiece, i.e., the crimping ring and the elements positioned in the working area 280, allowing the workpiece to be removed from the working area 280.

In some examples, the first cam surface 211 of the first jaw 210 may be positioned along a peripheral portion of a body portion of the first jaw 210, extending substantially orthogonally to the body portion of the first jaw 210. Similarly, the first cam surface 221 of the second jaw 220 may be positioned along a peripheral portion of a body portion of the second jaw 220, extending substantially orthogonally to the body portion of the second jaw 220. In some examples, the first and second portions 212A, 212B of the second cam surface 212 of the first jaw 210 may extend outward from the body portion of the first jaw 210, along the peripheral portion of the body portion opposite the first cam surface 211. Similarly, the first and second portions 222A, 222B of the second cam surface 222 of the second jaw 220 may extend outward from the body portion of the second jaw 220, along the peripheral portion of the body portion opposite the first cam surface 221. In some examples, the contour of the first cam surface 211 of the first jaw 210 and the contour of the first cam surface 221 of the second jaw 220 may be substantially symmetric relative to, for example, a longitudinal axis of the rod 300, or be mirrored about the longitudinal axis of the rod 300. Similarly, a contour of the first and second portions 212A, 212B of the second cam surface 212 of the first jaw 210 and the contour of the first and second portions 222A, 222B of the second cam surface 222 of the second jaw 220 may be substantially symmetric relative to, for example, the longitudinal axis of the rod 300, or be mirrored about the longitudinal axis of the rod 300.

As noted above, effective coupling of the elements in this manner may rely on the application of a relatively great crimping or clamping force. The application of this relatively great force may be facilitated through the use of the example crimping accessory 200 coupled to the example rotary power tool 100 as described above. In some examples, a level of force applied may be regulated, or controlled, to, for example avoid excessive application of crimping or clamping force that may adversely affect the operation of the joined elements. In some examples, a contour of the first cam surface 211 and the second cam surface 221, and the interaction of the cam surfaces 211, 221 with the first and second rollers 261, 262, respectively.

For example, in the fully closed/actuated state shown in FIG. 2C, the first roller 261 is positioned at the peak portion 215 of the first cam surface 211 of the first jaw 210, and the second roller 262 is positioned at the peak portion 225 of the first cam surface 221 of the second jaw 220. A positioning of the first roller 261 at the peak portion 215 of the first cam surface 211 of the first jaw 210 and a corresponding positioning of the second roller at the peak portion 225 of the first cam surface 221 of the second jaw 220 may correspond to an application of a peak coupling or crimping force, or the application of a target force, on a crimping ring positioned in the working area 280 for the coupling of elements as described above. Due to the contour of the cam surfaces 211, 221, continued movement of the trunnion 250 in the longitudinal direction L1 and corresponding continued movement of the first and second rollers 261, 262 along the cam surfaces 211, 221 (due to, for example, continued application of rotational force in the first rotational direction R1 from the example rotary power tool 100) will cause a release of crimping/clamping force, and corresponding separation of the first and second jaws 210, 220 in the working area 280 (i.e., rotation of the first jaw 210 in the direction of the arrow A2, and rotation of the second jaw 220 in the direction of the arrow A1).

In some examples, the interaction of the first roller 261 with the contoured surface defined by the first cam surface 211 of the first jaw 210, and the interaction of the second roller 262 with the contoured surface defined by the first cam surface 221 of the second jaw 210, may define a first guide mechanism that guides the operation of the example crimping accessory 200 from the unactuated state to the actuated state to the released state. For example, the force exerted by the first roller 261 on the first cam surface 211 of the first jaw 210, and the force exerted by the second roller 262 on the first cam surface 221 of the second jaw 220, as the trunnion 250 moves in the first longitudinal direction, together with the contour defined by the first cam surfaces 211, 221 guides the actuation of the example crimping accessory 200 and corresponding application of force in the working area 280 on the elements to be coupled. Similarly, in some examples, interaction of the first pins 255A, 255B with the contour of the second cam surface 212 of the first jaw 210, and interaction of the second pins 257A, 257B with the contour of the second cam surface 222 of the second jaw 220, as the trunnion 250 moves in the second longitudinal direction L2 along the rod 300, may define a second guide mechanism that guides operation of the example crimping accessory 200 from the actuated state to the unactuated state.

Further, as can be seen in, for example, FIGS. 3C-3E, as the trunnion 250 continues to move in the longitudinal direction L1, and the first and second rollers 261, 262 move beyond the peak portions 215, 225 of the respective first cam surfaces 211, 221, the threaded portion 259 of the trunnion 250 is disengaged from the threaded portion 330 of the rod 300. In this position, the threaded portion 259 of the trunnion 250 is now positioned on the first unthreaded portion 340 of the rod 300. In this arrangement, as the threaded portion 259 of the trunnion 250 and the threaded portion 330 of the rod 300 are now disengaged, and the trunnion 250 is now positioned on the first unthreaded portion 340 of the rod 300, continued rotation of the rod 300 in the first rotational direction R1 (due to, for example, continued application of force in the first rotational direction R1 from the example rotary power tool 100) will not cause any further longitudinal movement of the trunnion 250. The first unthreaded portion 340 may represent a neutral zone, in which a relative position of the first and second jaws 210, 220 remains substantially unchanged, even in response to the further application of rotational force to the rod 300 in the first rotational direction. Thus, the neutral zone defined by the first unthreaded portion 340 may function as a force limiting mechanism, which controls or limits an amount of force to be exerted on elements received in the working area 280 to be joined or coupled.

As noted above, in some examples, the first biasing member 345 (i.e., the first compression spring) is fitted on the first unthreaded portion 340, and the second biasing member 355 (i.e., the second compression spring) is fitted on the second unthreaded portion 350 of the rod 300. In the unactuated state of the example crimping accessory 200, the second biasing member 355 exerts a biasing force on the trunnion 250 that urges the trunnion 250 towards the threaded portion 330 of the rod 300. This biasing force exerted on the trunnion 250 by the second biasing member 355 in the unactuated state of the example crimping accessory 200 may facilitate the initiation of engagement of the threaded portion 259 of the trunnion 250 with the threaded portion 330 of the rod 300 in response to the application of a rotational force that causes rotation of the rod 300 in the first rotational direction R1, to move the trunnion 250 in the longitudinal direction L2, and transition the example crimping accessory from the unactuated state to the actuated state In the unactuated state of the example crimping accessory 200, the first biasing member 345 is in an at rest state. In the unactuated state, a first end portion of the first biasing member 345 is positioned against the support member 247. In some examples, the first end portion of the first biasing member 345 may be coupled to, or retained by, the support member 247. A second end portion of the biasing member 345 is positioned against a ring 347. The ring 347 may be slidably coupled on the first unthreaded portion 340 of the rod 300. Slidable movement of the ring 347 on the first unthreaded portion 340 of the rod 300 may allow the first biasing member 345 to be compressed in response to movement of the trunnion 250 in the first longitudinal direction L1 (in response to rotation of the rod 300 in the first rotational direction R1), and to expand to the at rest state in response to longitudinal movement of the trunnion 250 in the second longitudinal direction L2 (in response to rotation of the rod 300 in the second rotational direction R2). Positioning of the ring 347 at the second end portion of the biasing member 345 may retain the first biasing member 345 within the first unthreaded portion 340 of the rod 300 when the example crimping accessory 200 is in the unactuated state. That is, the positioning of the ring 347 at the second end portion of the biasing member 345 may keep the first biasing member 345 from moving onto the threaded portion 330 of the rod 300 when the example crimping accessory 200 is in the unactuated state. In the actuated state of the example crimping accessory 200, the first biasing member 345 exerts a biasing force on the trunnion 250 that urges the trunnion 250 towards the threaded portion 330 of the rod 300. This biasing force exerted on the trunnion 250 by the first biasing member 345 in the actuated state of the example crimping accessory 200 may facilitate the initiation of engagement of the threaded portion 259 of the trunnion 250 with the threaded portion 330 of the rod 300 in response to the application of a rotational force that causes rotation of the rod 300 in the second rotational direction R2, to move the trunnion 250 in the longitudinal direction L2, and transition the example crimping accessory from the actuated state to the unactuated state.

Figure 4A:
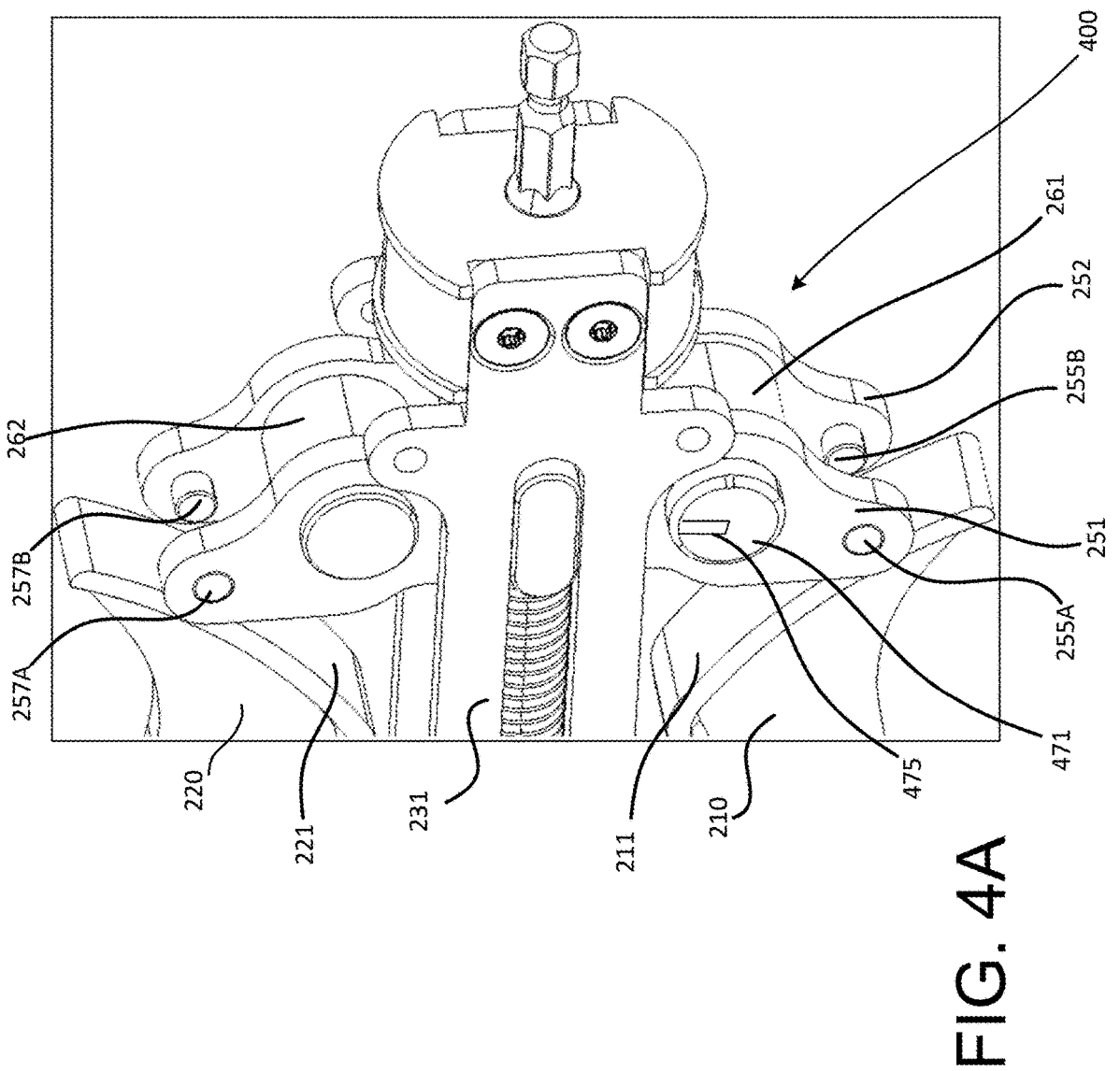
FIGS. 4A and 4B are assembled perspective views of an example adjustment mechanism of the example crimping accessory.
Figure 4B:
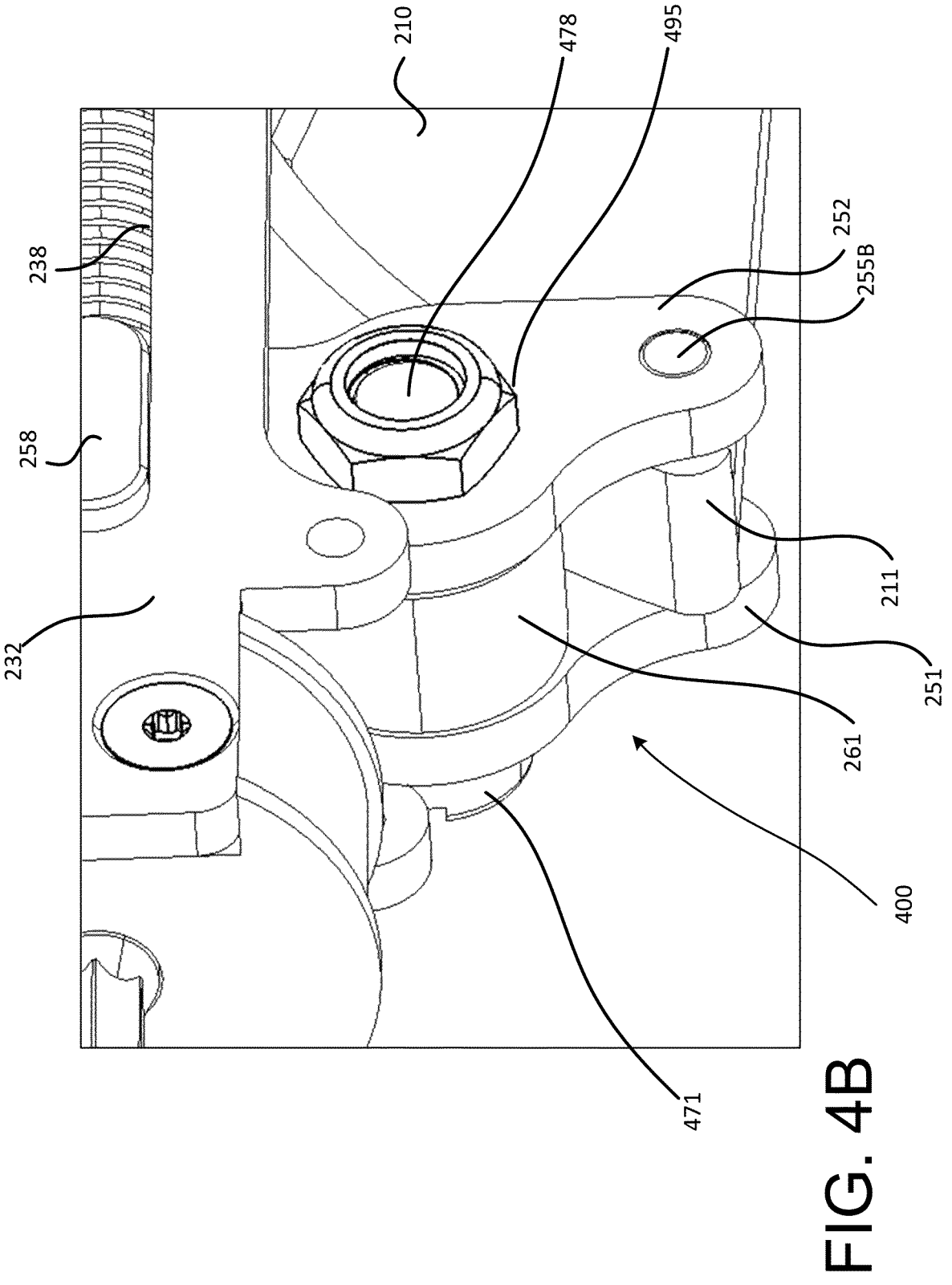
Figure 4C:
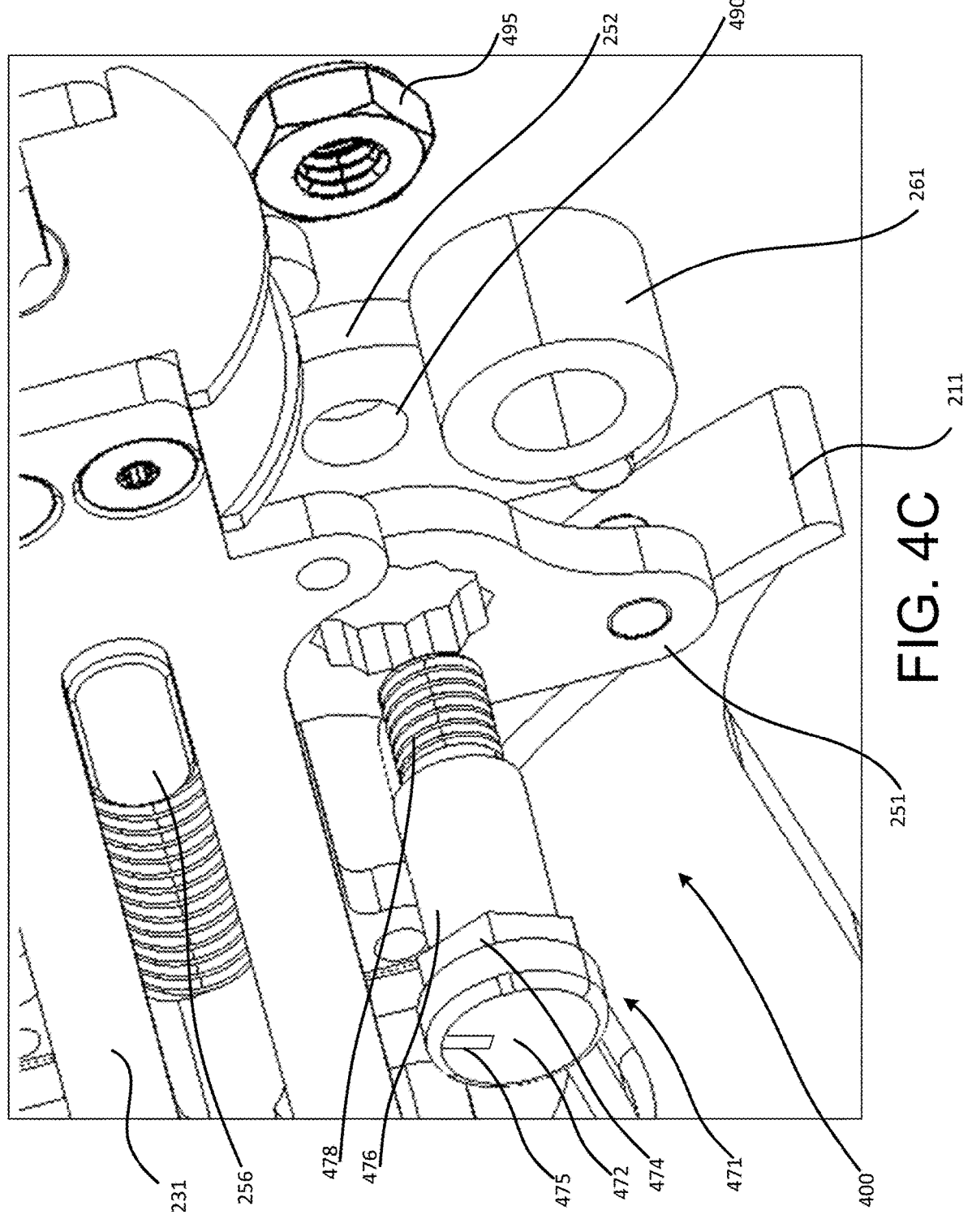
FIG. 4C is an exploded perspective view of the example adjustment mechanism of the example crimping accessory.
Figure 4D:
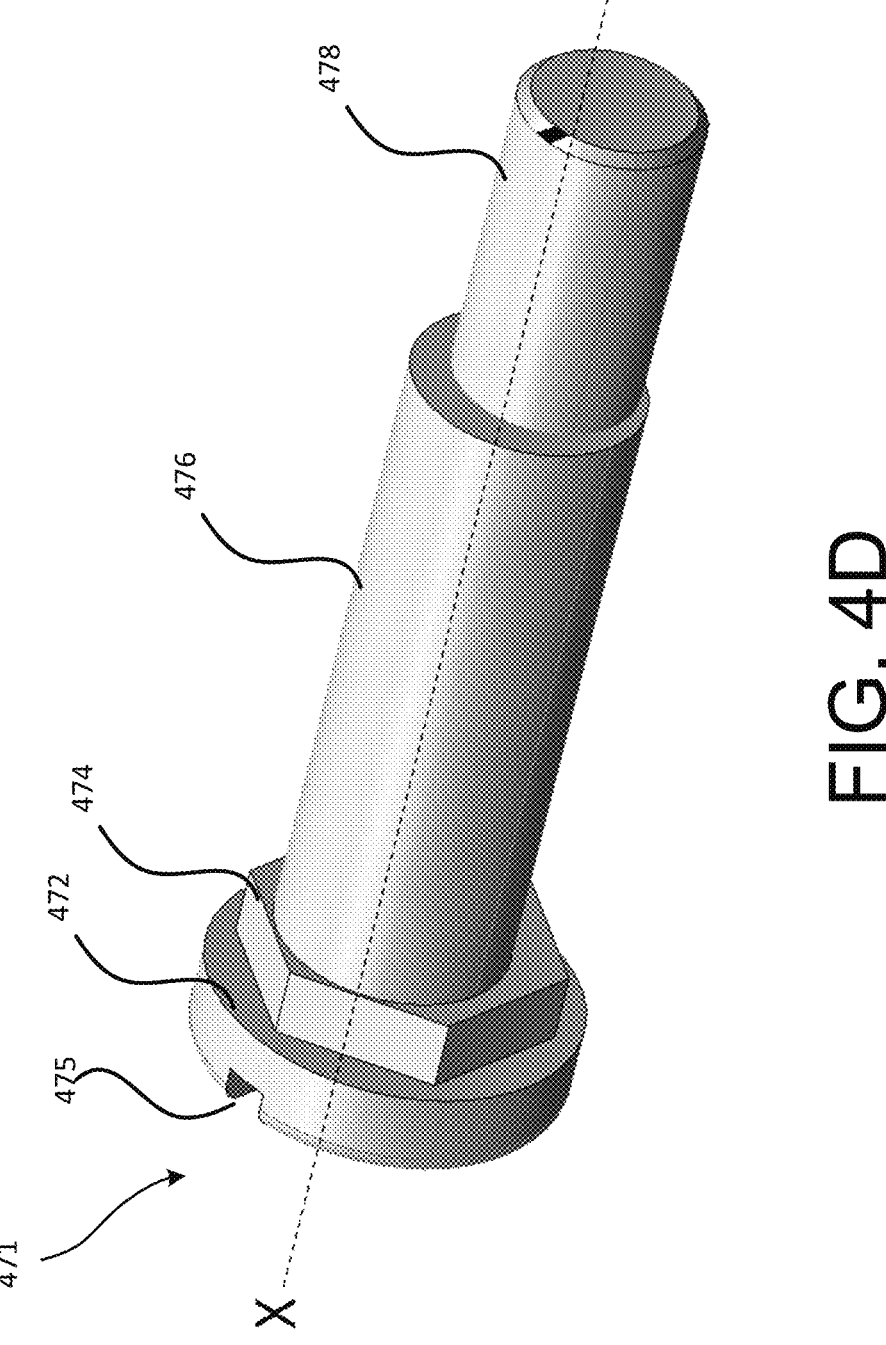
FIG. 4D is a perspective view of an example adjustment pin of the example adjustment mechanism.
Figure 4E:
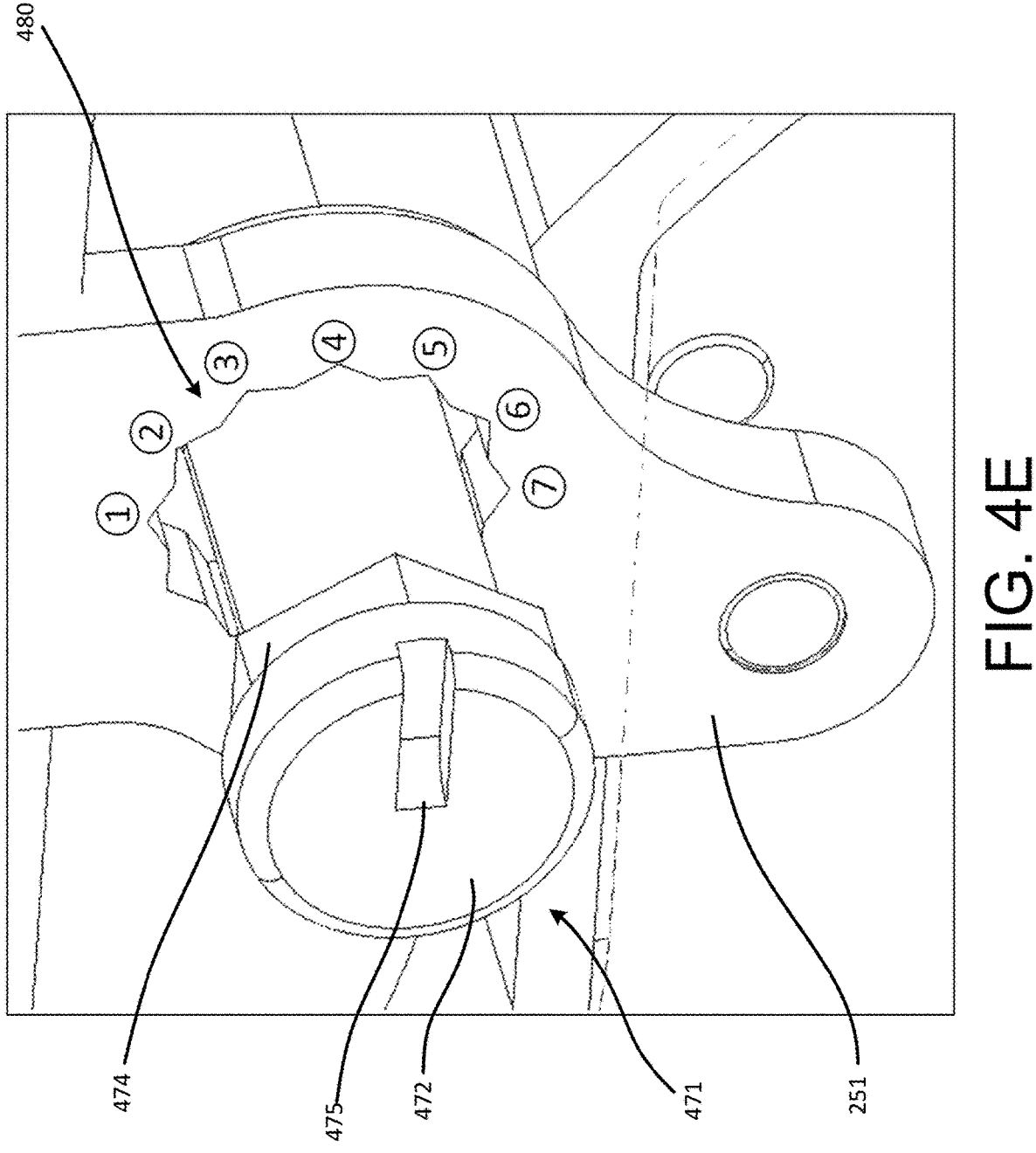
FIG. 4E illustrates a plurality of settings of the example crimping accessory.
Figure 4F:
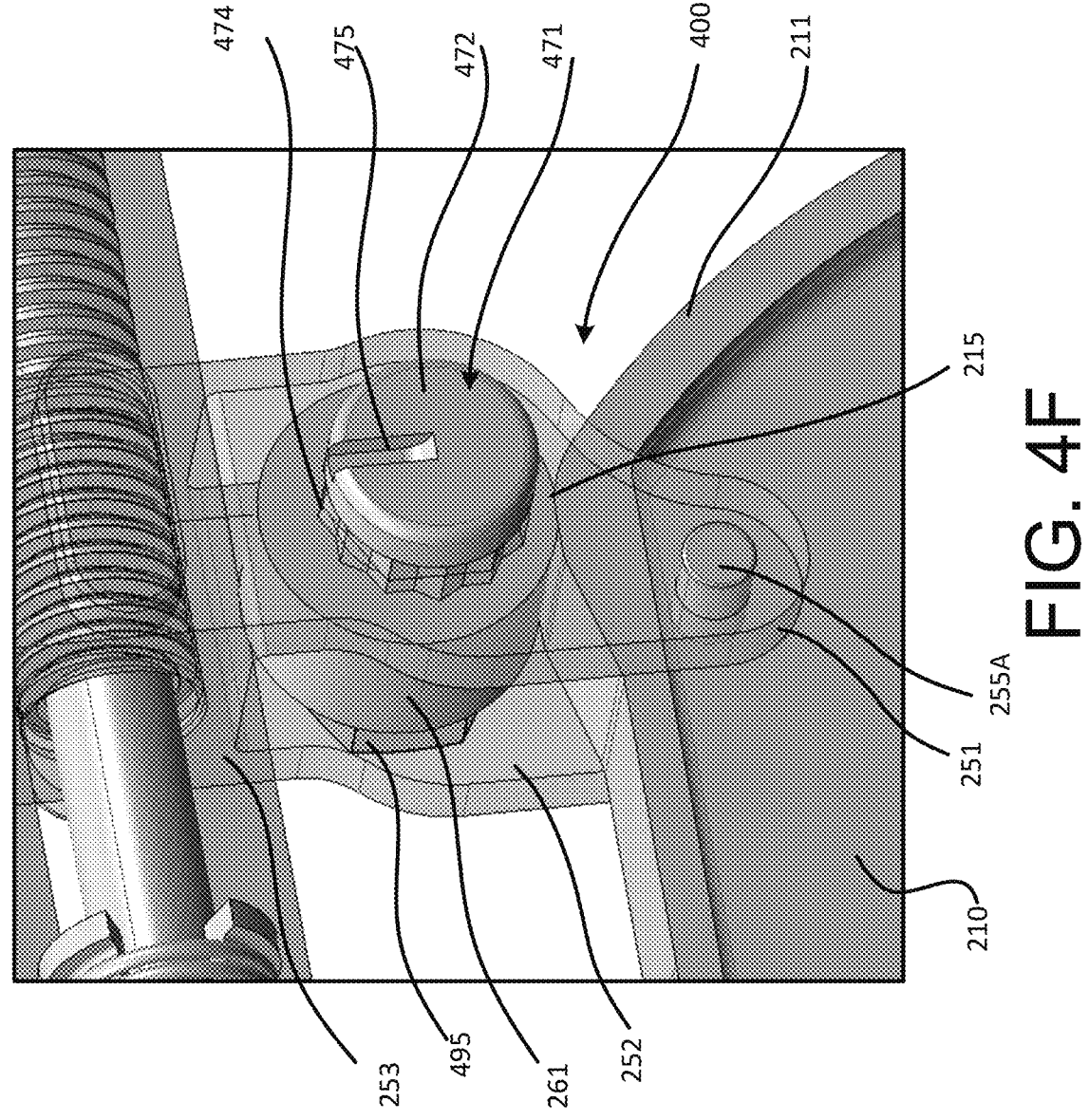
FIG. 4F illustrates a first setting.
Figure 4G:
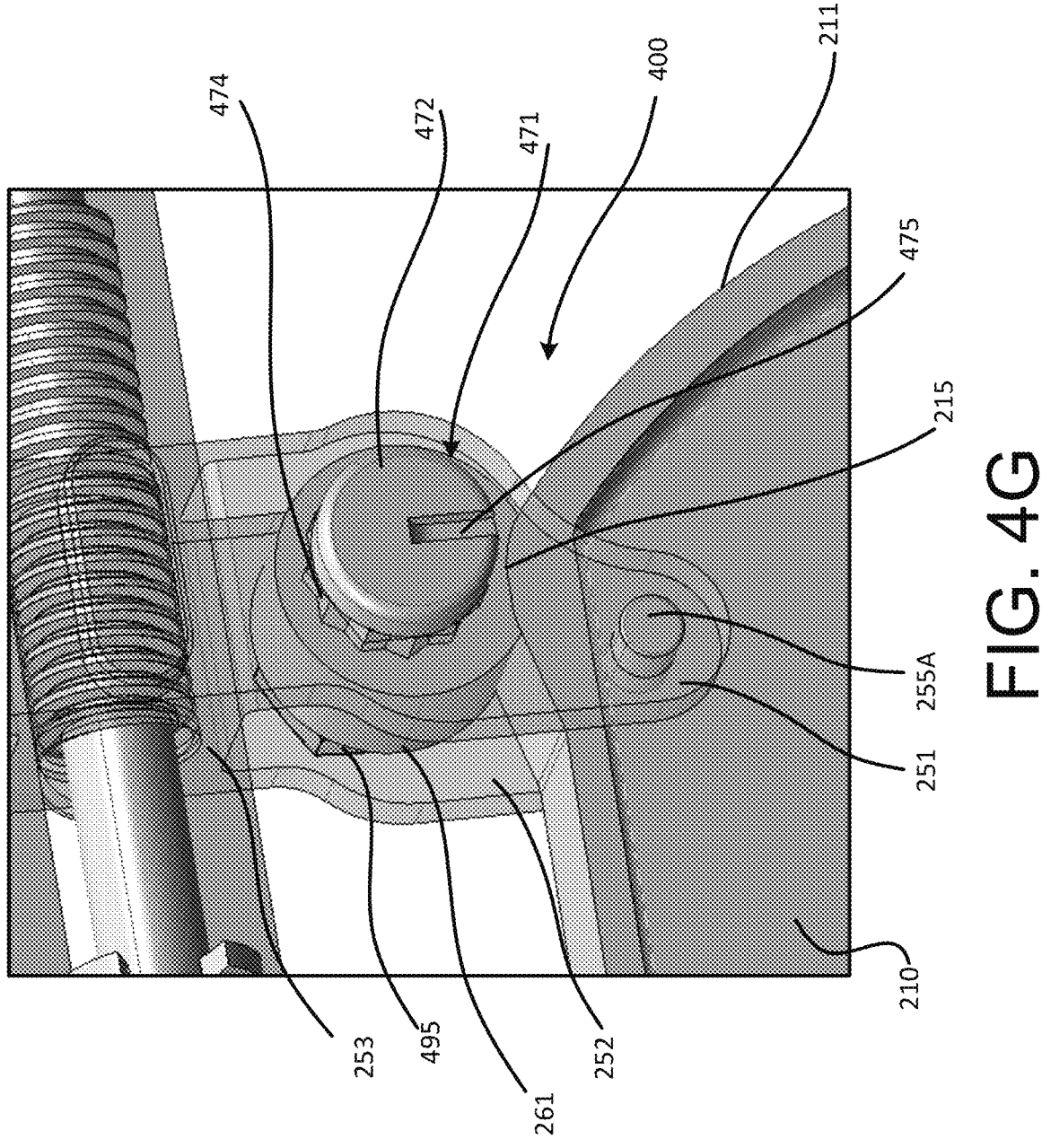
FIG. 4G illustrates a second setting of the example adjustment mechanism.

In some situations, the user may want to adjust a distance and a resulting crimping or clamping force exerted on the crimping ring and associated elements to be coupled or joined by the crimping ring. For example, in some situations, the combinations of elements to be coupled or joined, relative configurations of the elements to be coupled or joined together with a configuration of the crimping ring, an installation environment, and the like may warrant a relatively fine adjustment of the distance between the first and second jaws 210, 220 at the corresponding section (i.e., the first section 281 or the second section 282) of the working area 280. Accordingly, as shown in FIGS. 4A-4G, in some examples, the example crimping accessory 200 can include an adjustment mechanism 400 that provides for a relatively small, or fine, adjustment of spacing between the first jaw 210 and the second jaw 220. FIGS. 4A and 4B are assembled perspective views of the example adjustment mechanism 400, taken from opposite sides of the example crimping accessory 200. FIG. 4C is an exploded perspective view of the example adjustment mechanism 400. FIG. 4D is a perspective view of an example pin 471 of the example adjustment mechanism 400. FIG. 4E is a close-in view of a setting portion of the example adjustment mechanism 400. FIGS. 4F and 4G are partially transparent views of the adjustment mechanism 400, illustrating different settings of the adjustment mechanism 400.

In an example in which the example crimping accessory 200 includes an adjustment mechanism 400, the first pin 271 as described above, on which the first roller 261 is mounted, may be provided in the form of an adjustment pin 471 on which the first roller 261 is mounted. In some examples, the adjustment pin 471 may include a head portion 472, and a contoured adjustment portion 474 abutting the head portion 472. In the example shown in FIGS. 4A-4F, the contoured adjustment portion 474 includes a plurality of engagement protrusions that can selectively engage corresponding engagement recesses formed in the opening 480 (see FIG. 4E). In particular, in the example shown in FIGS. 4A-4G, the adjustment portion 474 has a hexagonal contour, for purposes of discussion and illustration. As shown in FIG. 4D, a shank portion of the adjustment pin 471 may include an eccentric portion 476 on which the first roller 261 is mounted, and a coupling portion 478. The adjustment pin 471 may extend in through an opening 480 in the first side portion 251 of the trunnion 250, and out through an opening 490 in the second side portion 252 of the trunnion 250. In some examples, the coupling portion 478 of the adjustment pin 471 may be threaded, with a nut 495 selectively coupled thereto, to secure the adjustment pin 471 in the trunnion 250.

As shown in FIG. 4D, the head portion 472, the contoured adjustment portion 474 and the coupling portion 478 may be coaxially arranged along a longitudinal centerline X of the adjustment pin 471. The eccentric portion 476, on which the first roller 261 is mounted, may be eccentric to, or offset from the longitudinal centerline X of the adjustment pin 471. In some examples, a peripheral portion of the opening 480 is contoured so as to interact and engage with the contour of the contoured adjustment portion 474 of the adjustment pin 471 to provide for adjustment of a position of the adjustment pin 471, and the first roller 261 mounted thereon. The mounting of the first roller 261 on the eccentric portion 476 of the adjustment pin 471 may provide for adjustment of a relative separation of the first jaw and the second jaw 220, and a corresponding amount of force applied to the crimping ring and elements to be coupled that are positioned in the working area 280 for coupling.

An interaction between the contoured adjustment portion 474 of the adjustment pin 471 and the inner peripheral surface of the opening 480 is shown in FIG. 4E. In the example shown in FIG. 4E, the opening 480 is a starred opening, including a plurality of angled engagement portions that can selectively engage the angled engagement portions of the contoured adjustment portion 474 of the adjustment pin 471. In the close-in view shown in FIG. 4E, seven different settings, positions 1 through 7, are labeled, for purposes of discussion and illustration.

To adjust a relative position of the first jaw 210 and the second jaw 220, the user may disengage the nut 495 from the coupling portion 478 of the adjustment pin 471, so that the adjustment pin 471 can be moved far enough in the axial direction of the pin 471 to disengage the adjustment portion 474 from the opening 480. The user may then rotate the adjustment pin 471 and re-engage engagement protrusions of the adjustment portion 474 with the engagement recesses of the opening 480 at the desired setting. In some examples, an indicator 475 may be provided on the head portion 472 of the adjustment pin 471 to provide a visual indication of the selected setting of the first and second jaws 210, 220.

FIG. 4F illustrates a first setting (i.e., corresponding to engagement position 1 shown in FIG. 4E) corresponding to a maximum separation distance between the first jaw 210 and the second jaw 220. This first setting may correspond to a lowest level of force, of the range of force that can be applied by the example crimping accessory 200 at the working area 280, with the first roller 261 positioned at the peak portion 215 of the first jaw 210 (and the second roller 262 positioned at the peak portion 225 of the second jaw 220). FIG. 4G illustrates a second setting j(i.e., corresponding to engagement position 7 shown in FIG. 4E) corresponding to a minimum separation distance between the first jaw 210 and the second jaw 220. This second setting may correspond to a substantially highest level of force, of the range of force that can be applied by the example crimping accessory 200 at the working area 280, with the first roller 261 positioned at the peak portion 215 of the first jaw 210 (and the second roller 262 positioned at the peak portion 225 of the second jaw 220). As the first roller 261 is mounted on the eccentric portion 476 of the adjustment pin 471, a separation distance between the first jaw 210 and the second jaw 220 may be adjusted by this type of change in installation position of the adjustment pin 471 on which the first roller 261 is mounted.

Figure 5A:
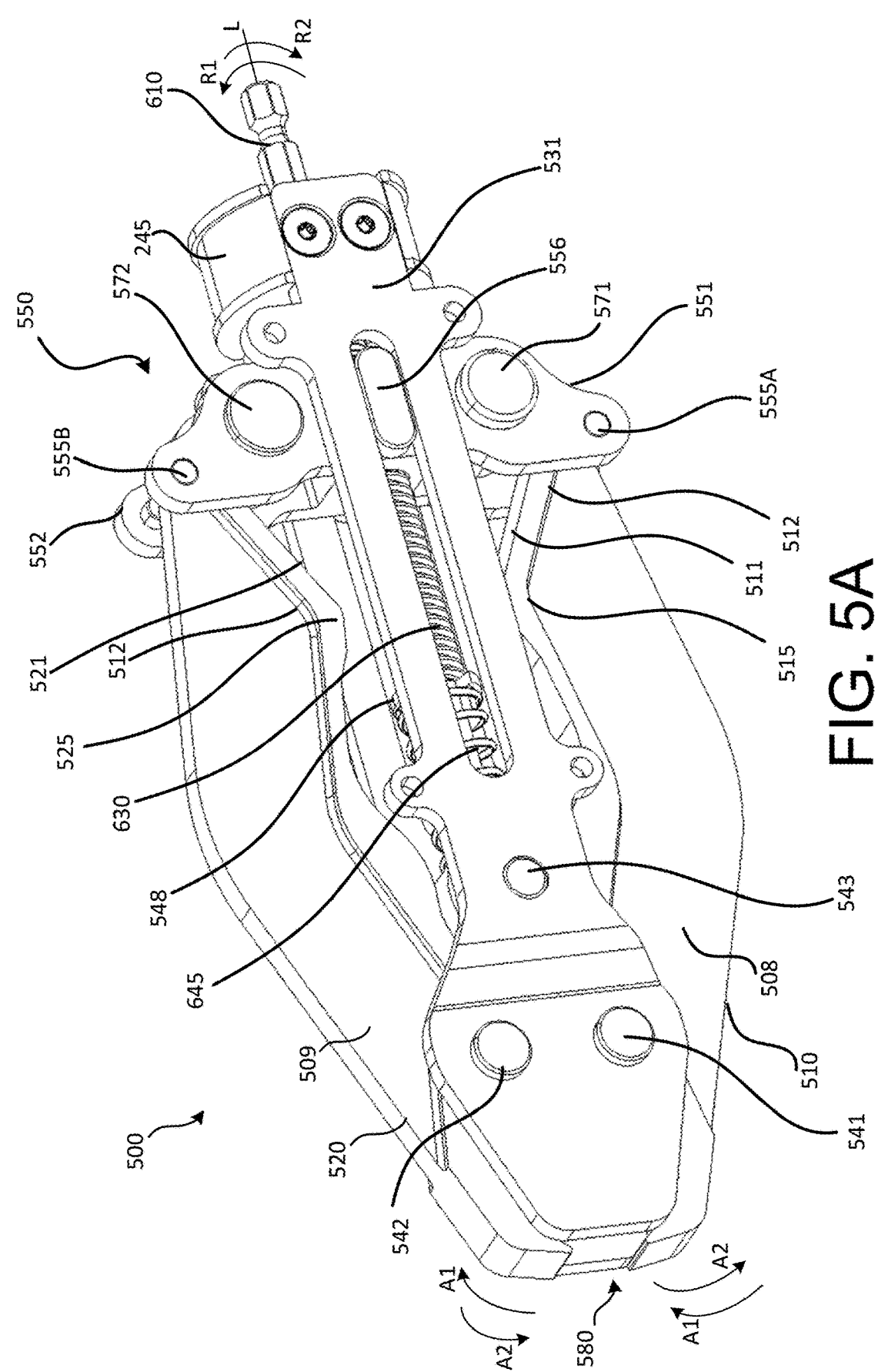
FIG. 5A is a perspective view of an example pinching accessory in an open state.
Figure 5B:
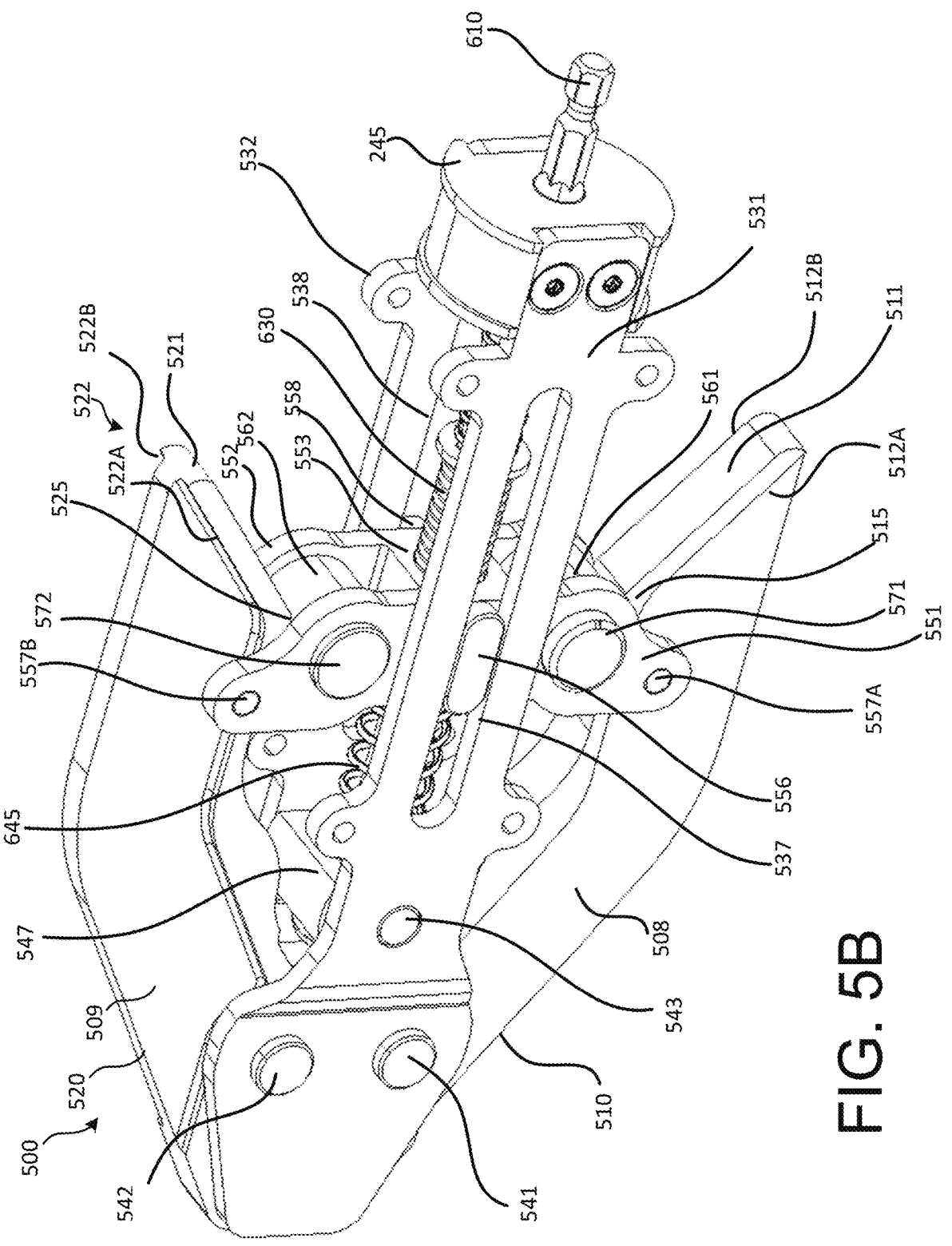
FIGS. 5B and 5C are perspective views of the example pinching accessory in a closed state.
Figure 5C:
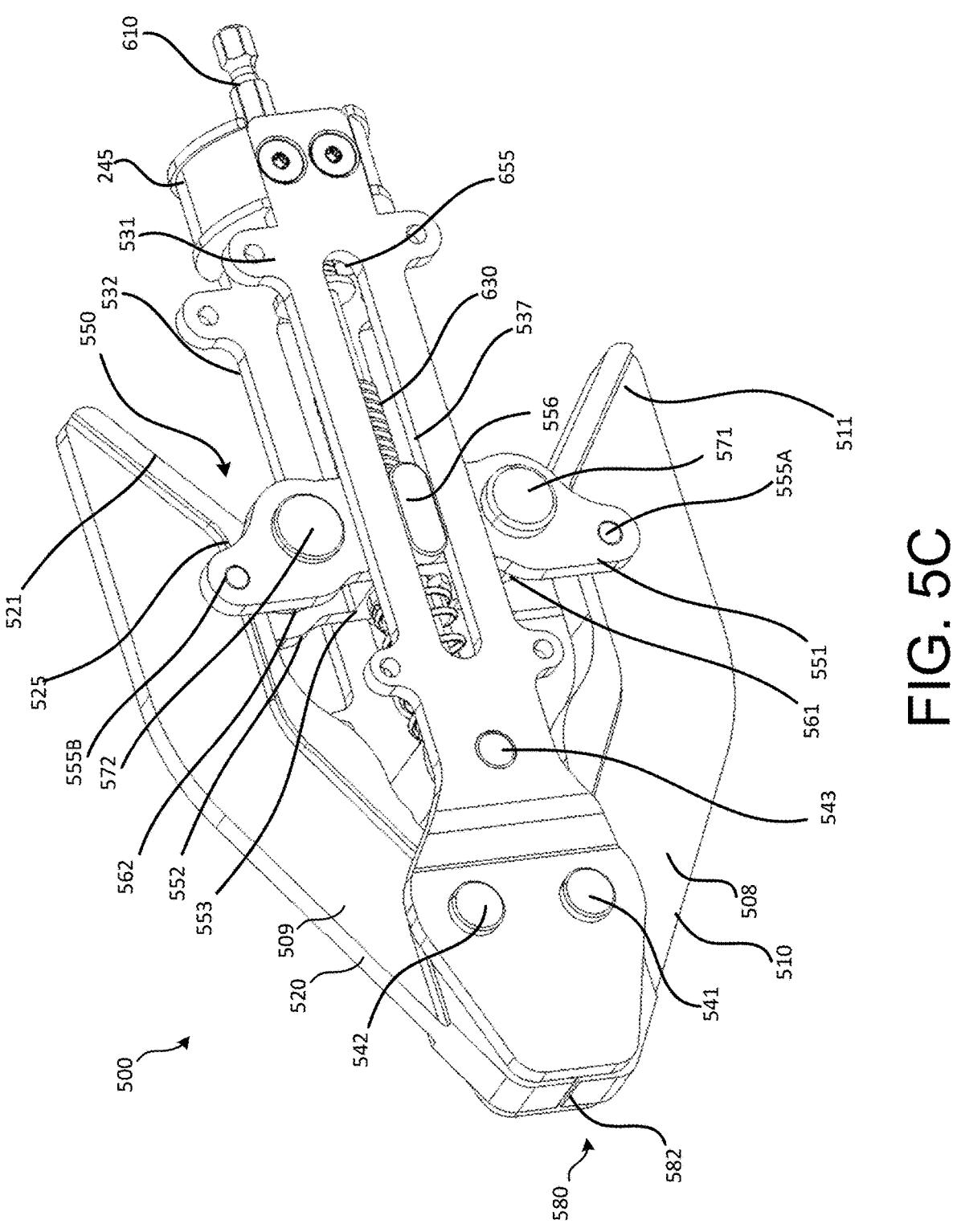
Figure 5D:
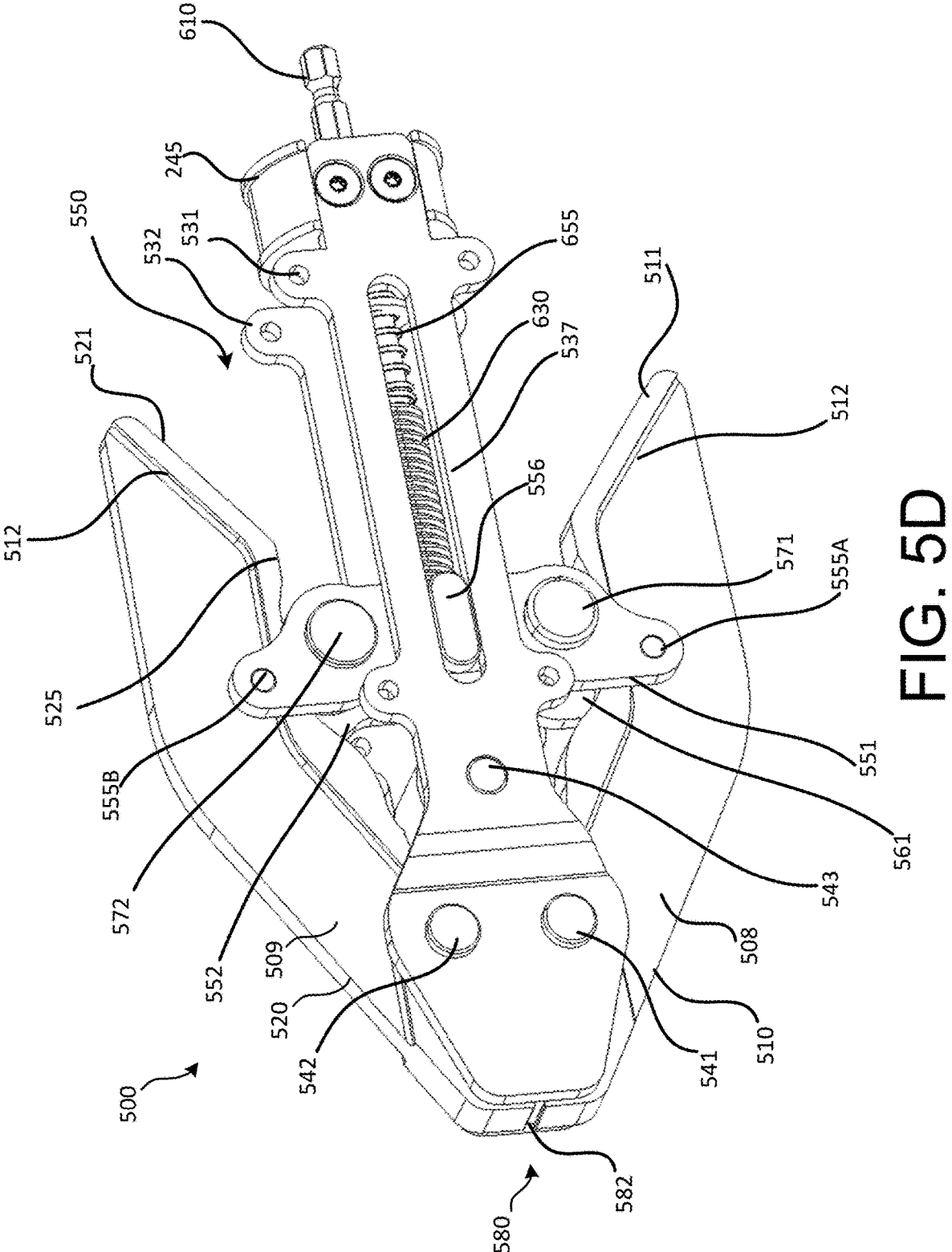
FIG. 5D is a perspective view of the example pinching accessory in a partially open state.

FIGS. 5A-6F present various views of an example pinching accessory 500, that can be coupled to a rotary power tool such as the example rotary power tool 100 shown in FIG. 1A, in accordance with implementations described herein. FIG. 5A is a perspective view of the example pinching accessory 500 in a fully open, or neutral state. FIGS. 5B and 5C are perspective views of the example pinching accessory 500 in a fully closed, or actuated state. FIG. 5D is a perspective view of the example pinching accessory in a partially open, or released state. FIG. 6A is a perspective view of the example pinching accessory 500 in the fully open, or neutral state, with a first guide plate 531 of a guide assembly removed so that internal components of the example pinching accessory are more easily visible. FIG. 6B is a perspective view of the example pinching accessory 500 in the fully closed, or actuated state, with the first guide plate 531 removed so that internal components of the example pinching accessory are more easily visible. FIG. 6C is a perspective view of the example pinching accessory 500 in the partially open, or released state. FIG. 6D is a cross-sectional view of the example pinching accessory 500 in the partially open, or released state. FIG. 6E is a perspective view of an example actuating rod 600 of the example actuating mechanism of the example pinching accessory 500.

As shown in FIGS. 5A-6E, the example pinching accessory 500 may include a first jaw 510 and a second jaw 520 that are pivotably, or rotatably, coupled via a guide assembly including a first guide plate 531 and a second guide plate 532. The first jaw 510 includes a first arm portion 508 and the second jaw 520 includes a second arm portion 509. In the illustrated embodiment, the arm portions 508, 509 are integrally formed as part of the jaws 510, 520. In other embodiments, the arm portions may be separate elements from the jaws, and the jaws may be removably and/or movably coupled to the arm portions. A first end portion of the first guide plate 531 and a first end portion of the second guide plate 532 may be coupled, for example, fixedly coupled, to a fitting 245. The fitting 245 may provide for coupling of the example crimping accessory 500 to a power driven tool, such as, for example, to the example tool holder 170 and/or brace assembly 130 of the example rotary power tool 100 described above. A second end portion of the first guide plate 531 and a second end portion of the second guide plate 532 may be coupled, for example, rotatably coupled to the first jaw 510 and the second jaw 520. In some examples, a first pivot pin 541 may pivotably couple the first guide plate 531 and the first jaw 510. A second pivot pin 542 may pivotably couple the first guide plate 531 to the second jaw 520. In some examples, the first pivot pin 541 may extend through the first guide plate 531 and out through the first jaw 510 and into the second guide plate 532 to also pivotably couple the first jaw 510 and the second guide plate 532. In some examples, the second pivot pin 542 may extend through the first guide plate 531 and out through the second jaw 520 and into the second guide plate 532 to pivotably couple the second guide plate 532 and the second jaw 520.

Pivotal coupling of the first jaw 510 and the second jaw 520 in this manner allow the example pinching accessory 500 to move between the open/neutral state and the closed/actuated state, and the partially open/released state. In the open state, or neutral state, a working area 580 defined between the first and second jaws 510, 520 is open, providing for insertion of at least a portion of a workpiece. In the example pinching accessory 500, the working area 580 provides for insertion of a tab portion of a pinch ring, to provide for the joining of, for example, tubing and/or piping and/or fitting using the pinch ring. In the example shown in FIGS. 5A-6D, a gap 582 is formed between the end portions of the first and second jaws 510, 520 in the actuated state, to allow for the tab portion of the pinch ring to protrude through the gap 582. In the closed state, a force is exerted on the tab portion of the pinch ring to tighten the pinch ring and secure a coupling of the elements to be joined by the pinch ring. In the partially open state, the first and second jaws 510, 520 are moved apart, so that the joined elements of the workpiece can be removed from the working area 580.

A trunnion 550, or a carrier, may be positioned on a rod 600, between the first guide plate 531 and the second guide plate 532 of the guide assembly. The trunnion 550 may be selectively engaged with a threaded portion 630 of the rod 600, such that a driving force generated by the example rotary power tool 100 and transmitted to the rod 600 causes the trunnion 550 to move longitudinally along the rod 600. In this example arrangement, the rod 600 extends through the intermediate portion 553 of the trunnion 550, with a first end portion of the rod 600 extending through the fitting 245, and a second end portion of the rod 600 received in a support member 547. A coupling pin 543 extends through the first guide plate 531, through the support member 547, and out into the second guide plate 532 to fix a position of the support member 547 relative to the first and second guide plates 531, 532.

Figure 6A:
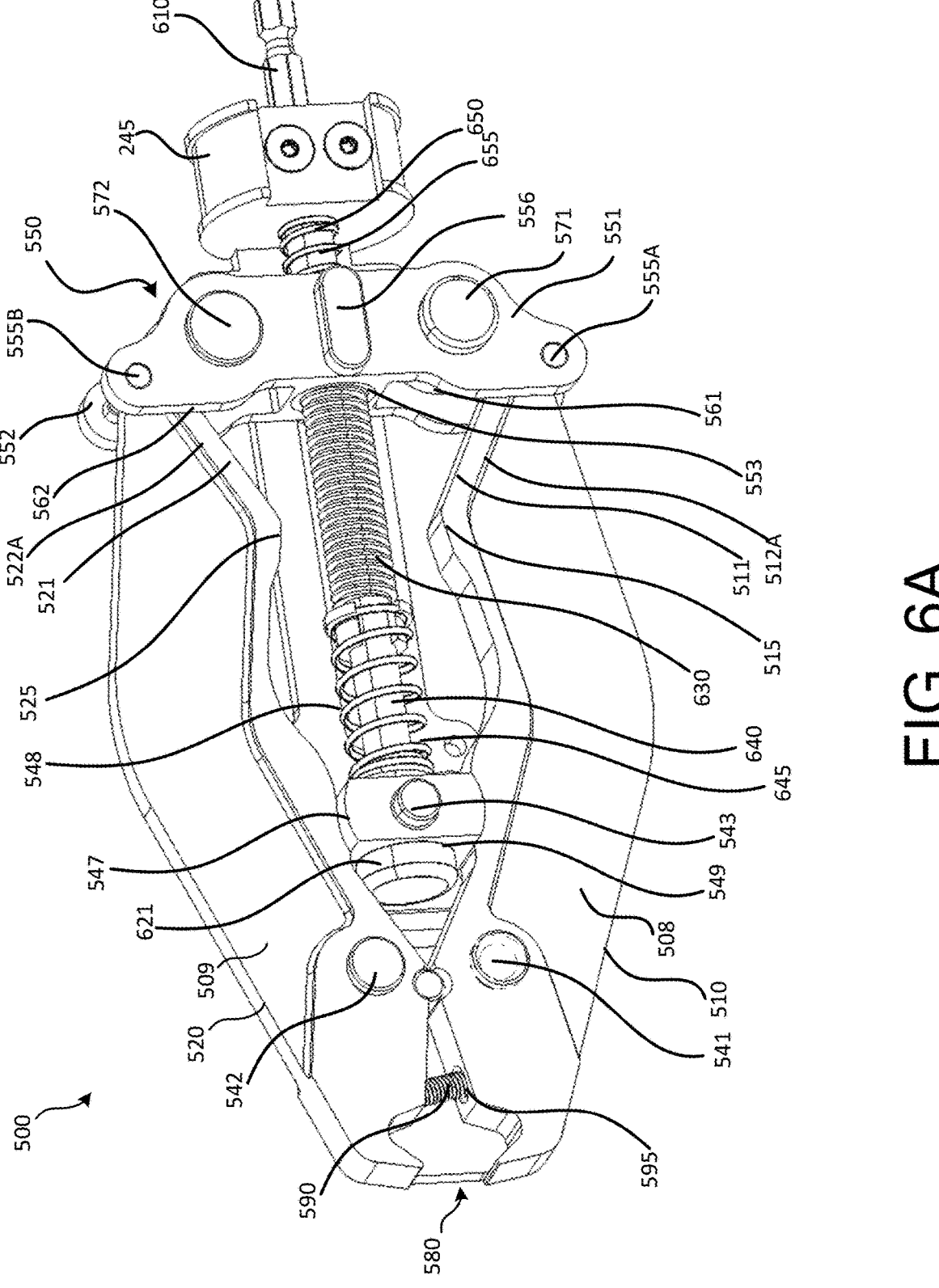
FIG. 6A is a perspective view of the example pinching accessory in the open state, with an example guide plate of the example pinching accessory removed.
Figure 6B:
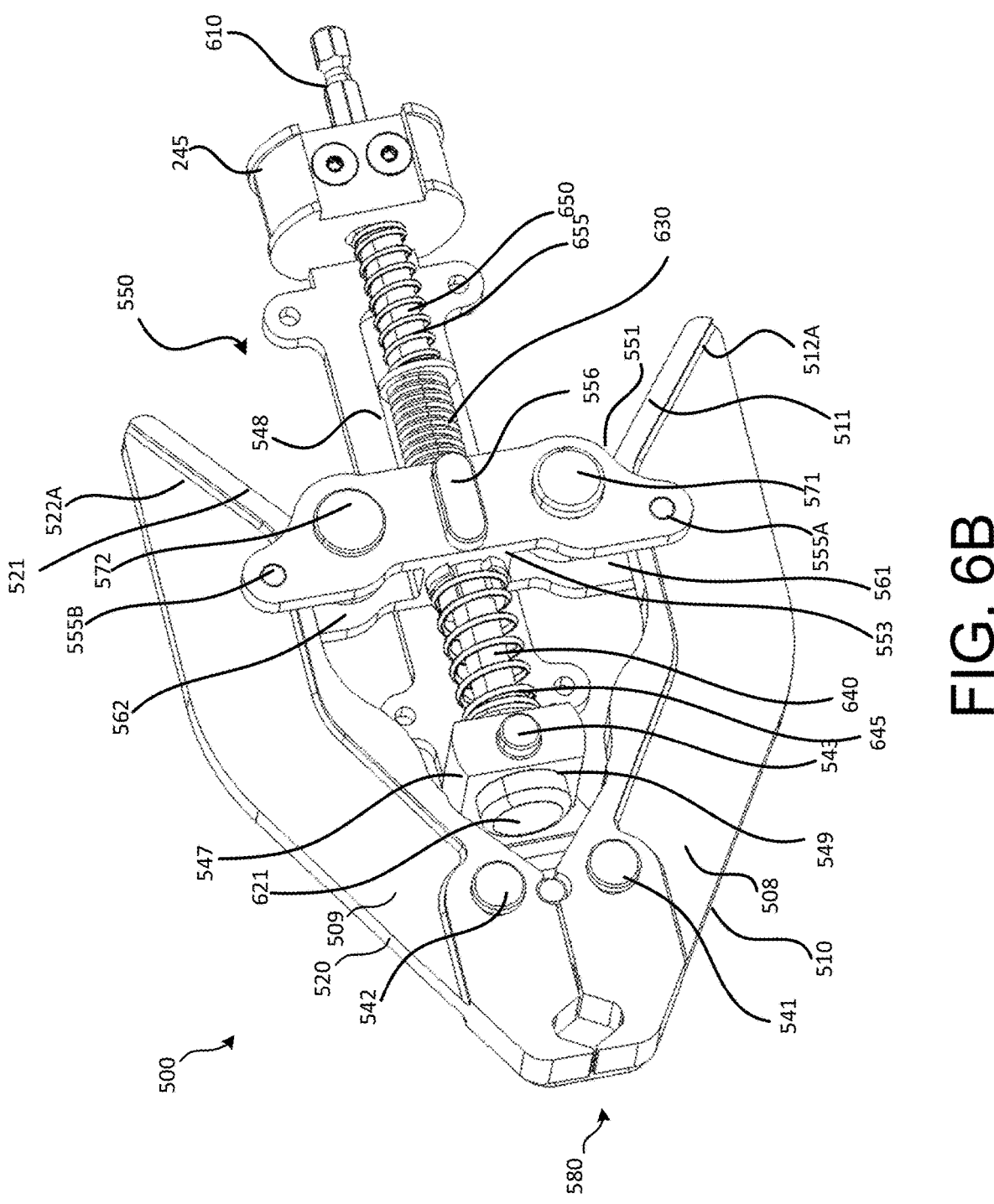
FIG. 6B is a perspective view of the example pinching accessory in the closed state, with the example guide plate of the example pinching accessory removed.
Figure 6C:
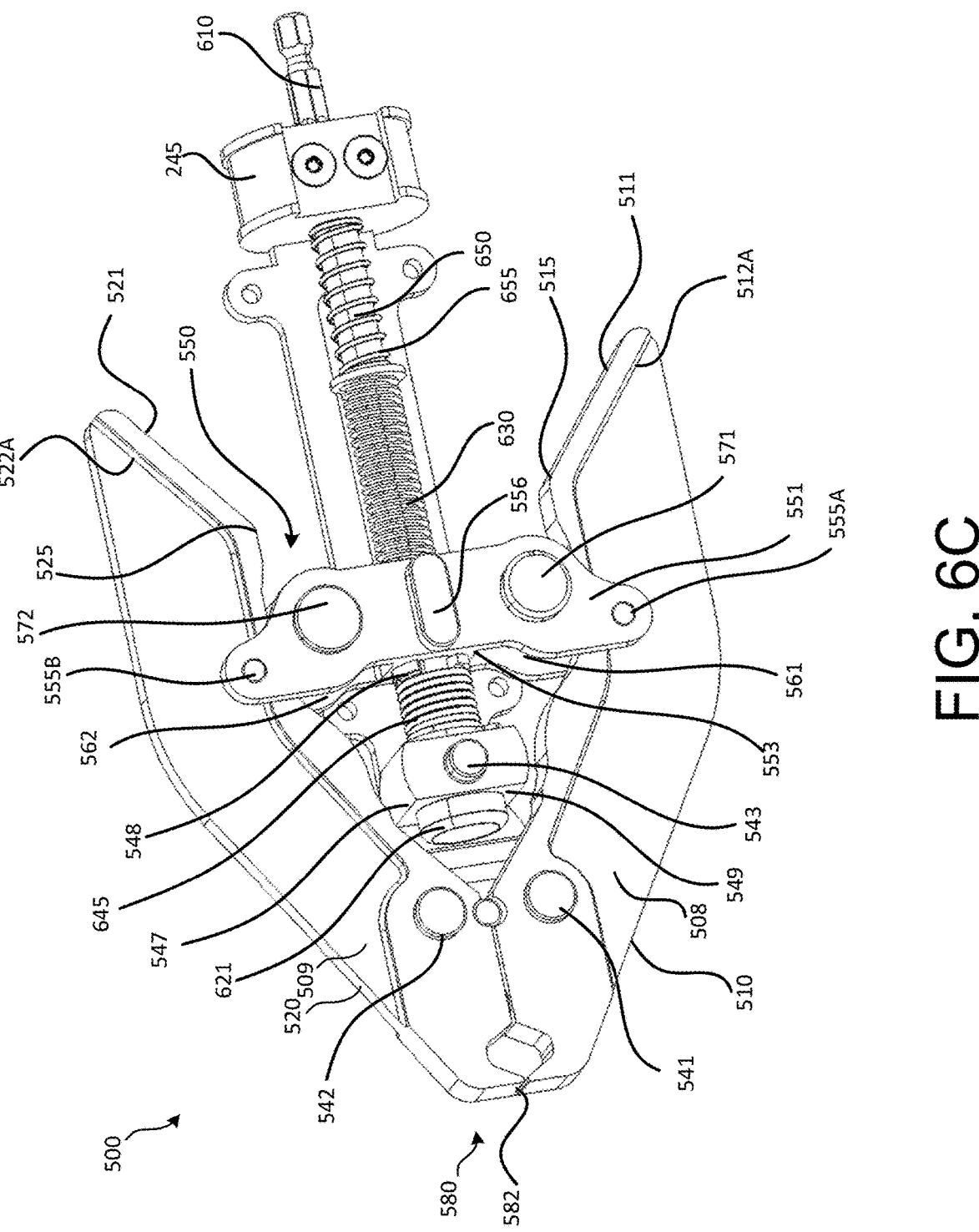
FIG. 6C is a cross-sectional view of the example pinching accessory in the closed state.
Figure 6D:
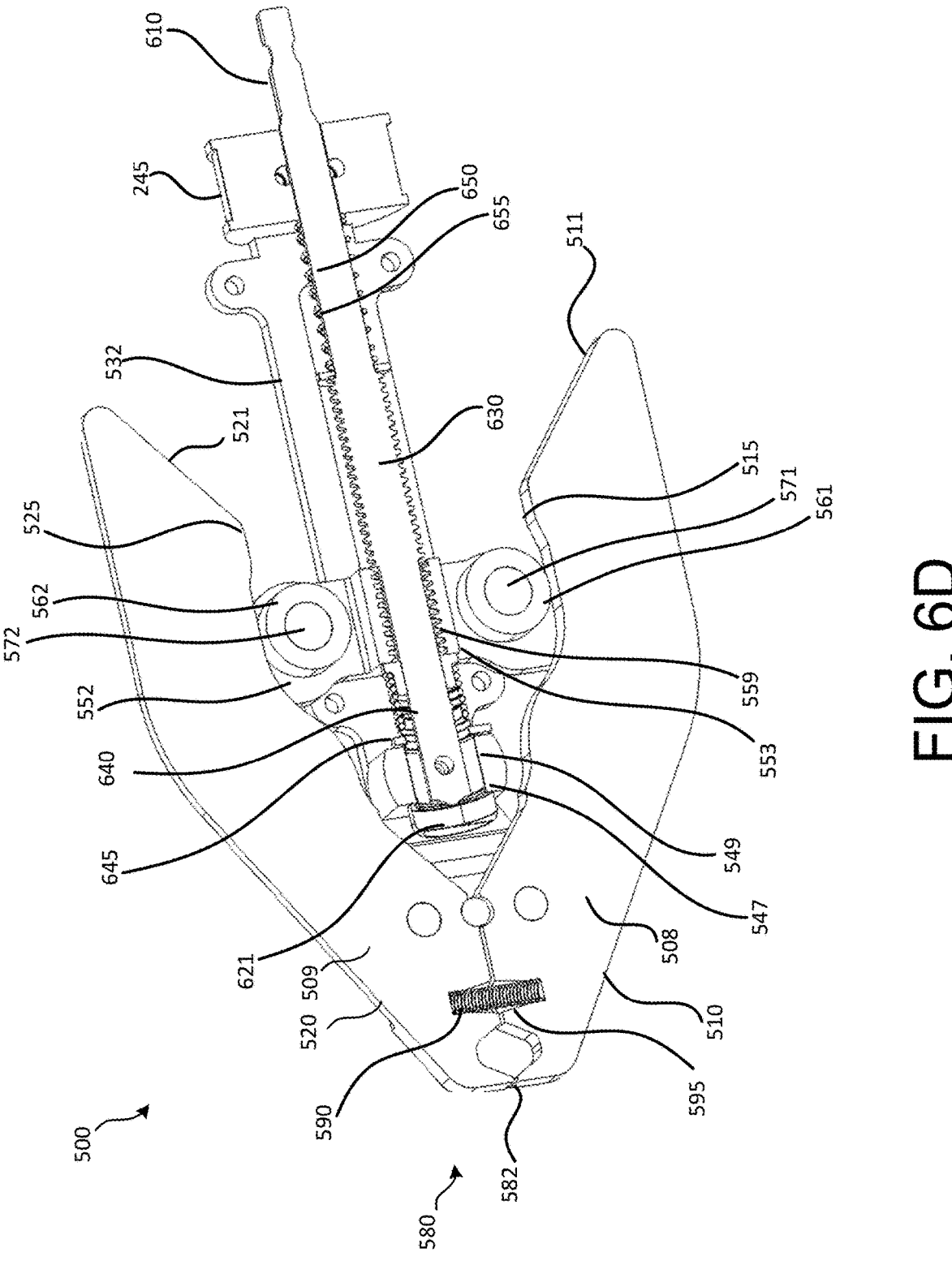
FIG. 6D is a perspective view of the example pinching accessory in the partially open state, with the example guide plate removed.
Figure 6E:
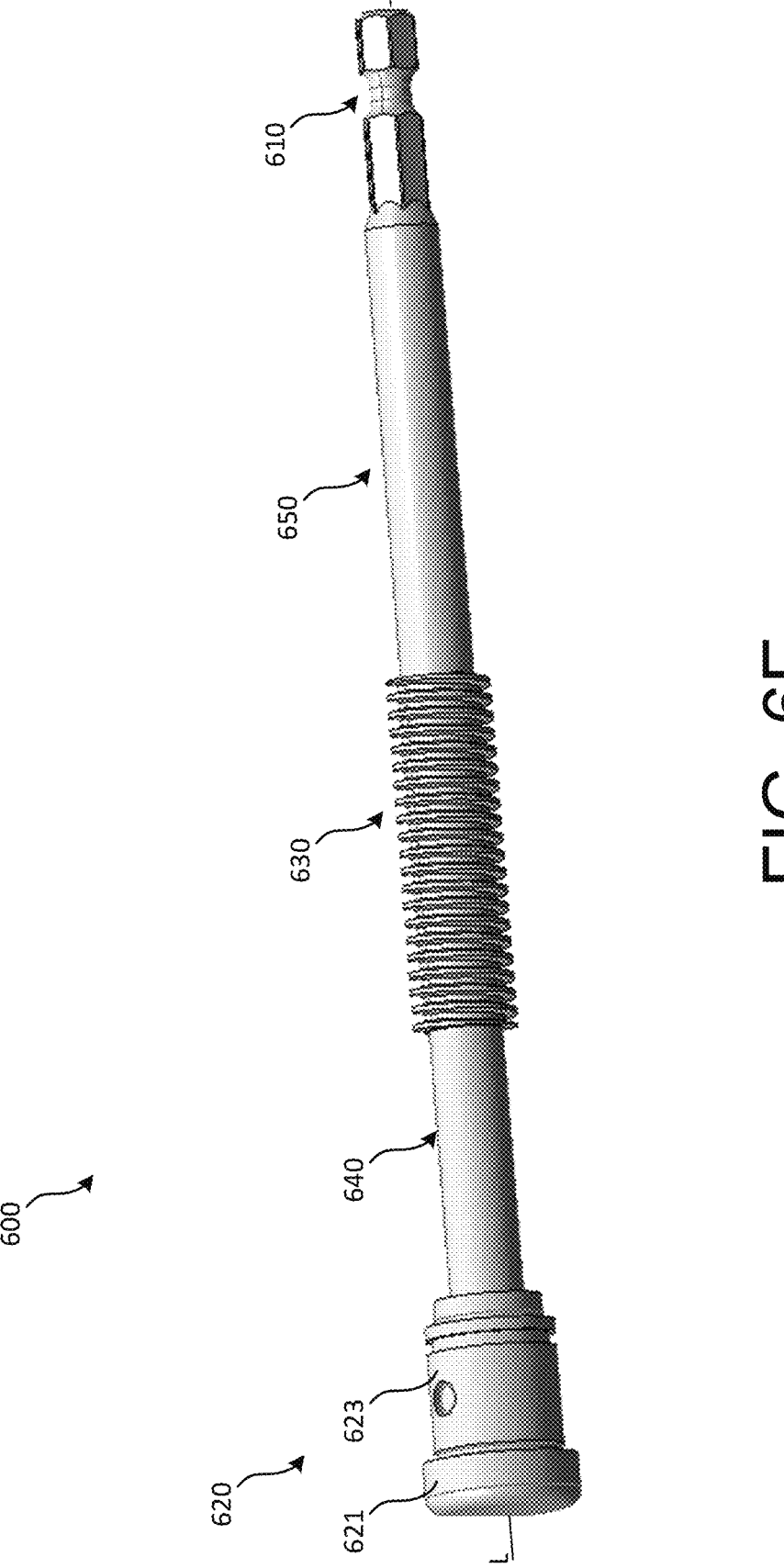
FIG. 6E is a perspective view of an example actuating rod of the example pinching accessory.

As shown in more detail in FIG. 6E, the rod 300 may include a coupling portion 610 at the first end portion of the rod 600 for coupling to a power driven tool, for example via the example tool holder 170 of the example rotary power tool 100 described above. A rotational force generated by the example rotary power tool 100 may be transmitted to the example pinching accessory 500 via the coupling portion 610 of the rod 600. The rod 600 may include a support portion 620 formed at the second end portion of the rod 600 received in an opening 549 in the support member 547. In some examples, the support portion 620 may include a head portion 621 positioned against an outer surface of the support member 547, and a shank portion 623 positioned in the opening 549 in the support member 547. The rod 600 may include a threaded portion 630 formed at an intermediate portion of the rod 600. The threaded portion 630 may be positioned between unthreaded portions of the rod 300, for example, between a first unthreaded portion 640 and a second unthreaded portion 650 of the rod 600. A first biasing member 645, in the form of a first compression spring, may be fitted on the first unthreaded portion 640 of the rod 600. A second biasing member 655, in the form of a second compression spring, may be fitted on the second unthreaded portion 650 of the rod 600.

The opening in the intermediate portion 553 of the trunnion 550 may include a threaded portion 559 including threads formed along an interior surface of the opening. In some examples, the threaded portion 559 is defined in a nut or other component that is fixed in the intermediate portion 553 of the trunnion 550. The threaded portion 630 of the rod 600 may be selectively engaged with the threaded portion 559 of the trunnion 550. In an engaged arrangement of the threaded portion 630 of the rod 600 and the threaded portion 559 of the trunnion 550, rotation of the rod 600 in a first rotational direction (in response to application of rotational force from the example rotary power tool 100 connected thereto via the coupling portion 610) may cause movement of the trunnion 550 along the rod 600 in the first longitudinal direction L1. Similarly, in an engaged arrangement of the threaded portion 630 of the rod 600 and the threaded portion 559 of the carrier, rotation of the rod 600 in a second rotational direction may cause movement of the trunnion 550 along the rod 600 in the second longitudinal direction L2.

A first cam follower in the form of a roller 561 may be positioned in a first recessed area defined between a first side portion 551, a second side portion 552 and the intermediate portion 553 of the trunnion 550. A second cam follower in the form of a roller 562 may be positioned in a second recessed area defined between the first side portion 551, the second side portion 552 and the intermediate portion 553 of the trunnion 550. The rod 600 may extend through the intermediate portion 553 of the trunnion 550. A first pin 571 extends through the first side portion 551 of the trunnion 550, through the first roller 561, and out into the second side portion 552 of the trunnion 550, allowing the first roller 561 to rotate about the first pin 571 within the first recessed area of the trunnion 550. Similarly, a second pin 572 extends through the first side portion 551, through the second roller 562, and out into the second side portion 552, allowing the second roller 562 to rotate about the second pin 572 within the second recessed area of the trunnion 550. In some examples, the first roller 561 may contact, and roll along, a cam surface 511 on the first arm portion 508 of the first jaw 510 as the trunnion 550 moves longitudinally along the rod 600. Similarly, the second roller 562 may contact, and roll along a cam surface 521 of second arm portion 509 of the second jaw 520 as the trunnion 550 moves longitudinally along the rod 600.

A pair of third cam followers in the form of first pins 555 (555A, 555B) may be provided at a first end portion of the first side portion 551 of the trunnion 550, and at a first end portion of the second side portion 552 of the trunnion 550. A pair of second cam followers in the form of second pins 557 (557A, 557B) may be provided at a second end portion of the first side portion 551 of the trunnion 550, and at a second end portion of the second side portion 552 of the trunnion 550. In some examples, the first pins 555A, 555B may contact and/or engage, and move along, respective portions of a second cam surface 512 of the first jaw 510 as the trunnion 550 moves longitudinally along the rod 600. That is, the pin 555A may contact and/or engage, and move along a first portion 512A of the second cam surface 512 of the first jaw 510, and the pin 555B may contact and/or engage, and move along a second portion 512B of the second cam surface 512 of the first jaw 510, as the trunnion 550 moves longitudinally along the rod 600. Similarly, the pin 557A may contact and/or engage, and move along a first portion 522A of the second cam surface 522 of the second jaw 520, and the pin 557B may contact and/or engage, and move along a second portion 522B of the second cam surface 522 of the second jaw 520, as the trunnion 550 moves longitudinally along the rod 600.

In this example arrangement, movement of the trunnion 550 in a first longitudinal direction L1 (in response to rotation of the rod 600 in a first rotational direction R1) may cause the first roller 561 to move along the cam surface 511 of the first jaw 5 10, and the second roller 562 to move along the cam surface 521 of the second jaw 520, guiding a rotational movement of the first jaw 510 in a first rotational direction A1 about the first pivot pin 541, and a rotational movement of the second jaw 520 in a second rotational direction A2 about the second pivot pin 542. Movement of the first jaw 510 in the first rotational direction A1 and the second jaw 520 the second rotational direction A2 may cause the example pinching accessory 500 to go from the open state, or the neutral state, to the closed state, or the actuated state, to crimp the tab of the pinch ring, and tighten the pinch ring about the elements to be coupled in the working area 580. Continued movement of the trunnion 550 in the first longitudinal direction L1 (in response to continued rotation of the rod 600 in the first rotational direction R1), after the pinching action is complete, may cause the example pinching accessory 500 to go from the closed, or actuated state to the partially open, or released state, to allow for release of the workpiece from the working area 580.

A first elongated protrusion 556 formed on the first side portion 551 of the trunnion 550 may be slidably received in a guide slot 537 formed in the first guide plate 531. Similarly, a second elongated protrusion 558 formed on the second side portion 552 of the trunnion 550 may be slidably received in a guide slot 538 formed in the second guide plate 532. The positioning of the first protrusion 556 in the first guide slot 537 and/or the positioning of the second protrusion 558 in the second guide slot 538 may maintain an alignment of the trunnion 550 with respect to the first and second guide plates 531, 532 and the rod 600 as the trunnion 550 moves longitudinally along the rod 600.

With the first and second jaws 510, 520 in the open state, or the unactuated state, the tab portion of the pinch ring may be positioned between the first and second jaws 510, 520. In order to pinch the pinch ring to secure the two elements to be joined, a rotational force may be applied to the rod 600 via the coupling portion 610 of the rod 600 coupled to, for example, the tool holder 170 of the example rotary power tool 100. The resulting rotation of the rod 600 in a first rotational direction R1 may cause the threaded portion 630 of the rod 600 to engage with the threaded portion 559 of the trunnion 550. Engagement of the threaded portion 630 of the rod 600 and the threaded portion 559 of the trunnion 550, and continued rotation of the rod 600 in the first rotational direction, may cause the trunnion 550 to move in the longitudinal direction L1 along the rod 600, the first roller 261 to roll along the cam surface 511 of the first jaw 510, and the second roller 562 to roll along the cam surface 521 of the second jaw 520. A contour, or shape, of the cam surfaces 511, 521 and interaction with the first and second rollers 561, 562 causes rotation of the first jaw 510 about the first pivot pin 541 in the direction of the arrow A1, and rotation of the second jaw 520 about the second pivot pin 542 in the direction of the arrow A2. Continued rotation of the rod 600 in the first rotational direction R1, continued longitudinal movement of the trunnion 550 in the longitudinal direction L1, and continued rotation of the first and second jaws 510, 520 in this manner, moves the example pinching accessory 500 to the closed state, or the actuated state. In the closed, or actuated state, the first and second jaws 510, 520 are closed around the workpiece, i.e., the pinch ring and in particular the tab portion of the pinch ring, exerting a pinching force on the tab portion of the pinch ring that securely couples the elements to be joined.

Once the tab portion of the pinch ring has been pinched to securely couple the elements of the workpiece, continued rotation of the rod in the first rotational direction R1 and corresponding movement of the trunnion 550 in the first longitudinal direction L1 will move the example pinching accessory 500 from the closed/actuated state to the partially open/released state, to allow for release of the completed workpiece from the working area 580. That is, as the trunnion 550 moves from the threaded portion 630 to the first unthreaded portion 640 of the rod 600, the geometry of the cam surfaces 511, 512 and interaction with the rollers 561, 562 causes a slight reopening of the first and second jaws 510, 520, allowing for release of the workpiece received in the working area 580. Rotation of the rod 600 in the direction of the arrow R2 may cause movement of the trunnion 550 along the rod 600 in the longitudinal direction L2, back to the second unthreaded portion 650 of the rod 600, with movement of the first and second jaws 510, 520 guided by the interaction of the pins 555 (555A, 555B) with the second cam surface 512 (512A, 512B) of the first jaw 510, and the interaction of the pins 557 (557A, 557B) with the second cam surface 522 (522A, 522B) of the second jaw 520.

In some examples, the cam surface 511 of the first jaw 510 may be positioned along a peripheral portion of a body portion of the first jaw 510, extending substantially orthogonally to the body portion of the first jaw 510. Similarly, the cam surface 521 of the second jaw 520 may be positioned along a peripheral portion of a body portion of the second jaw 520, extending substantially orthogonally to the body portion of the second jaw 520. In some examples, the contour of the cam surface 511 of the first jaw 510 and the contour of the cam surface 521 of the second jaw 520 may be substantially symmetric relative to, for example, a longitudinal axis of the rod 600, or be mirrored about the longitudinal axis of the rod 600.

As noted above, effective coupling of the elements in this manner may rely on the application of a relatively great pinching force. The application of this relatively great force may be facilitated through the use of the example crimping accessory 200 coupled to the example rotary power tool 100 as described above. In some examples, a level of force applied may be regulated, or controlled, to, for example avoid excessive application of force that may adversely affect the operation of the joined elements. In some examples, a contour of the first cam surface 511 and the second cam surface 521, and the interaction of the cam surfaces 511, 521 with the first and second rollers 561, 562, respectively.

For example, in the fully closed/actuated state, the first roller 561 is positioned at a peak portion 515 of the cam surface 511 of the first jaw 510, and the second roller 562 is positioned at a peak portion 525 of the cam surface 521 of the second jaw 520. A positioning of the first roller 561 at the peak portion 515 of the cam surface 511 and a corresponding positioning of the second roller 562 at the peak portion 525 of the cam surface 521 may correspond to an application of a peak pinching force, or the application of a target force, on a tab portion of a pinch ring positioned in the working area 580 for the coupling of elements as described above. Due to the contour of the cam surfaces 511, 521, continued movement of the trunnion 550 in the longitudinal direction L1 and corresponding continued movement of the first and second rollers 561, 562 along the cam surfaces 511, 521 (due to, for example, continued application of rotational force in the first rotational direction R1 from the example rotary power tool 100) will cause a release of force, and corresponding separation of the first and second jaws 510, 520 in the working area 580.

In some examples, the interaction of the first roller 561 with the contoured surface defined by the cam surface 511 of the first jaw 510, and the interaction of the second roller 562 with the contoured surface defined by the cam surface 521 of the second jaw 510, may define a guide mechanism that guides the operation of the example pinching accessory 500 from the unactuated state to the actuated state. For example, the force exerted by the first roller 561 on the cam surface 511 of the first jaw 510, and the force exerted by the second roller 562 on the cam surface 521 of the second jaw 520, as the trunnion 550 moves in the first longitudinal direction, together with the contour defined by the cam surfaces 511, 521 guides the actuation of the example pinching accessory 500 and corresponding application of force in the working area 580.

As the trunnion 550 continues to move in the longitudinal direction L1, and the first and second rollers 561, 562 move beyond the peak portions 515, 525 of the respective cam surfaces 511, 521, the threaded portion 559 of the trunnion 550 is disengaged from the threaded portion 630 of the rod 600, and the threaded portion 559 of the trunnion 550 is now positioned on the first unthreaded portion 640 of the rod 600. In this arrangement, as the threaded portion 559 of the trunnion 550 and the threaded portion 630 of the rod 600 are now disengaged, and with the trunnion 550 positioned on the first unthreaded portion 640 of the rod 600, continued rotation of the rod 600 in the first rotational direction R1 will not cause any further longitudinal movement of the trunnion 550. The first unthreaded portion 640 may represent a neutral zone, in which a relative position of the first and second jaws 510, 520 remains substantially unchanged, even in response to the further application of rotational force to the rod 600 in the first rotational direction. Thus, the neutral zone defined by the first unthreaded portion 640 may function as a force limiting mechanism, which controls or limits an amount of force to be exerted on elements received in the working area 580.

As noted above, in some examples, the first biasing member 645 is fitted on the first unthreaded portion 640, and the second biasing member 655 is fitted on the second unthreaded portion 650 of the rod 600. In the unactuated state, the second biasing member 655 exerts a biasing force that urges the trunnion 550 towards the threaded portion 630 of the rod 600 to facilitate the initiation of engagement of the threaded portion 559 of the trunnion 550 with the threaded portion 630 of the rod 600. This engagement may be in response to the application of a rotational force that causes rotation of the rod 600 in the first rotational direction R1, to move the trunnion 550 in the longitudinal direction L2, and transition the example pinching accessory 500 from the unactuated state to the actuated state In the unactuated state of the example pinching accessory 500, the first biasing member 645 is in an at rest state. In the unactuated state, a first end portion of the first biasing member 645 is positioned against and/or coupled to, or retained by, the support member 547. A second end portion of the biasing member 645 is positioned against a ring 548 that is slidably coupled on the first unthreaded portion 640 of the rod 600. Slidable movement of the ring 548 on the first unthreaded portion 640 of the rod 600 may allow the first biasing member 645 to be compressed in response to movement of the trunnion 550 in the first longitudinal direction L1 (in response to rotation of the rod 600 in the first rotational direction R1), and to expand to the at rest state in response to longitudinal movement of the trunnion 550 in the second longitudinal direction L2 (in response to rotation of the rod 300 in the second rotational direction R2). Positioning of the ring 548 at the second end portion of the biasing member 645 may retain the first biasing member 645 within the first unthreaded portion 640 of the rod 600 in the unactuated state. That is, this positioning of the ring 548 may keep the first biasing member 645 from moving onto the threaded portion 630 of the rod 600 in the unactuated state. In the actuated state, the first biasing member 645 exerts a biasing force on the trunnion 550 that urges the trunnion 550 towards the threaded portion 630 of the rod 600. This may facilitate the initiation of engagement of the threaded portion 559 of the trunnion 550 with the threaded portion 630 of the rod 600 in response to the application of a rotational force that causes rotation of the rod 600 in the second rotational direction R2, to move the trunnion 550 in the longitudinal direction L2, and transition the example pinching accessory 500 from the actuated state to the unactuated state. In some examples, separation of the first and second jaws 510, 520 may be facilitated by a biasing force exerted by a biasing member 590 positioned between the first and second jaws 510, 520, for example, in a pocket 595 extending between the first and second jaws 510, 520.

In some situations, the user may want to adjust a distance and a resulting force exerted on the tab portion of the pinch ring. For example, in some situations, the combinations of elements to be coupled or joined, relative configurations of the elements to be coupled or joined together with a configuration of the pinch ring, an installation environment, and the like may warrant a relatively fine adjustment of the distance between the first and second jaws 510, 520. Accordingly, in some examples, the example pinching accessory 500 can include the adjustment mechanism 400 described above with respect to FIGS. 4A-4G. The incorporation of the adjustment mechanism 400 described above into the example pinching accessory 500 may include the replacement of the first pin 571 described above with the adjustment pin 471, for the mounting of the first roller 561 on the eccentric portion 476 of the adjustment pin 471

To adjust a relative position of the first jaw 510 and the second jaw 520, the user may disengage the nut 495 from the coupling portion 478 of the adjustment pin 471 extending through the trunnion 550 described above, so that the adjustment pin 471 can be moved far enough in the axial direction of the pin 471 to disengage the adjustment portion 474 from the opening 480. The user may then rotate the adjustment pin 471 and re-engage engagement protrusions of the adjustment portion 474 with the engagement recesses of the opening 480 at the desired setting. The indicator 475 may provide a visual indication of the selected setting of the first and second jaws 510, 520.

Figure 7A:
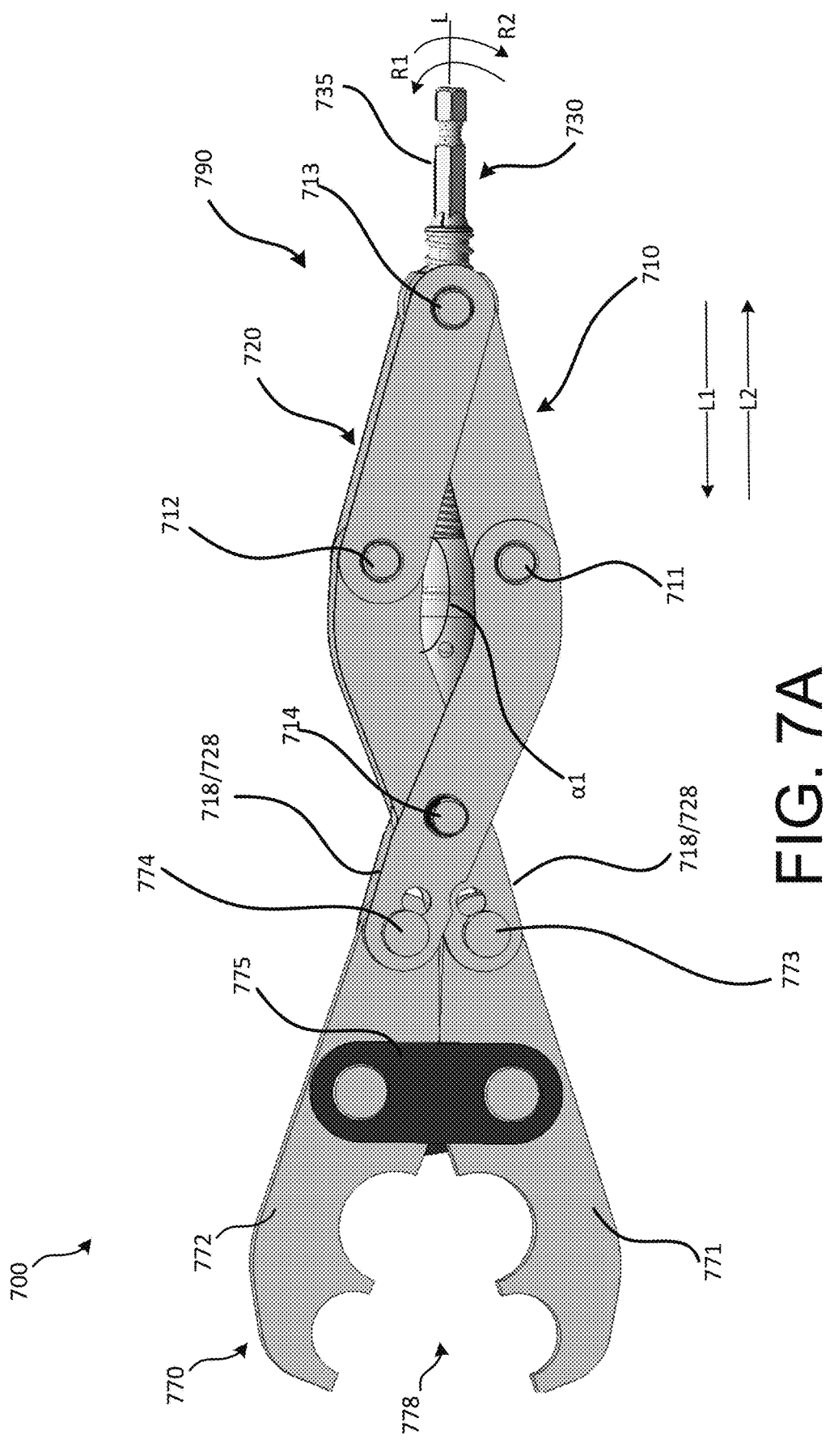
FIG. 7A is a perspective view of an example crimping accessory in an open state.
Figure 7B:
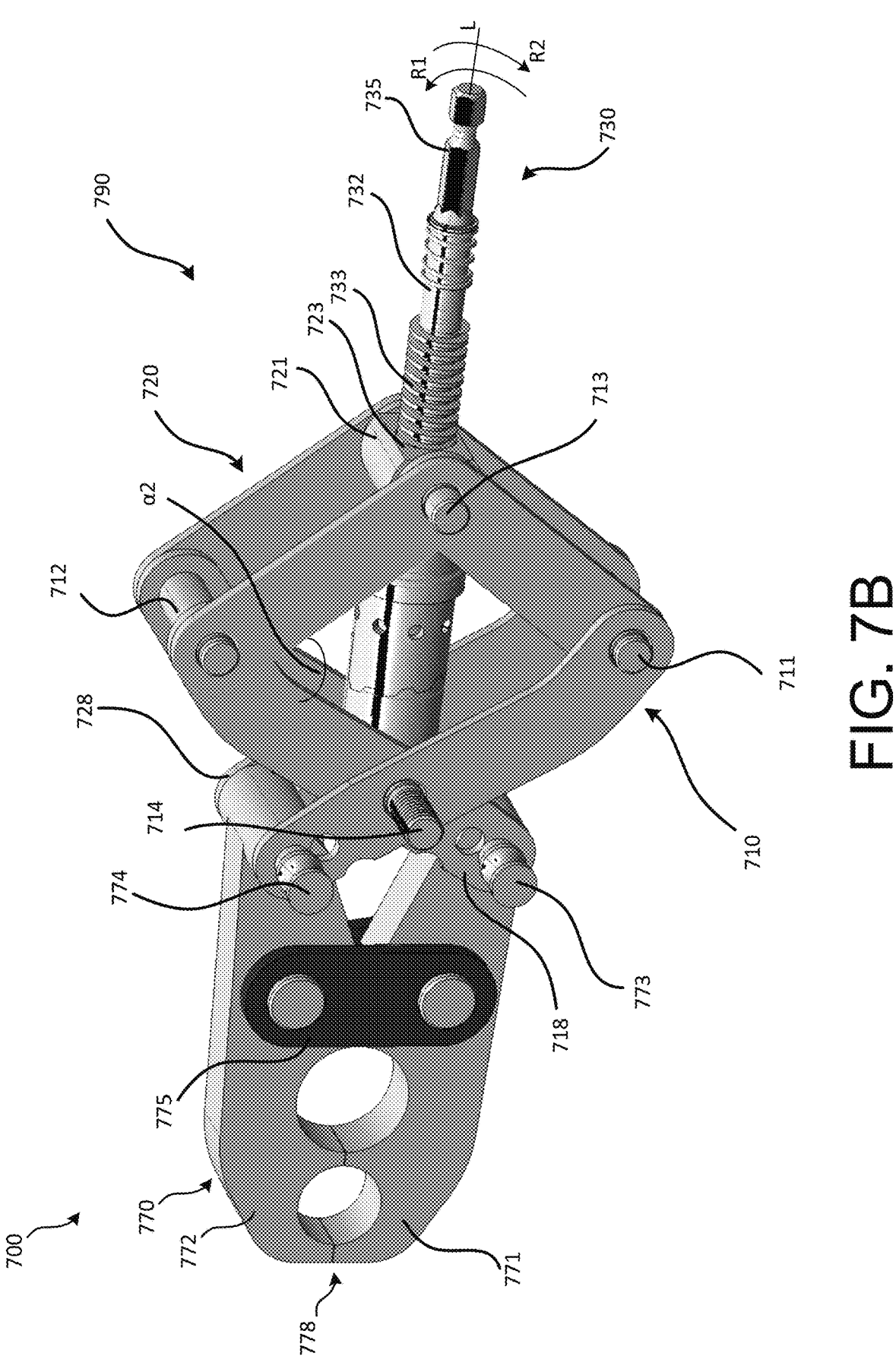
FIG. 7B is a perspective view of the example crimping accessory in a closed state.
Figure 7C:
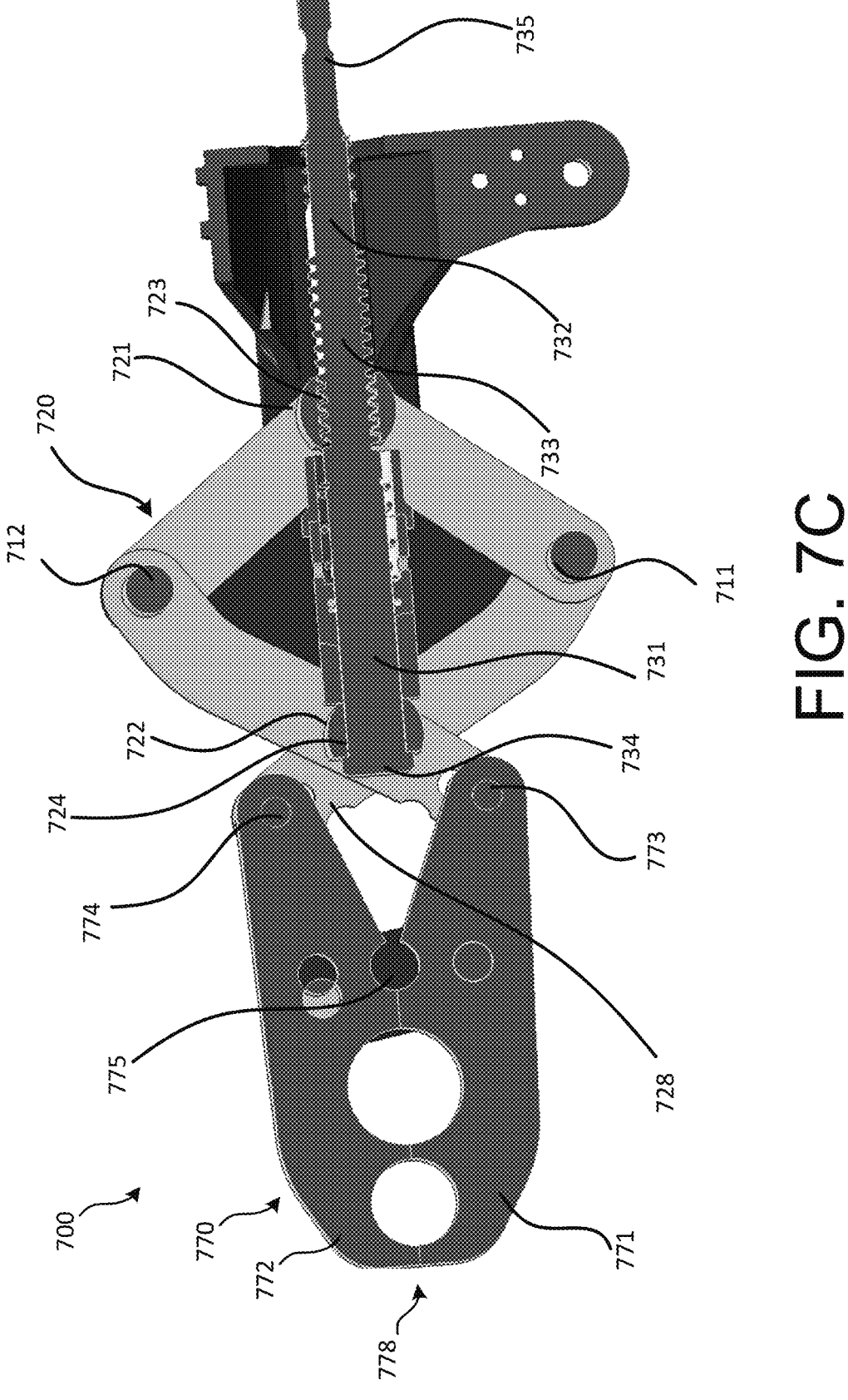
FIG. 7C is a cross-sectional view of the example crimping accessory in the closed open state.
Figure 7D:
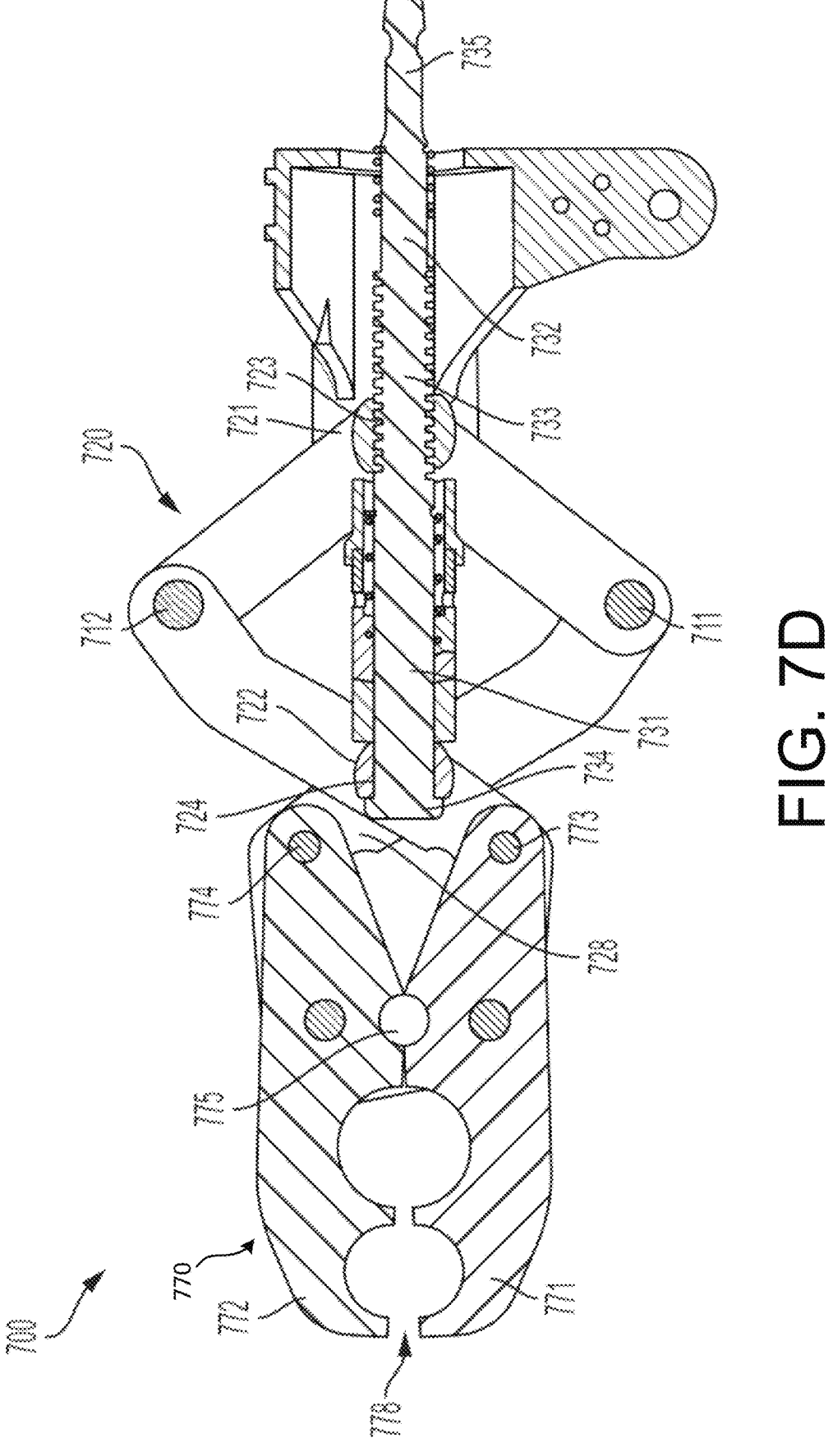
FIG. 7D is a perspective view of the example crimping accessory in a partially open state.
Figure 7E:
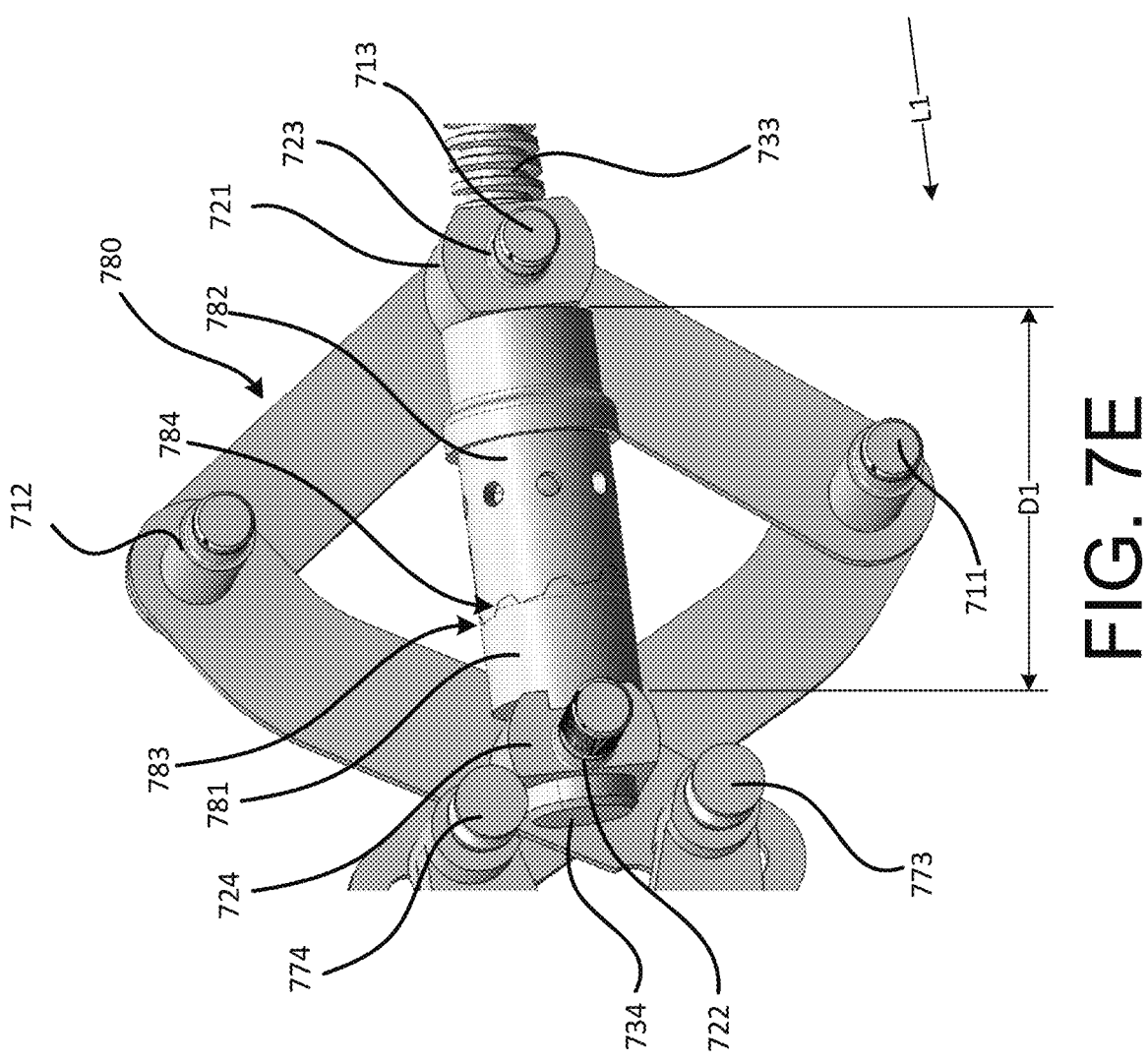
FIGS. 7E and 7F illustrate an example adjustment mechanism.
Figure 7F:
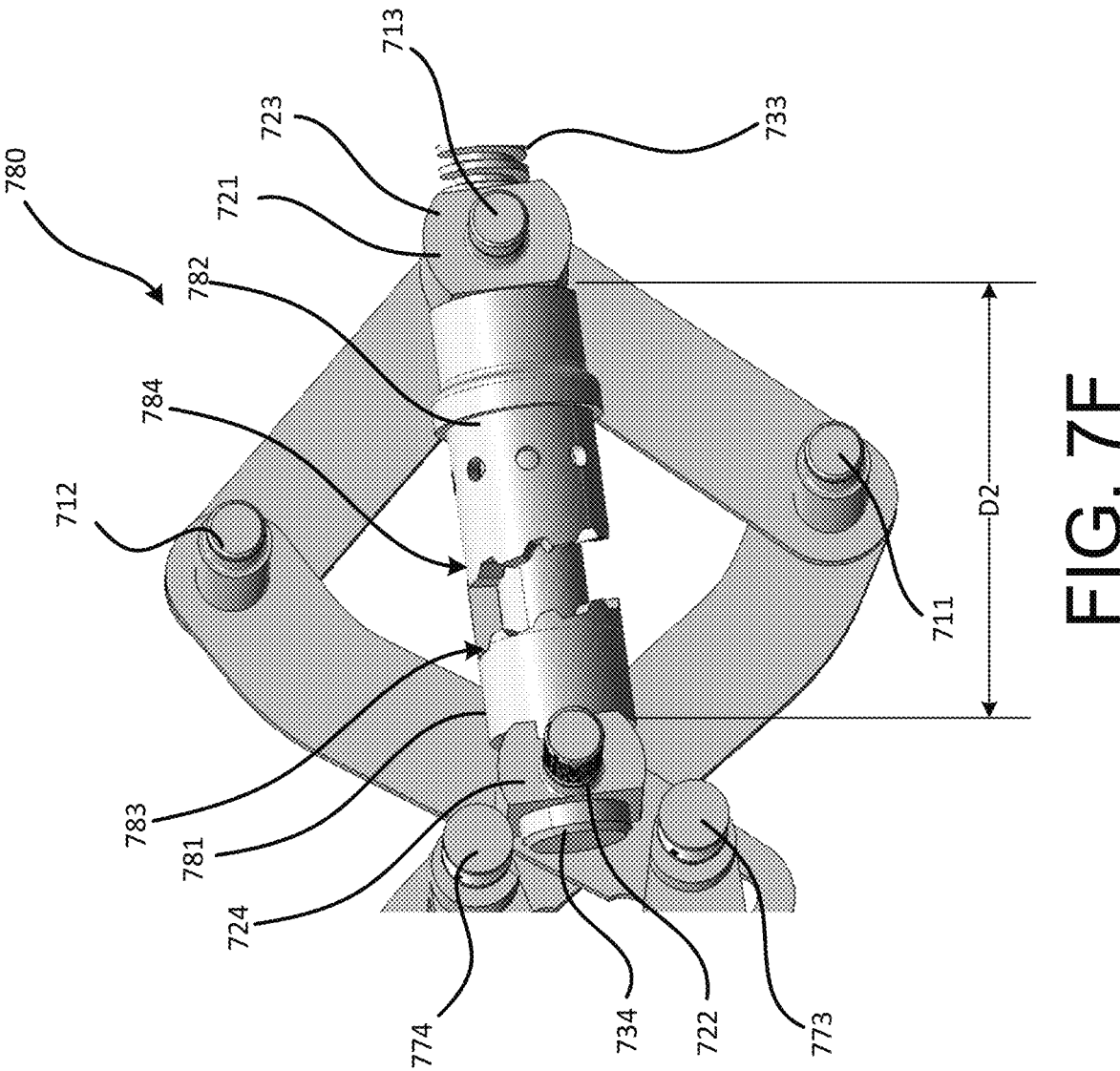
Figure 7G:
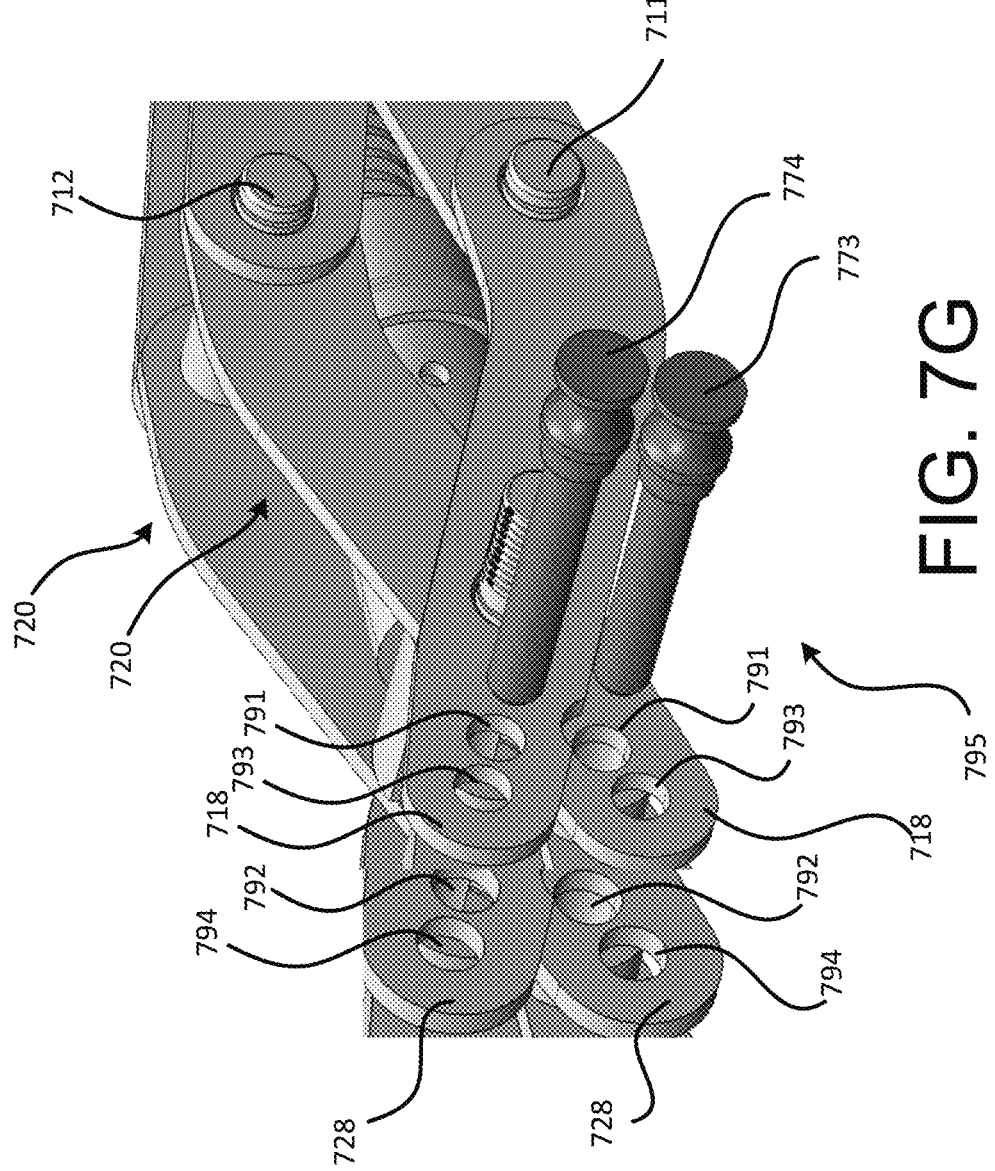
FIG. 7G illustrates an example coupling mechanism.

FIGS. 7A-7G illustrate an example crimping accessory 700, in accordance with implementations described herein. In particular, FIG. 7A is a side view of the example crimping accessory 700 in a neutral, or fully open state. FIG. 7B is a perspective view of the example crimping accessory 700 in an actuated, or fully closed state. FIG. 7C is a cross-sectional view of the example crimping accessory 700 in the actuated, or fully closed state. FIG. 7D is a side view of the example crimping accessory 700 in a partially open state, or a released state. FIGS. 7E and 7F illustrate an example adjustment mechanism of the example crimping accessory 700. FIG. 7G illustrates the removable coupling of an accessory tool from an example actuation mechanism of the example crimping accessory.

As shown in FIGS. 7A-7D, the example crimping accessory 700 includes an actuation mechanism 790 coupled to a crimping tool 770. The actuation mechanism 790 includes a rod 730 including a coupling portion 735 at a first end portion thereof, and a head portion 734 at a second end portion thereof. The coupling portion 735 is configured to be coupled to, for example, the tool holder 170 of the example rotary power tool 100. The rod 730 includes a threaded portion 733 positioned between a first unthreaded portion 731 and a second unthreaded portion 732. The actuation mechanism 790 comprises an arm assembly that includes a first set of jack arms 710 and a second set of jack arms 720 coupled to the rod 730. Jack pins 711, 712 provided at corresponding first and second vertices of the first and second sets of jack arms 710, 720 (for example, an upper vertex and a lower vertex in the example orientation shown in FIGS. 7A-7D) provide for pivoting motion of the first and second sets of jack arms 710, 720. A trunnion in the form of a first cross bar 721 is coupled between the first set of jack arms 710 and the second set of jack arms 720 by a set of jack pins 713 at a first end portion of the first and second sets of jack arms 710, 720 (for example, a rear end portion in the example orientation shown in FIGS. 7A-7D). A trunnion in the form of a second cross bar 722 is coupled between the first set of jack arms 710 and the second set of jack arms 720 by a set of jack pins 714 at a second end portion of the first and second sets of jack arms 710, 720 (for example, a front end portion in the example orientation shown in FIGS. 7A-7D). The rod 730 extends through a threaded opening 723 in the trunnion, or first cross bar 721, and is selectively engaged with the threaded portion 733 of the rod 730. The rod 730 extends through an opening 724 in the second cross bar 722, such that the head portion 734 abuts an outer surface of the second cross bar 722.

The crimping tool 770 includes a first jaw 771 and a second jaw 772 that define a working area 778 therebetween. A jaw pin 773 pivotably couples an end portion of the first jaw 771 to the first and second sets of jack arms 710, 720. A jaw pin 774 pivotably couples an end portion of the second jaw 772 to the first and second sets of jack arms 710, 720. A bracket 775 extends between the first and second jaws 771, 772 to maintain a relative alignment of the first and second jaws 771, 772.

In the open state shown in FIG. 7A, a workpiece including, for example tubing and/or piping to be coupled or joined by a crimp ring, may be positioned in the working area 778 for joining or coupling. In response to rotation of the rod 730 in a first rotational direction R1 (for example, in response to a force applied by operation of the example rotary power tool 100) the engagement of the threaded portion 733 of the rod 730 and the threaded opening 723 in the trunnion, or first cross bar 721 may cause the trunnion, or first cross bar 721 to move in a first longitudinal direction L1 along the rod 730. Due to the coupling of the first and second sets of jack arms 710, 720 to the trunnion, or first cross bar 721 (via the pins 713), longitudinal movement of the trunnion, or first cross bar 721 in the first longitudinal direction L1 causes the end portions of the first and second sets of jack arms 710, 720 to move longitudinally along the rod 730, and the first and second sets of jack arms 710, 720 to pivot at the vertices coupled by the jack pins 711, 712. This movement of the actuation mechanism 790 in turn moves the crimping tool 770 attached to the actuation mechanism 790 from the open position shown in FIG. 7A to the closed position shown in FIG. 7B. In particular, this longitudinal movement of the trunnion, or first cross bar 721 and the corresponding pivoting movement of the first and second sets of jack arms 710, 720 in turn causes a pivoting motion of the end portions of the first and second jaws 771, 772 coupled to the first and second sets of jack arms 710, 720 via the jaw pins 773, 774. In the closed position, a force may be applied to the crimp ring to join or couple the elements of the workpiece received in the working area 778.

Continued rotation of the rod 730 in the direction R1 and continued axial movement of the trunnion, or first cross bar 721 in the direction L1 may cause the threaded opening 723 in the trunnion, or first cross bar 721 to be disengaged from the threaded portion 733 of the rod 730, and move onto the first unthreaded portion 731 of the rod 730. In this disengaged state, continued rotation of the rod 730 in the first rotational direction R1 (due to, for example, continued application of force in the first rotational direction R1 from the example rotary power tool 100) will not cause any further longitudinal movement of the trunnion, or first cross bar 721. The first unthreaded portion 731 may represent a neutral zone, in which a relative position of the first and second jaws 771, 772 remains substantially unchanged, even in response to the further application of rotational force to the rod 730 in the first direction R1. Thus, the neutral zone defined by the first unthreaded portion 731 may function as a force limiting mechanism, which controls or limits an amount of force to be exerted on elements received in the working area 778 to be joined or coupled. In some examples, disengagement of the threaded opening 723 in the trunnion, or first cross bar 721 and the threaded portion 733 of the rod 730, and positioning of the trunnion, or first cross bar 721 on the first unthreaded portion 731 of the rod 730 may cause first and second jaws 771, 772 to open slightly, and move from the fully closed position shown in FIG. 7B to the partially open position shown in FIG. 7D. In the partially open position, the completed workpiece may be removed from the working area 778 between the first and second jaws 771, 772.

As shown in FIG. 7A, in the fully open position, a first angle α1 is formed between adjacent jack arms joined by the jack pin 711 and/or adjacent jack arms joined by the jack pin 712 (in this example, an obtuse angle). As shown in FIG. 7B, in the fully closed position, a second angle α2, that is less than the first angle, is formed between adjacent jack arms joined by the jack pin 711 and/or adjacent jack arms joined by the jack pin 712 (in this example, an acute angle). As shown in FIG. 7D, in the partially open position, a third angle α3, that is less than the first angle α1 and greater than the second angle α2, is formed between adjacent jack arms joined by the jack pin 711 and/or adjacent jack arms joined by the jack pin 712 (in this example, an acute angle).

As shown in FIGS. 7E and 7F, in some examples, an adjustment mechanism 780 is positioned on the first unthreaded portion 731 of the rod 730 to provide for adjustment of a separation distance between working portions of the first and second jaws 771, 772 and a corresponding adjustment in the maximum force applied to a workpiece positioned between the first and second jaws 771, 772. The adjustment mechanism 780 includes a first cylinder portion 781 and a second cylinder portion 782. The first cylinder portion 781 includes a plurality of teeth 783 formed on an inclined helical surface. The second cylinder portion 782 includes a plurality of teeth 784 formed on an inclined helical surface, facing the plurality of teeth 783 formed on the inclined helical surface of the first cylinder portion 781. The first cylinder portion 781 may be coupled to the second cross bar 722. The second cylinder portion 782 may be axially movable on the rod 730 and rotatably adjustable relative to the first cylinder portion 781 on the first unthreaded portion 731 of the rod 730. The teeth 784 of the second cylinder portion 782 may engage the teeth 783 of the first cylinder portion 781. A degree of engagement of the teeth 783, 784 may be based on a rotational position of the second cylinder portion 782 relative to the first cylinder portion 781. That is, depending on a rotational position of the second cylinder portion 782, all, or some, or only one of the teeth 784 of the second cylinder portion 782 may be engaged with the teeth 783 of the first cylinder portion 781. The relative rotational position of the first and second cylinder portions 781, 782 effectively changes an overall length of the adjustment mechanism 780, as the teeth are formed on helical surfaces of the first and second cylinder portions 781, 782. This, in turn, effectively changes a separation distance between the first cross bar or trunnion 721 and the second cross bar 722. As the distance between the first and second cross bars 721, 722 changes, the angle α between adjacent jack arms joined by the jack pin 711 and/or the jack pin 712 changes, to in turn adjust a separation distance between the working portions of the first and second jaws 771, 772.

FIG. 7E illustrates a first example position in which all of the teeth 783, 784 of the first and second cylinder portions 781, 782 are engaged. In this arrangement, the adjustment mechanism 780 has a shortest overall D1. In this position, the trunnion, or first cross bar 721 can travel the furthest forward in the direction L1 toward the second cross bar 722, until the trunnion, or first cross bar 721 abuts the end portion of the second cylinder portion 782, as shown in FIG. 7E. This arrangement provides for the maximum possible crimping or clamping force between the first and second jaws 771, 772. FIG. 7F illustrates a second position, in which only a single tooth 784 (for example, the most axially forward tooth) of the second cylinder portion 782 engages the first cylinder portion 781, so that the adjustment mechanism 780 has greatest possible over length D2. In this position, the trunnion, or first cross bar 721 cannot travel as far forward in the direction L1 until it abuts the end portion of the second cylinder portion 782. This arrangements provides for a minimum possible crimping or clamping force between the first and second jaws 771, 772. The second cylinder portion 782 can be rotationally adjusted to a series of other discrete rotational positions relative to the first cylinder portion 781 for a series of intermediate overall lengths of the adjustment mechanism 780, to provide for a plurality of intermediate crimping or clamping forces between the first and second jaws 771, 772. In some examples, the second cylinder portion 782 may include a plurality of pin holes about its circumference that may be engaged by a pin or ball detent (not shown) to help retain the second cylinder portion 782 in the selected rotational position.

FIG. 7G illustrates an example coupling mechanism 795 which may be used to removably couple an accessory tool, such as, for example, the crimping tool 770 or another type of accessory tool, to the example actuation mechanism 790. As shown in FIG. 7G, in some examples, openings, for example multiple openings, may be formed in coupling portions 718, 728 of the first and second sets of jack arms 710, 720 for connection to the first and second jaws 771, 772 by the jaw pins 773, 774. In the example shown in FIGS. 7A-7G, and in detail in FIG. 7G, multiple openings are formed in the coupling portions 718, 728 of the first and second sets of jack arms 710, 720. In particular, in this example, a first opening 791 and a second opening 793 are formed in the first coupling portions 718 of the first set of jack arms 710. A first opening 792 and a second opening 794 are formed in the second coupling portions 728 of the second set of jack arms 720. The multiple openings may provide for the detachable coupling of multiple different types of accessory tools, including the example crimping tool 770 and the example pinching tool described above, as well as other accessory tools not specifically shown and described herein. In the example shown in FIG. 7G, the first jaw pin 773 and the second jaw pin 774 are insertable into/removable from the first openings 791 formed in the coupling portions 718 of the first set of jack arms 710 and the first openings 792 formed in the coupling portions 728 of the second set of jack arms 720 to detachably couple the example crimping tool 770 to the first and second sets of jack arms 710, 720 via corresponding openings in the first and second jaws 510, 520 of the pinching tool. In some examples, the first and second jaw pins 773, 774 may be insertable into/removable from the second openings 793 formed in the coupling portions 718 of the first set of jack arms 710 and the second openings 794 formed in the coupling portions 728 of the second set of jack arms 720 to detachably couple another accessory tool, such as, for example, the example crimping tool or other such accessory tool, to the first and second sets of jack arms 710, 720 via corresponding openings in the first and second jaws 771, 772 of the crimping tool 770. This allows the crimping tool 770, and other such accessory tools, to be easily attached to/detached from the actuation mechanism 790, and easily replaced with another type of accessory tool that can be actuated by the actuation mechanism 790 in response to operation of the example rotary power tool 100 coupled thereto.

Figure 8A:
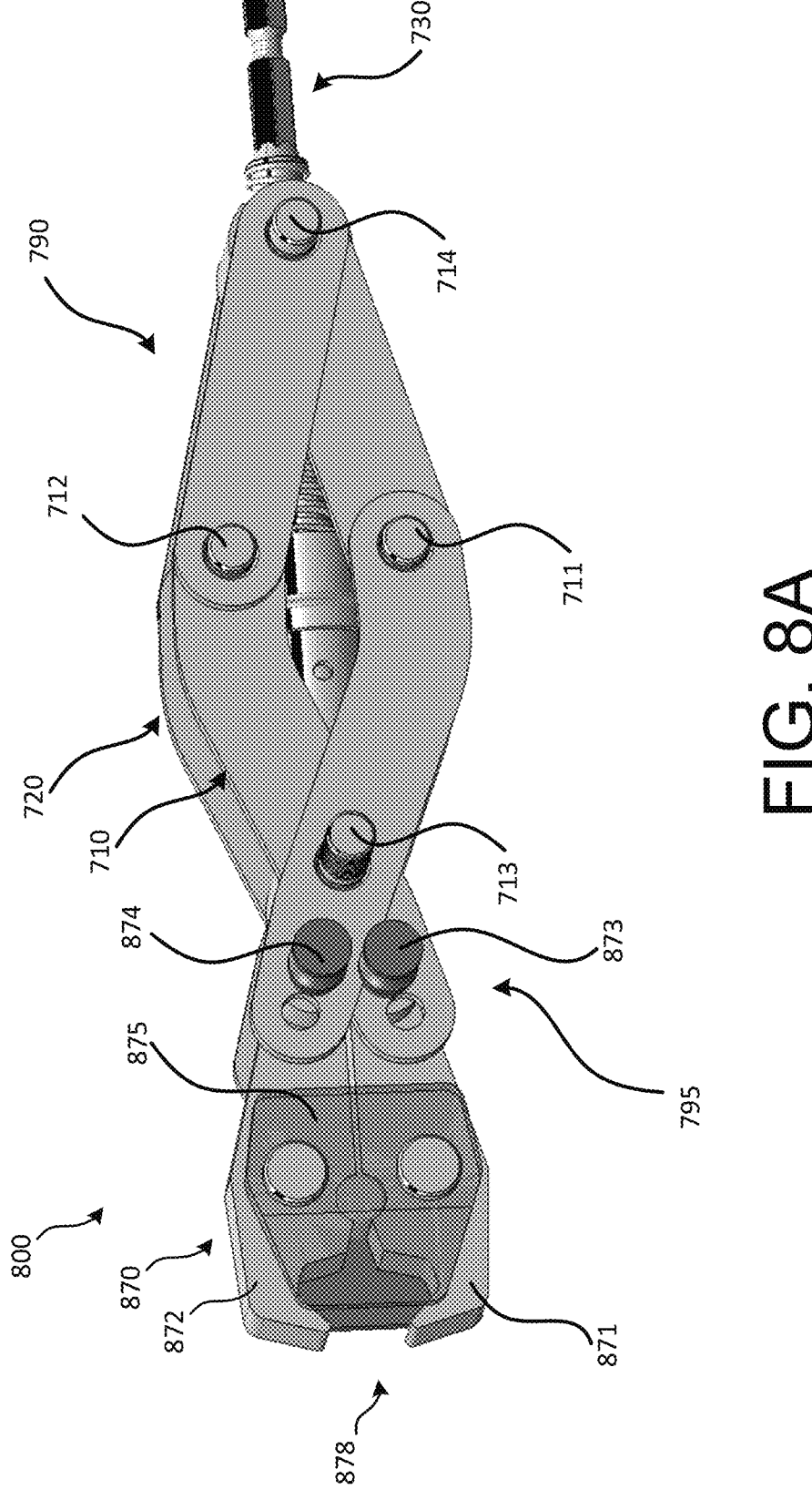
FIG. 8A is a perspective view of an example pinching accessory in an open state.
Figure 8B:
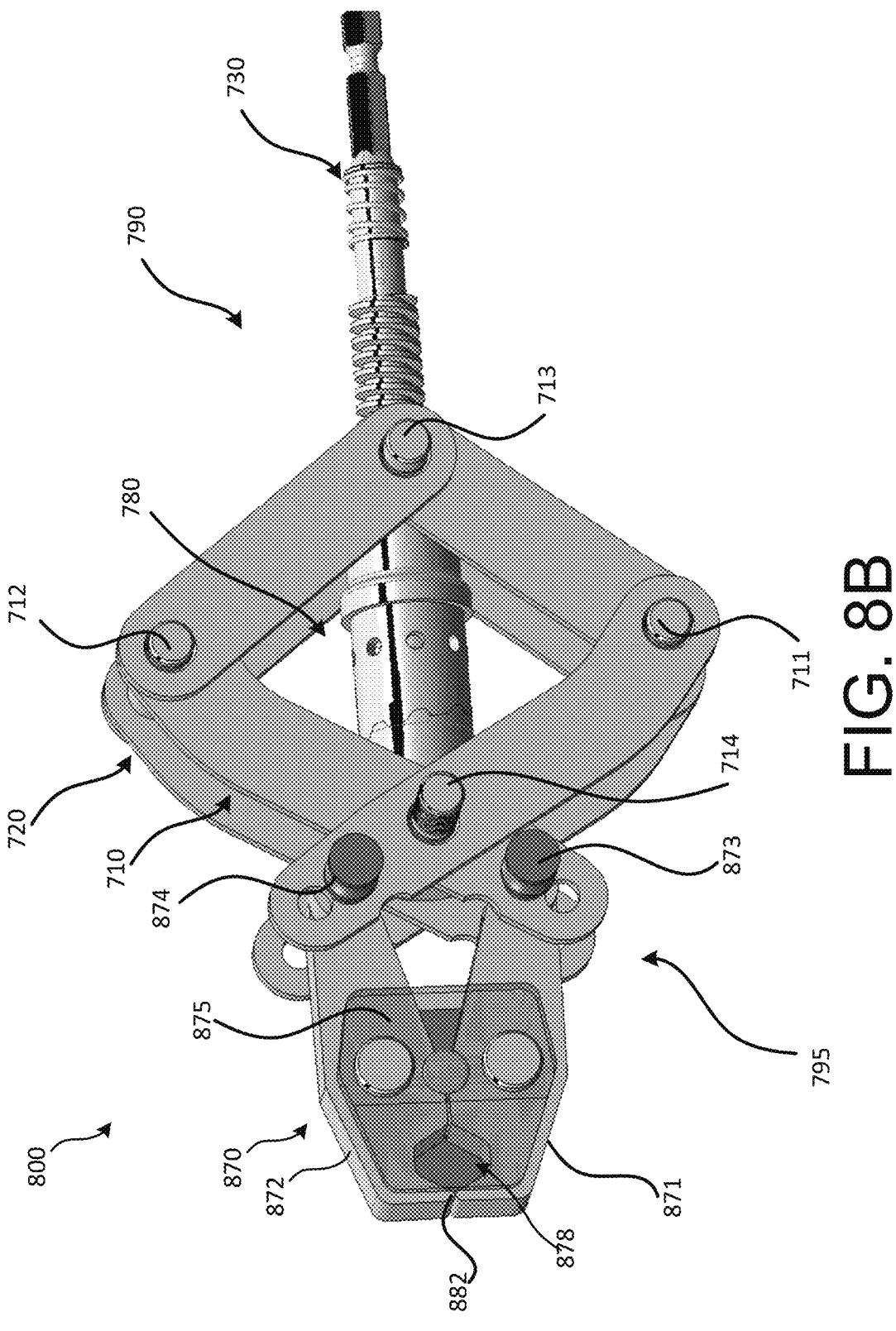
FIG. 8B is a perspective view of the example pinching accessory in a closed state.
Figure 8C:
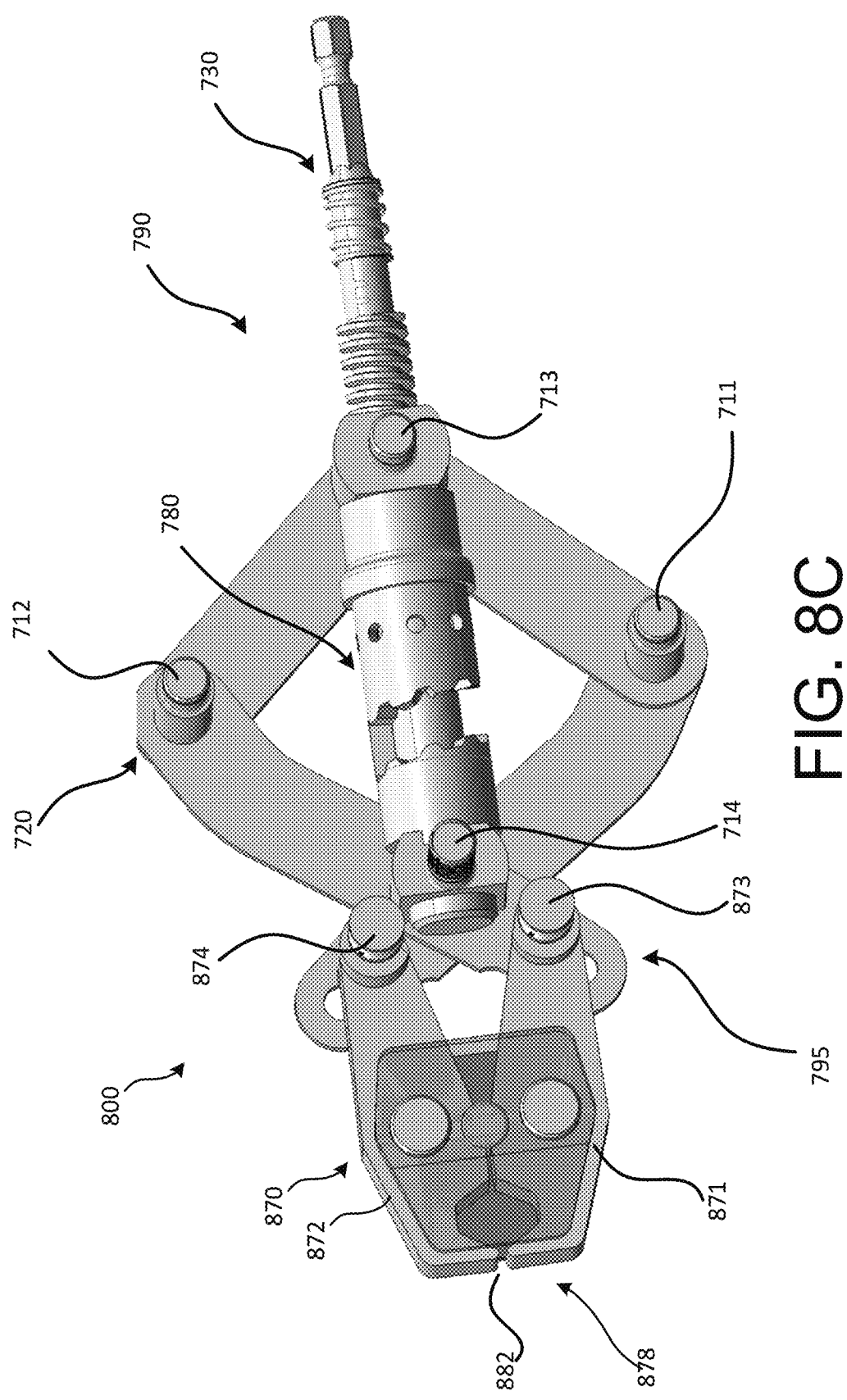
FIG. 8C is a perspective view of the example pinching accessory in a partially open state.

FIGS. 8A-8C illustrate an example pinching accessory 800, in accordance with implementations described herein. In particular, FIG. 8A is a perspective view of the example pinching accessory 800 in a neutral, or fully open state. FIG. 8B is a perspective view of the example pinching accessory 800 in an actuated, or fully closed state. FIG. 8C is a is a perspective view of the example pinching accessory 800 in a partially open state, or a released state.

As shown in FIGS. 8A-8C, the example pinching accessory 800 includes the example actuation mechanism 790 coupled to a pinching tool 870. The example actuation mechanism 790 shown in FIGS. 8A-8C is similar to the example actuation mechanism 790 described above with respect to FIGS. 7A-7G, and thus duplicative detailed description of the example actuation mechanism 790 will be omitted.

The pinching tool 870 of the example pinching accessory 800 may include a first jaw 871 and a second jaw 872 that define a working area 878 therebetween. A jaw pin 873 pivotably couples an end portion of the first jaw 871 to the first and second sets of jack arms 710, 720. A jaw pin 874 pivotably couples an end portion of the second jaw 872 to the first and second sets of jack arms 710, 720. A bracket 875 extends between the first and second jaws 871, 872 to maintain a relative alignment of the first and second jaws 871, 872.

Pivotal coupling of the first jaw 871 and the second jaw 872 in this manner allow the example pinching accessory 800 to move between the open/neutral state and the closed/ actuated state, and the partially open/released state. In the open state, or neutral state, the working area 878 defined between the first and second jaws 871, 872 is open, provid- ing for insertion of at least a portion of a workpiece. In the example pinching accessory 800, the working area 878 provides for insertion of a tab portion of a pinch ring, to provide for the joining of, for example, tubing and/or piping and/or fitting using the pinch ring. In the example shown in FIGS. 8A-8C, a gap 882 is formed between the end portions of the first and second jaws 871, 872 in the actuated state, to allow for the tab portion of the pinch ring to protrude through the gap 882. In the closed state, a force is exerted on the tab portion of the pinch ring to tighten the pinch ring and secure a coupling of the elements to be joined by the pinch ring. In the partially open state, the first and second jaws 871, 872 are moved apart, so that the joined elements of the workpiece can be removed from the working area 878.

The operation of the elements of the actuation mechanism 790 in moving the pinching tool 870 between the fully open/unactuated state and the fully closed/actuated state and the partially open/released state is similar to that which is described above with respect to the example crimping accessory 700 shown in FIGS. 7A-7D, and thus further duplicative detailed description will be omitted.

Operation of the elements of the adjustment mechanism 780 in adjusting a separation distance of the first and second jaws 871,872 of the example pinching tool 870 and a resulting magnitude of force applied in the working area 878, is similar to that which is described above with respect to FIGS. 7E and 7F, and thus further duplicative detailed description will be omitted.

The coupling mechanism 795 described above with respect to FIG. 7G may allow a variety of different accessory tools to be used with the actuation mechanism 790 described above, including, for example the crimping tool 770 and the pinching tool 870, described above, as well as other such accessory tools.

Alternative embodiments are within the scope of the implementations described above. For example, in some embodiments, the first and second jaws 210, 220 and the first and second jaws 510, 520 may be removably and inter- changeably coupled to the arm portions 208, 209 of the accessory 200 shown in FIGS. 2A-3F. In other embodi- ments, the first and second jaws 210, 220 and the first and second jaws 510, 520 may be removably and interchange- ably coupled to the arm portions 208, 209 of the accessory 200 shown in FIGS. 5A-6E. In yet other embodiments, the spacing or crimping/clamping force of the jaws 771, 772 and 871, 872 and/or the spacing or angle of the jack arms 710, 720 may be adjustable by use of the adjustment mechanism 400 of FIGS. 4A-4F, e.g., by replacing one or more of the jack pins 711-714 with a pin having an eccentric portion that can be adjusted to different angular positions. In further embodiments, the spacing or crimping/clamping force of the jaws 210, 220 and 510, 520 and/or the spacing of the arm portions 208, 209 and 508, 509 may be adjustable by use of the adjustment mechanism 780, e.g., by including first and second adjustment cylinders over the partially threaded rod between the trunnion 250, 550 and the support member 247, 547 to adjust the limit of travel distance of the trunnion along the rod.

FIGS. 9A-9D illustrate another example crimping acces- sory 200 that includes an example actuation mechanism 900, in accordance with implementations described herein. FIGS. 9A-9D illustrate the example actuation mechanism 900 incorporated into an example crimping accessory 200', which may be similar to the example crimping accessory 200 shown in FIGS. 2A-3F, simply for purposes of discus- sion and illustration. The principles to be described herein with respect to the example actuation mechanism 900 can be applied to the example pinching accessory 500 shown in FIGS. 5A-6E, and/or the example crimping accessory 700 shown in FIGS. 7A-7G, and/or the example pinching acces- sory 800 shown in FIGS. 8A-8C. Similarly, the principles described herein can be applied to other accessory tools not explicitly shown herein.

Figure 9A:
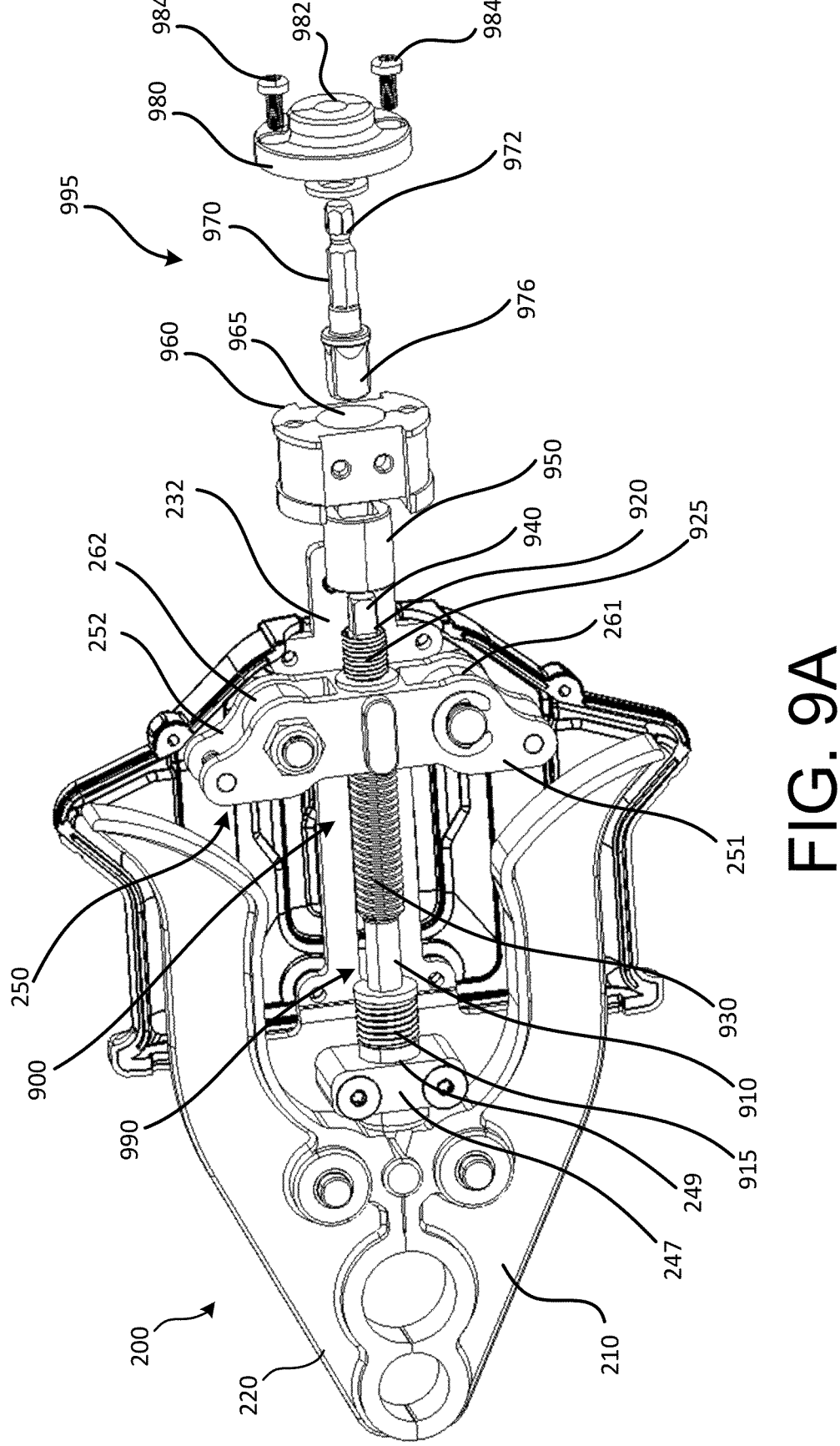
FIG. 9A is a side view of an example crimping accessory, including an exploded side view of an example coupling portion of an example actuation mechanism.
Figure 9B:
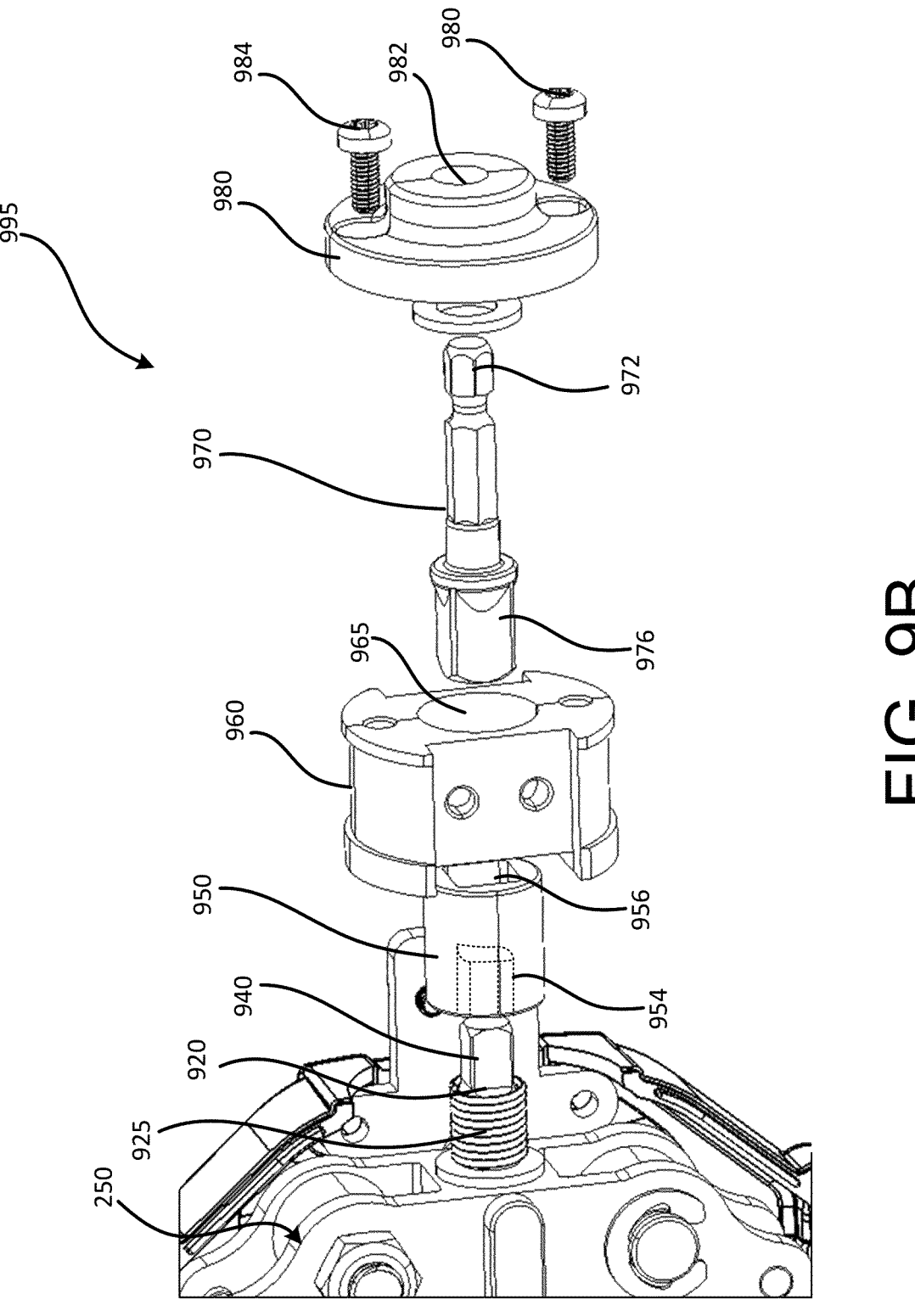
FIG. 9B is a close in view of the example coupling portion shown in FIG. 9A.
Figure 9C:
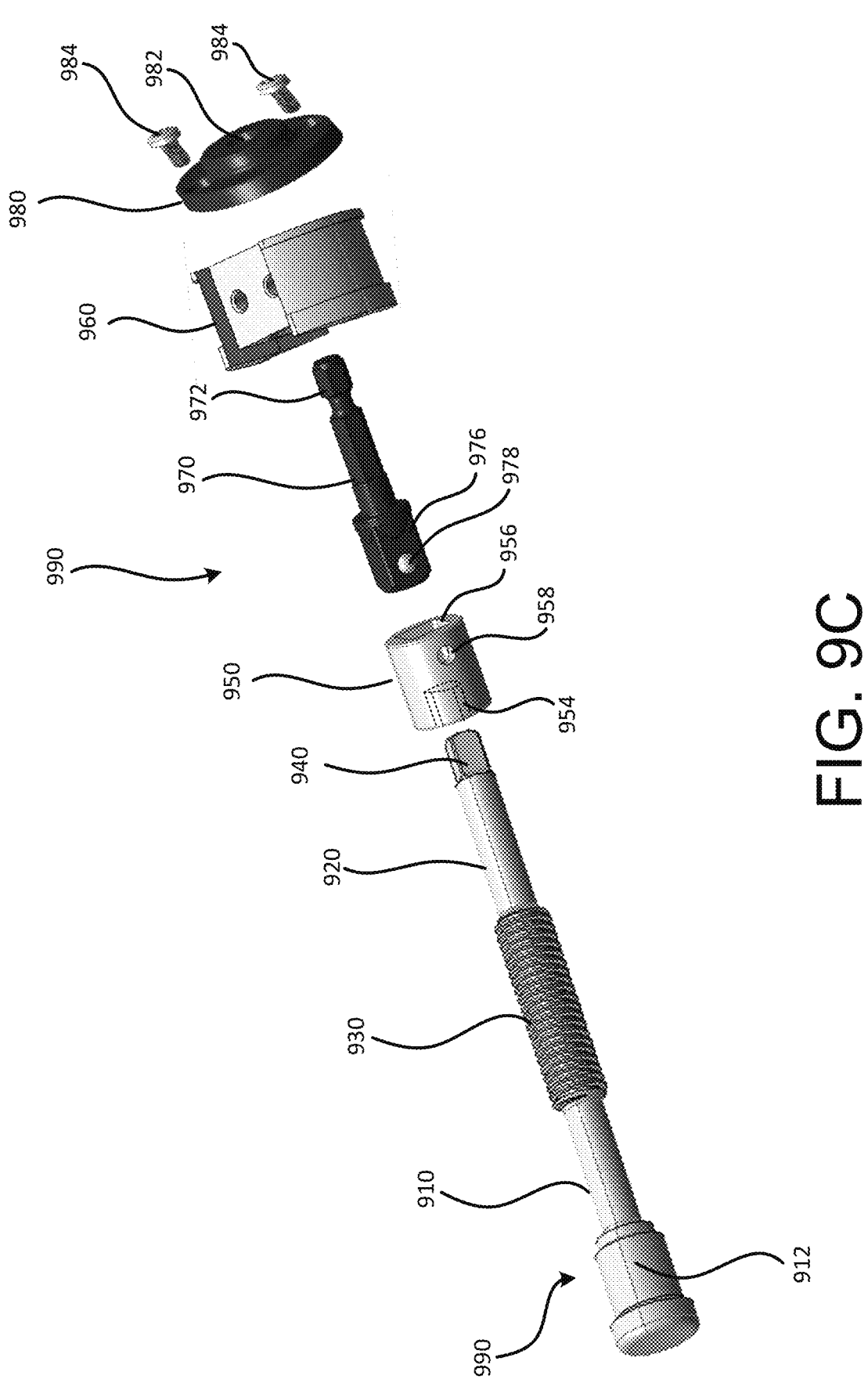
FIG. 9C is an exploded perspective view of some of the components of the example actuation mechanism shown in FIG. 9A.
Figure 9D:
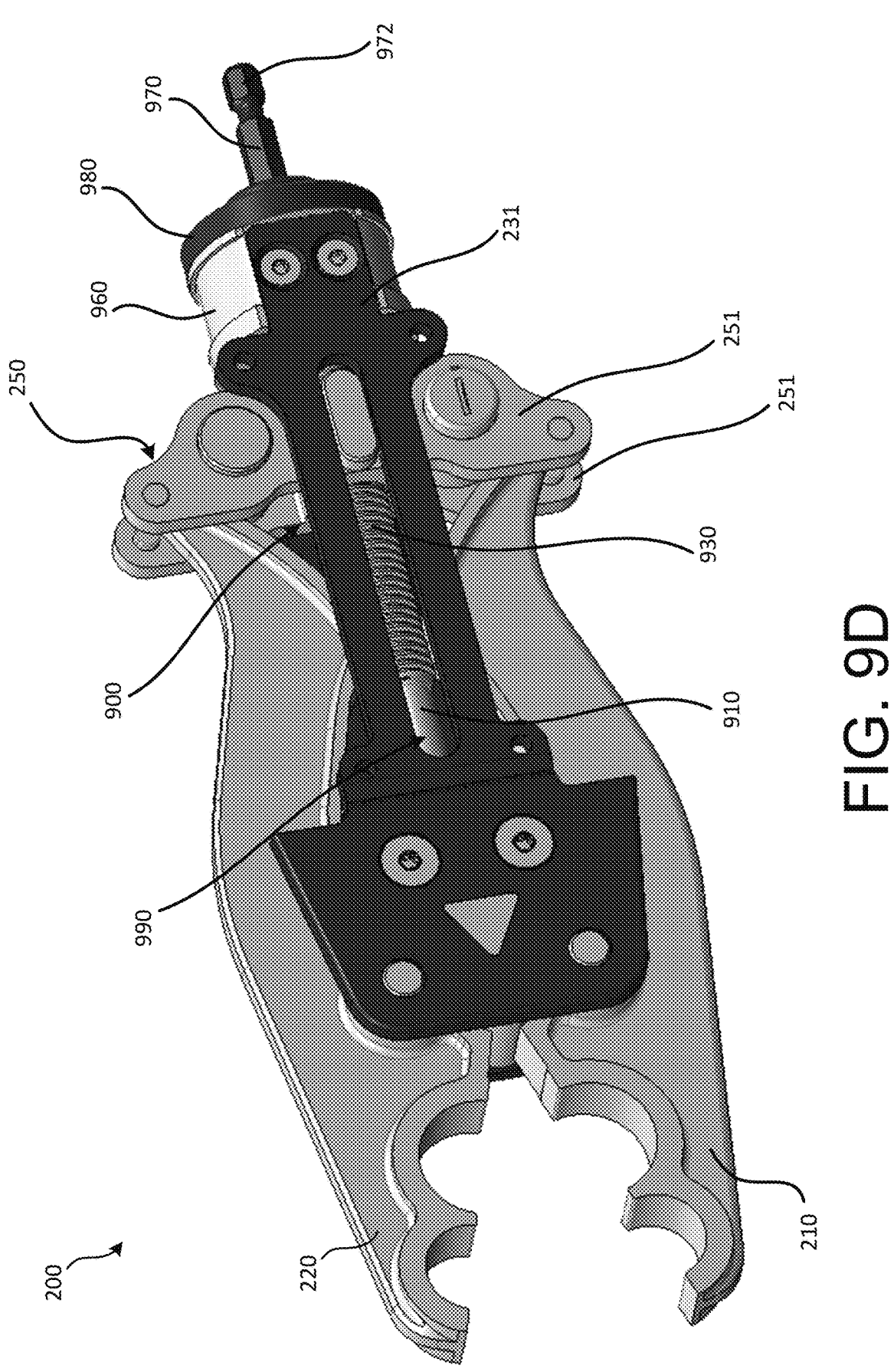
FIG. 9D is an assembled perspective view of the example crimping accessory including the example actuation mechanism shown in FIG. 9A.

FIG. 9A is a side view of the example crimping accessory 200, including an exploded side view of an example cou- pling portion 995 of the example actuation mechanism 900. FIG. 9B is a close in view of the example coupling portion 995 of the example actuation mechanism 900. In FIGS. 9A and 9B, a first guide plate of the example crimping accessory is removed, so that components of the example actuation mechanism 900 are more easily visible. FIG. 9C is an exploded perspective view of some of the components of the example actuation mechanism 900 including the example coupling portion 995. FIG. 9D is an assembled perspective view of the example crimping accessory including the example actuation mechanism 900. As some of the features described above with respect to the example crimping accessory 200 are included in the example illustrated FIGS. 9A-9D, duplicative detailed description thereof will be omitted except where necessary.

As shown in FIGS. 9A-9D, the example actuation mechanism 900 includes a rod 990 that is coupled through the trunnion 250, between the first guide plate 231 (not shown in FIGS. 9A and 9B; see FIG. 9D) and the second guide plate 232 of the guide assembly. The rod 990 includes a threaded portion 930, positioned between a first unthreaded portion 910 and a second unthreaded portion 920. A first biasing member 915 is fitted on the first unthreaded portion 910 of the rod 990, and a second biasing member 925 is fitted on the second unthreaded portion 920 of the rod 990. A support portion 912 at a first end portion of the rod 990 includes a shank portion that is received through the opening 249 in the support member 247, and a head portion that is positioned against an outer surface of the support member 247. A coupling portion 940 is formed at a second end portion of the rod 990. In the example shown in FIGS. 9A-9D, the coupling portion 940 has a non-circular or polygonal, such as a substantially rectangular or square, cross-sectional shape.

In the example arrangement shown in FIGS. 9A-9D, the coupling portion 995 of the example actuation mechanism 900 includes a bushing 950 that provides for coupling of the coupling portion 940 of the rod 990 and a tool adapter 970. In particular, the coupling portion 940 of the rod 990 is received in a first opening 954 in the bushing 950. A contour, or shape, of the opening 954 in the bushing 950 may correspond to the non-circular or polygonal, e.g., rectangular or square, cross-sectional shape of the coupling portion 940 of the rod 990, so as to non-rotatably and/or fixedly couple the rod 990 to the bushing 950. Similarly, a coupling portion 976 of the tool adapter 970 may have a non-circular or polygonal, e.g., a substantially rectangular or square, cross-sectional shape. A contour, or shape, of the opening 956 in the bushing 950 may correspond to the non-circular or polygonal, e.g., rectangular or square, cross-sectional shape of the coupling portion 976 of the tool adapter 970, so as to non-rotatably or fixedly couple the adapter to the bushing 950. In some examples, one of the bushing 950 or the tool adapter 970 includes a ball or detent 978 that interacts and engages with an opening or recess 958 in the other of the bushing 950 or the tool adapter 970, to provide for axial retention of the tool adapter 970 in the bushing 950. The bushing 950 is received in an opening 965 formed in a fitting 960 to which the first and second guide plates 231, 232 are coupled. An engagement portion 972 of the tool adapter 970 extends through an opening 982 in a cap 980, and the cap 980 is coupled to the fitting 960 by, for example, one or more fasteners 984.

In this manner, the tool adapter 970 and the rod 990 are non-rotatably coupled to the bushing 950, and thus rotate together in response to a driving force generated by the example rotary power tool 100. That is, a driving force generated by the example rotary power tool 100 may be transmitted, via the engagement portion 972 of the tool adapter 970 and the bushing 950, to the rod 990. Rotation of the rod 990 causes the trunnion, engaged with the threaded portion 930 of the rod 990, to move longitudinally along the rod 990. Movement of the trunnion 250 along the rod 990 causes the first and second jaws 210, 220 of the example crimping accessory 200 to close or open, depending on the direction of longitudinal movement of the trunnion 250 along the rod 990, as described above in detail. That is, the movement of the trunnion 250 engaged with the threaded portion 930 of the rod 990, in a first direction along the rod 990, causes a closing of the first and second jaws 210, 220 of the example crimping accessory 200. Continued movement of the trunnion 250 along the rod, from the threaded portion 930 onto the first unthreaded portion 910 of the rod 990, causes a slight opening of the first and second jaws 210, 220, providing for release of a workpiece. Movement of the trunnion 250 along the rod 990 in a second direction causes an opening of the first and second jaws 210, 220 of the example crimping accessory 200.

In some situations, the example actuation mechanism 900 including the example rod 990 and the example coupling portion 995 as described above with respect to FIGS. 9A-9D, may provide for relatively rapid removal and replacement of the tool adapter 970. This may facilitate removal and replacement of worn parts, replacement with tool adapters including more durable materials, different sizes, different configurations for coupling to different rotary power tools, and the like. In an implementation, the tool adapter 970 may have a configuration similar to a standard hex shank to square head socket adapter, such as a DEWALT DW2547IR socket adapter, sold by DeWalt Industrial Tool Co., to facilitate replacement of the tool adapter 970 with widely available replacement parts.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An accessory for a rotary power tool, comprising:

a rod extending along a longitudinal axis, the rod having an end portion configured to be coupled to the rotary power tool, wherein the rod is configured to rotate about the longitudinal axis in response to operation of the rotary power tool;

a first jaw having a first working portion and coupled to a first guide portion including a first cam surface;

a second jaw having a second working portion facing the first working portion and coupled to a second guide portion, the first jaw being pivotable relative to the second jaw about a fulcrum oriented transverse to the longitudinal axis, between a fully open position and a fully closed position;

a trunnion operatively coupled to the rod and configured to move in a first axial direction along the rod in response to rotation of the rod in a first direction, and to move in a second axial direction along the rod, opposite the first axial direction, in response to rotation of the rod in a second direction; and a first cam follower coupled to the trunnion and configured to engage the first cam surface to cause the first jaw to pivot relative to the second jaw, wherein the first cam surface includes a first section, a second section, and a third section, and wherein, in response to rotation of the rod in the first direction, the first cam follower is configured to sequentially engage the first, second, and third sections of the first cam surface such that the first cam follower engages the first section of the first cam surface to cause the first working portion of the first jaw to pivot toward the second working portion of the second jaw from the fully open position toward the fully closed position of the first and second jaws, the first cam follower engages the second section of the first cam surface to cause the first working portion of the first jaw to pivot toward the second working portion of the second jaw to the fully closed position of the first and second jaws to crimp or clamp a workpiece positioned between the first and second jaws, and the first cam follower engages the third section of the first cam surface to cause the first working portion of the first jaw to pivot away from the second working portion of the second jaw from the fully closed position to a partially open position of the first and second jaws.

2. The accessory of claim 1, further comprising a second cam follower rotatably coupled in a second portion of the trunnion and configured to engage a second cam surface of the second guide portion to cause the second jaw to rotate relative to the first jaw.

3. The accessory of claim 2, wherein the second cam surface includes a first section, a second section, and a third section, and wherein, in response to rotation of the rod in the first direction, the second cam follower is configured to sequentially engage the first, second and third sections of the second cam surface such that the second cam follower engages the first section of the second cam surface to cause the second working portion of the second jaw to pivot toward the first working portion of the first jaw from the fully open position toward the fully closed position, the second cam follower engages the second section of the second cam surface to cause the second working portion of the second jaw to pivot toward the first working portion of the first jaw to the fully closed position to crimp a workpiece positioned between the first and second jaws, and the second cam follower engages the third section of the second cam surface to cause the second working portion of the second jaw to pivot away from the first working portion of the second jaw to a partially open position.

4. The accessory of claim 3, wherein a contour of the first cam surface and a contour of the second cam surface are symmetric about a longitudinal centerline of the rod, such that rotational movement of the first jaw is coordinated with rotational movement of the second jaw in response to longitudinal movement of the trunnion along the rod.

5. The accessory of claim 3, wherein the second section of the first cam surface includes a first peak portion, and the second section of the second cam surface includes a second peak portion, and wherein a target force is exerted on the workpiece received between the first and second jaws when the first cam follower is positioned at the first peak portion and the second cam follower is positioned at the second peak portion.

6. The accessory of claim 1, wherein in the fully open position of the first and second jaws, the trunnion is positioned on a first unthreaded portion of the rod, in the fully closed position of the first and second jaws, the trunnion is engaged with a threaded portion of the rod, and in the partially open position of the first and second jaws, the trunnion is positioned on a second unthreaded portion of the rod.

7. The accessory of claim 1, wherein the trunnion includes:

a first elongated guide protrusion formed on an outer side of a first side portion of the trunnion, wherein the first guide protrusion is slidably received in a first guide slot extending longitudinally along a first guide plate positioned at a first side of the rod; and a second elongated guide protrusion formed on an outer side of a second side portion of the trunnion, wherein the second guide protrusion is slidably received in a second guide slot extending longitudinally along a second guide plate positioned at a second side of the rod.

8. The accessory of claim 1, wherein the accessory comprises a crimping accessory configured to exert a crimping force on a crimping ring surrounding two elements to be joined.

9. The accessory of claim 1, wherein the accessory comprises a pinching accessory configured to exert a pinching force on a pinch ring surrounding two elements to be joined.

10. The accessory of claim 1, wherein the end portion is removably coupled to the rod, the end portion including an engagement portion configured to be coupled to a tool holder of the rotary power tool, and a coupling portion configured to be fixedly coupled to the rod.

11. An accessory for a rotary power tool, comprising:

a rod positioned between a first guide plate and a second guide plate, the rod having an end portion configured to be coupled to the rotary power tool, wherein the rod is configured to rotate about a longitudinal axis in response to operation of the power tool;

a first jaw and a second jaw coupled between the first guide plate and the second guide plate, wherein at least one of the first jaw or the second jaw is rotatable relative to the other of the first jaw or the second jaw between a fully open position and a fully closed position of the first jaw and the second jaw to crimp or clamp a workpiece positioned between the first and second jaws;

a trunnion positioned between a first guide plate and a second guide plate, wherein the rod extends through a threaded portion of the trunnion to operatively couple the trunnion on the rod, wherein the trunnion is configured to move axially along the rod in response to rotation of the rod;

at least one cam follower coupled to the trunnion and configured to engage a cam surface coupled to at least one of the first jaw or the second jaw, wherein in response to rotation of the rod in a first direction, the threaded portion of the trunnion is engaged with a threaded portion of the rod to move the trunnion in a first axial direction along the rod, the at least one cam follower moves from a first portion to a second portion of the cam surface in response to movement of the trunnion in the first axial direction, and the at least one of the first jaw or the second jaw rotates relative to the other of the first jaw or the second jaw in response to the movement of the at least one cam follower along the cam surface, to move from the fully open position to the fully closed position of the first and second jaws; and in response to continued rotation of the rod in the first direction and continued movement of the trunnion in the first axial direction, the threaded portion of the trunnion is disengaged from the threaded portion of the rod and moved onto an unthreaded portion of the rod, the at least one cam follower moves from the second portion to a third portion of the cam surface in response to the continued movement of the trunnion in the first axial direction and the movement of the trunnion onto the unthreaded portion of the rod, and the at least one of the first jaw or the second jaw rotates relative to the other of the first jaw or the second jaw to move from the fully closed position to a partially open position of the first jaw and the second jaw.

12. The accessory of claim 11, wherein in the fully closed position of the first and second jaws, a target force is exerted on a workpiece received between the first and second jaws, and in the partially open position of the first and second jaws, the workpiece is releasable from the first and second jaws.

13. The accessory of claim 11, wherein the threaded portion of the rod is positioned between a first unthreaded portion and a second unthreaded portion of the rod, wherein, in the partially open position of the first and second jaws, the trunnion is positioned on the first unthreaded portion of the rod, and in the fully open position of the first and second jaws, the trunnion is positioned on the second unthreaded portion of the rod.

14. The accessory of claim 11, wherein the trunnion is configured to move in a second axial direction along the rod in response to rotation of the rod in a second direction.

15. The accessory of claim 11, wherein the at least one cam follower includes:

a first roller configured to engage a first cam surface coupled to the first jaw; and a second roller configured to engage a second cam surface coupled to the second jaw, and wherein the trunnion includes:

a first side portion and a second side portion provided on opposite sides of an intermediate portion;

a first recessed area on a first side of the intermediate portion, between the first and second side portions of the trunnion, wherein the first roller is rotatably mounted in the first recessed area;

a second recessed area on a second side of the intermediate portion, between the first and second side portions of the trunnion, wherein the second roller is rotatably mounted in the second recessed area; and a threaded opening formed in the intermediate portion, wherein the rod extends through the threaded opening.

16. The accessory of claim 15, wherein, in response to movement of the trunnion in the first axial direction:

the first jaw rotates in a first direction in response to a force exerted by the first roller on the first jaw as the first roller rolls along the first cam surface, the second jaw rotates in a second direction in response to a force exerted by the second roller on the second jaw as the second roller rolls along the second cam surface, and a target force is exerted on a workpiece received between the first and second jaws in response to a positioning of the trunnion on the threaded portion of the rod, with the first roller at a peak portion of the first cam surface of the first jaw and the second roller at a peak portion of the second cam surface.

17. The accessory of claim 16, wherein, in response to continued rotation of the rod in the first direction and continued movement of the trunnion in the first axial direction onto the unthreaded portion of the rod:

the first jaw rotates in the second direction in response to continued movement of the first roller along the first cam surface, and the second jaw rotates in the first direction in response to continued movement of the second roller along the second cam surface.

18. An accessory for a rotary power tool, comprising:

a rod between a first guide plate and a second guide plate, the rod having an end portion configured to be coupled to the rotary power tool, wherein the rod is configured to rotate about a longitudinal axis in response to operation of the power tool;

a first jaw coupled between the first guide plate and the second guide plate;

a second jaw rotatably coupled between the first guide plate and the second guide plate, wherein the first jaw is rotatable relative to the second jaw between a fully open position and a fully closed position of the first jaw and the second jaw to crimp or clamp a workpiece positioned between the first and second jaws;

a trunnion positioned on the rod, the trunnion including:

a threaded opening formed in an intermediate portion of the trunnion, wherein the rod extends through the threaded opening such that the trunnion is configured to move axially along the rod in response to rotation of the rod;

a mounting pin extending between a first side portion and a second side portion of the trunnion; and a cam follower mounted on the mounting pin, wherein the cam follower is configured to engage a first cam surface coupled the first jaw, wherein a position of the mounting pin in the trunnion is adjustable so as to adjust a position of the cam follower and a corresponding separation distance between a working portion of the first jaw and a working portion of the second jaw;

in response to rotation of the rod in a first direction, the threaded portion of the trunnion is engaged with a threaded portion of the rod to move the trunnion in a first axial direction along the rod, the cam follower moves along the cam surface of the second jaw in response to movement of the trunnion in the first axial direction, and the second jaw rotates relative to first jaw in response to the movement of the first cam follower along the first cam surface.

19. The accessory of claim 18, wherein the mounting pin extends through an opening in the first side portion of the trunnion, and out through an opening in the second side portion of the trunnion, the pin including:

a head portion;

an adjustment portion formed adjacent to the head portion, the adjustment portion including a plurality of engagement protrusions;

an eccentric portion formed adjacent to the adjustment portion; and a coupling portion formed adjacent to the eccentric portion, wherein the head portion, the adjustment portion and the coupling portion are coaxially aligned along a longitudinal axis of the mounting pin, and the eccentric portion is offset from the longitudinal axis of the mounting pin, and wherein the cam follower is mounted on the eccentric portion of the mounting pin.

20. The accessory of claim 19, wherein the opening in the first side portion of the trunnion includes a plurality of engagement recesses configured to selectively engage the plurality of engagement protrusions formed on the adjustment portion of the mounting pin.

21. The accessory of claim 20, wherein a separation distance between the working portion of the first jaw and the working portion of the second jaw is varied based on a rotational position of the mounting pin in the opening in the first side portion of the trunnion and a corresponding position of the cam follower mounted on the eccentric portion of the mounting pin.

22. The accessory of claim 21, wherein a magnitude of a force exerted on a workpiece received between the working portion of the first jaw and the working portion of the second jaw is varied based on the rotational position of the mounting pin in the opening in the first side portion of the trunnion, the corresponding position of the cam follower mounted on the eccentric portion of the mounting pin, and the corresponding separation distance between the working portions of the first and second jaws.

* * * * *